US012019492B1

(12) United States Patent
Mathuriya et al.

(10) Patent No.: US 12,019,492 B1
(45) Date of Patent: Jun. 25, 2024

(54) METHOD AND APPARATUS FOR MANAGING POWER IN A MULTI-DIMENSIONAL PACKAGING

(71) Applicant: Kepler Computing Inc., San Francisco, CA (US)

(72) Inventors: Amrita Mathuriya, Portland, OR (US); Christopher B. Wilkerson, Portland, OR (US); Rajeev Kumar Dokania, Beaverton, OR (US); Debo Olaosebikan, San Francisco, CA (US); Sasikanth Manipatruni, Portland, OR (US)

(73) Assignee: KEPLER COMPUTING INC., San Francisco, CA (US)

( * ) Notice: Subject to any disclaimer, the term of this patent is extended or adjusted under 35 U.S.C. 154(b) by 38 days.

(21) Appl. No.: 17/408,326

(22) Filed: Aug. 20, 2021

Related U.S. Application Data

(63) Continuation of application No. 17/396,585, filed on Aug. 6, 2021, now Pat. No. 11,791,233.

(51) Int. Cl.
*G06F 1/3203* (2019.01)
*H01L 23/367* (2006.01)
(Continued)

(52) U.S. Cl.
CPC ........ *G06F 1/3203* (2013.01); *H01L 23/3677* (2013.01); *H01L 23/5381* (2013.01);
(Continued)

(58) Field of Classification Search
CPC .............................. G06F 1/3203; H02M 3/10
See application file for complete search history.

(56) References Cited

U.S. PATENT DOCUMENTS 5,834,162 A   11/1998  Malba
6,256,248 B1   7/2001  Leung
(Continued)

FOREIGN PATENT DOCUMENTS

CN   104081516 A   10/2014
CN   104081516 B    2/2017
(Continued)

OTHER PUBLICATIONS

Advisory Action notified Jan. 5, 2023 for U.S. Appl. No. 16/823,209.
(Continued)

*Primary Examiner* — Jaweed A Abbaszadeh
*Assistant Examiner* — Gayathri Sampath
(74) *Attorney, Agent, or Firm* — MUGHAL GAUDRY & FRANKLIN PC

(57) ABSTRACT

A packaging technology to improve performance of an AI processing system resulting in an ultra-high bandwidth system. An IC package is provided which comprises: a substrate; a first die on the substrate, and a second die stacked over the first die. The first die can be a first logic die (e.g., a compute chip, CPU, GPU, etc.) while the second die can be a compute chiplet comprising ferroelectric or paraelectric logic. Both dies can include ferroelectric or paraelectric logic. The ferroelectric/paraelectric logic may include AND gates, OR gates, complex gates, majority, minority, and/or threshold gates, sequential logic, etc. The IC package can be in a 3D or 2.5D configuration that implements logic-on-logic stacking configuration. The 3D or 2.5D packaging configurations have chips or chiplets designed to have time distributed or spatially distributed processing. The logic of chips or chiplets is segregated so that one chip in a 3D or 2.5D stacking arrangement is hot at a time.

18 Claims, 49 Drawing Sheets

(51) Int. Cl.
*H01L 23/538* (2006.01)
*H02M 3/10* (2006.01)

(52) U.S. Cl.
CPC ...... *H01L 23/5385* (2013.01); *H01L 23/5386* (2013.01); *H02M 3/10* (2013.01); *H01L 2924/37001* (2013.01)

(56) References Cited

U.S. PATENT DOCUMENTS

| | | | |
|---|---|---|---|
| 6,487,135 | B2 | 11/2002 | Watanabe et al. |
| 6,890,798 | B2 | 5/2005 | McMahon |
| 7,146,454 | B1 | 12/2006 | Li et al. |
| 7,217,596 | B2 | 5/2007 | Cobbley et al. |
| 7,683,459 | B2 | 3/2010 | Ma et al. |
| 7,992,017 | B2 | 8/2011 | Safford et al. |
| 8,143,710 | B2 | 3/2012 | Cho |
| 8,198,716 | B2 | 6/2012 | Periaman et al. |
| 8,245,065 | B2 | 8/2012 | Niggemeier et al. |
| 8,525,342 | B2 | 9/2013 | Chandrasekaran et al. |
| 8,546,955 | B1 | 10/2013 | Wu |
| 8,547,769 | B2 | 10/2013 | Saraswat et al. |
| 8,612,809 | B2 | 12/2013 | Casper et al. |
| 8,701,073 | B1 | 4/2014 | Fu et al. |
| 8,759,899 | B1 | 6/2014 | Lue et al. |
| 8,896,126 | B2 | 11/2014 | Setardja |
| 8,947,931 | B1 | 2/2015 | d'Abreu |
| 9,165,968 | B2 | 10/2015 | Chao et al. |
| 9,379,078 | B2 | 6/2016 | Yu et al. |
| 9,627,365 | B1 | 4/2017 | Yu et al. |
| 9,748,190 | B2 | 8/2017 | Chen et al. |
| 10,074,423 | B1 | 9/2018 | Hermesh et al. |
| 10,461,076 | B1 | 10/2019 | Brewer |
| 10,741,525 | B2 | 8/2020 | Takishita et al. |
| 11,009,938 | B1 | 5/2021 | Law et al. |
| 11,043,472 | B1 | 6/2021 | Dokania et al. |
| 11,139,270 | B2 | 10/2021 | Manipatruni et al. |
| 11,152,343 | B1 | 10/2021 | Dokania et al. |
| 11,171,115 | B2 | 11/2021 | Manipatruni et al. |
| 11,238,206 | B1 | 2/2022 | Sivaswamy et al. |
| 11,309,895 | B2 | 4/2022 | Dabral et al. |
| 11,436,402 | B1 | 9/2022 | Liu et al. |
| 11,488,935 | B1 | 11/2022 | Zaman et al. |
| 11,694,940 | B1 | 7/2023 | Mathuriya et al. |
| 2003/0097543 | A1 | 5/2003 | Wishneusky |
| 2006/0179329 | A1* | 8/2006 | Terechko ............ G06F 9/30083 |
| | | | 712/E9.032 |
| 2007/0208902 | A1 | 9/2007 | Park et al. |
| 2007/0234094 | A1 | 10/2007 | Samra et al. |
| 2008/0126611 | A1 | 5/2008 | Tu et al. |
| 2009/0019411 | A1 | 1/2009 | Chandra et al. |
| 2009/0103854 | A1 | 4/2009 | Beausoleil et al. |
| 2010/0008058 | A1 | 1/2010 | Saen et al. |
| 2010/0057404 | A1 | 3/2010 | Dittmann et al. |
| 2010/0077179 | A1 | 3/2010 | Stillwell, Jr. et al. |
| 2010/0167467 | A1 | 7/2010 | Aoi |
| 2010/0228955 | A1 | 9/2010 | Niggemeier et al. |
| 2010/0321993 | A1* | 12/2010 | Nikonov ............... H10B 61/00 |
| | | | 365/171 |
| 2011/0222540 | A1 | 9/2011 | Mital et al. |
| 2012/0098140 | A1 | 4/2012 | Bartley et al. |
| 2012/0106117 | A1 | 5/2012 | Sundaram et al. |
| 2012/0146207 | A1 | 6/2012 | Chou et al. |
| 2012/0239904 | A1 | 9/2012 | Ekanadham et al. |
| 2013/0086395 | A1* | 4/2013 | Liu ...................... G06F 9/5094 |
| | | | 713/300 |
| 2013/0141858 | A1 | 6/2013 | Pyeon |
| 2013/0175686 | A1 | 7/2013 | Meyer et al. |
| 2013/0205143 | A1 | 8/2013 | Eastlack |
| 2013/0320560 | A1 | 12/2013 | Secker et al. |
| 2013/0346781 | A1 | 12/2013 | Chung et al. |
| 2014/0006817 | A1 | 1/2014 | Bonen et al. |
| 2014/0026146 | A1 | 1/2014 | Jahagirdar et al. |
| 2014/0208041 | A1 | 7/2014 | Hyde et al. |
| 2014/0217616 | A1 | 8/2014 | Choi |
| 2014/0371109 | A1 | 12/2014 | McMillen et al. |
| 2015/0091131 | A1 | 4/2015 | Lamorey et al. |
| 2015/0277532 | A1 | 10/2015 | Mishaeli et al. |
| 2015/0279431 | A1 | 10/2015 | Li et al. |
| 2016/0126291 | A1 | 5/2016 | Lu et al. |
| 2016/0357630 | A1 | 12/2016 | Kang et al. |
| 2017/0018301 | A1 | 1/2017 | Kilmer et al. |
| 2017/0062383 | A1 | 3/2017 | Yee et al. |
| 2017/0077387 | A1 | 3/2017 | Kan et al. |
| 2017/0084312 | A1 | 3/2017 | Kim |
| 2017/0084596 | A1 | 3/2017 | Scanlan |
| 2017/0139635 | A1 | 5/2017 | Jayasena et al. |
| 2017/0178711 | A1 | 6/2017 | Morris et al. |
| 2017/0300269 | A1* | 10/2017 | Um ..................... G06F 3/0659 |
| 2018/0082981 | A1 | 3/2018 | Gowda |
| 2018/0095750 | A1 | 4/2018 | Drysdale et al. |
| 2018/0107630 | A1 | 4/2018 | Zhou et al. |
| 2018/0240964 | A1 | 8/2018 | Nikonov et al. |
| 2018/0254073 | A1 | 9/2018 | Frans |
| 2018/0277695 | A1 | 9/2018 | Garten et al. |
| 2018/0330236 | A1 | 11/2018 | Hou et al. |
| 2018/0350773 | A1 | 12/2018 | Saito |
| 2019/0042251 | A1 | 2/2019 | Nurvitadhi et al. |
| 2019/0050040 | A1 | 2/2019 | Baskaran et al. |
| 2019/0051642 | A1 | 2/2019 | Hyde et al. |
| 2019/0065204 | A1* | 2/2019 | Jean ..................... G06F 9/3004 |
| 2019/0065956 | A1 | 2/2019 | Qian et al. |
| 2019/0096453 | A1 | 3/2019 | Shin et al. |
| 2019/0102330 | A1 | 4/2019 | Hasbun et al. |
| 2019/0103143 | A1 | 4/2019 | Hasbun et al. |
| 2019/0103148 | A1 | 4/2019 | Hasbun et al. |
| 2019/0114535 | A1 | 4/2019 | Ng et al. |
| 2019/0164834 | A1 | 5/2019 | Or-Bach et al. |
| 2019/0187898 | A1 | 6/2019 | Gu et al. |
| 2019/0189564 | A1 | 6/2019 | Guzek |
| 2019/0198083 | A1 | 6/2019 | Biswas et al. |
| 2019/0205244 | A1 | 7/2019 | Smith |
| 2019/0220434 | A1 | 7/2019 | Dai et al. |
| 2019/0229101 | A1 | 7/2019 | Lee |
| 2019/0259732 | A1 | 8/2019 | Choo et al. |
| 2019/0267074 | A1 | 8/2019 | Fishburn et al. |
| 2019/0279697 | A1 | 9/2019 | Karpov et al. |
| 2019/0317585 | A1 | 10/2019 | Bhandaru et al. |
| 2019/0318975 | A1 | 10/2019 | Shi et al. |
| 2019/0334010 | A1 | 10/2019 | Avci et al. |
| 2020/0006324 | A1 | 1/2020 | Chen et al. |
| 2020/0075567 | A1 | 3/2020 | Collins |
| 2020/0076424 | A1* | 3/2020 | Dubey ................ H03K 17/6871 |
| 2020/0098725 | A1 | 3/2020 | Liff et al. |
| 2020/0107444 | A1 | 4/2020 | Hoe et al. |
| 2020/0126995 | A1 | 4/2020 | Ge et al. |
| 2020/0135697 | A1 | 4/2020 | Brewer |
| 2020/0159568 | A1 | 5/2020 | Goyal et al. |
| 2020/0161230 | A1 | 5/2020 | Knickerbocker et al. |
| 2020/0168528 | A1 | 5/2020 | Cheah et al. |
| 2020/0168550 | A1 | 5/2020 | Ryu et al. |
| 2020/0168554 | A1 | 5/2020 | Fay et al. |
| 2020/0279793 | A1 | 9/2020 | Xie et al. |
| 2020/0303343 | A1 | 9/2020 | Manipatruni et al. |
| 2020/0303344 | A1 | 9/2020 | Manipatruni et al. |
| 2020/0334082 | A1 | 10/2020 | Zhao et al. |
| 2020/0365593 | A1 | 11/2020 | Chen et al. |
| 2021/0134724 | A1 | 5/2021 | Rubin et al. |
| 2021/0160061 | A1 | 5/2021 | Liu et al. |
| 2021/0166740 | A1 | 6/2021 | Shin et al. |
| 2021/0311629 | A1 | 10/2021 | Pappachan et al. |
| 2021/0335718 | A1 | 10/2021 | Cheah et al. |
| 2021/0391469 | A1* | 12/2021 | Doornbos ......... H01L 29/40111 |
| 2022/0367400 | A1 | 11/2022 | Li |
| 2023/0004324 | A1 | 1/2023 | Lim et al. |
| 2023/0086010 | A1 | 3/2023 | Gonzalez et al. |

FOREIGN PATENT DOCUMENTS

| | | |
|---|---|---|
| GB | 2323188 A | 9/1998 |
| JP | H11168185 A | 6/1999 |
| JP | 2000196008 A | 7/2000 |
| JP | 2004315268 A | 11/2004 |
| JP | 2006324430 A | 11/2006 |

(56) References Cited

FOREIGN PATENT DOCUMENTS

| | | |
|---|---|---|
| JP | 2007150154 | 1/2009 |
| JP | 2010053399 A | 3/2010 |
| JP | 2018160490 A | 10/2018 |
| KR | 20100081272 A | 7/2010 |
| KR | 20200066538 A | 6/2020 |
| TW | 201327740 A | 7/2013 |
| TW | 201430968 A | 8/2014 |
| TW | 201523827 A | 6/2015 |
| TW | 201843782 B | 2/2020 |
| WO | 2018126073 A1 | 7/2018 |
| WO | 2018220846 A1 | 12/2018 |
| WO | 2019023253 A1 | 1/2019 |
| WO | 2020062312 A1 | 4/2020 |

OTHER PUBLICATIONS

Final Office Action notified Oct. 17, 2022 for U.S. Appl. No. 16/823,209.
Non-Final Office Action notified Jan. 31, 2023 for U.S. Appl. No. 16/823,209.
Non-Final Office Action notified Oct. 5, 2022 for U.S. Appl. No. 17/472,308.
Non-Final Office Action notified Oct. 6, 2022 for U.S. Appl. No. 17/472,325.
Non-Final Office Action notified Sep. 26, 2022 for U.S. Appl. No. 17/390,829.
Notice of Allowance notified Nov. 23, 2022 for U.S. Appl. No. 17/390,829.
Notice of Allowance notified Sep. 21, 2022 for Taiwan Patent Application No. 109106755.
Notice of Allowance notified Sep. 28, 2022 for U.S. Appl. No. 17/390,799.
Notice of Reasons for Rejection notified Nov. 8, 2022 for Japanese Patent Application No. 2021-546863.
Restriction Requirement notified Feb. 8, 2023 for U.S. Appl. No. 17/229,750.
1st Office Action & Search Report notified Dec. 9, 2020, for Taiwan Patent Application No. 109106755.
Advisory Action notified Mar. 3, 2021 for U.S. Appl. No. 16/357,265.
Advisory Action notified Mar. 3, 2021 for U.S. Appl. No. 16/357,272.
Decision of Rejection notified May 18, 2021 for Taiwan Patent Application No. 109106755.
Final Office Action notified Dec. 28, 2020 for U.S. Appl. No. 16/357,265.
Final Office Action notified Dec. 31, 2020 for U.S. Appl. No. 16/357,272.
International Preliminary Report on Patentability notified Dec. 9, 2021 for PCT Patent Application No. PCT/US2020/032974.
International Preliminary Report on Patentability notified Sep. 30, 2021 for PCT Patent Application No. PCT/US2020/018875.
International Search Report & Written Opinion notified Jun. 11, 2020 for PCT Patent Application No. PCT/US2020/018875.
International Search Report & Written Opinion notified Sep. 1, 2020 for PCT Patent Application No. PCT/US2020/032974.
Jun, H. et al., "HBM (High Bandwidth Memory) DRAM Technology and Architecture," 2017 IEEE International Memory Workshop (IMW), Monterey, CA, 2017, pp. 1-4.
Kim, J. et al., "A 1.2 V 12.8 GB/s 2 GB Mobile Wide-I/O DRAM With 4$\times$128 I/Os Using TSV Based Stacking", IEEE Journal of Solid-State Circuits, vol. 47, No. 1, pp. 107-116, Jan. 2012.
Lee, D. et al., "A 1.2V 8Gb 8-channel 128GB/s high-bandwidth memory (HBM) stacked DRAM with effective microbump I/O test methods using 29nm process and TSV", 2014 IEEE International Solid-State Circuits Conference Digest of Technical Papers (ISSCC), San Francisco, CA, 2014, pp. 432-433.
Macri, "AMD's next generation GPU and high bandwidth memory architecture: FURY", 2015 IEEE Hot Chips 27 Symposium (HCS), Cupertino, CA, 2015, pp. 1-26.
Non-Final Office Action notified Jul. 20, 2020 for U.S. Appl. No. 16/357,272.
Non-Final Office Action notified Jul. 22, 2020 for U.S. Appl. No. 16/357,265.
Non-Final Office Action notified Mar. 22, 2021 for U.S. Appl. No. 16/357,265.
Non-Final Office Action notified Mar. 23, 2021 for U.S. Appl. No. 16/357,272.
Non-Final Office Action notified Sep. 3, 2020 for U.S. Appl. No. 16/428,885.
Non-Final Office Action notified Sep. 3, 2020 for U.S. Appl. No. 16/428,893.
Notice of Allowance notified Feb. 22, 2021 for U.S. Appl. No. 16/428,885.
Notice of Allowance notified Jul. 9, 2021 for U.S. Appl. No. 16/428,893.
Notice of Allowance notified Jul. 22, 2021 for U.S. Appl. No. 16/357,265.
Notice of Allowance notified Jul. 22, 2021 for U.S. Appl. No. 16/357,272.
Pugsley et al., "NDC: Analyzing the impact of 3D-stacked memory+ logic devices on MapReduce workloads", 2014 IEEE International Symposium on Performance Analysis of Systems and Software (ISPASS), Monterey, CA, 2014, pp. 190-200.
Restriction Requirement notified Apr. 3, 2020 for U.S. Appl. No. 16/428,885.
Restriction Requirement notified Apr. 3, 2020 for U.S. Appl. No. 16/428,893.
Restriction Requirement notified Dec. 13, 2019 for U.S. Appl. No. 16/357,265.
Restriction Requirement notified Jan. 2, 2020 for U.S. Appl. No. 16/357,272.
Shulaker et al., "Monolithic 3D integration of logic and memory: Carbon nanotube FETs, resistive RAM, and silicon FETs", 2014 IEEE International Electron Devices Meeting, San Francisco, CA, 2014, pp. 27.4.1-27.4.4.
Sun et al., "A novel architecture of the 3D stacked Mram L2 cache for CMPs", 2009 IEEE 15th International Symposium on High Performance Computer Architecture, Raleigh, NC, 2009, pp. 239-249.
Woo et al., "An optimized 3D-stacked memory architecture by exploiting excessive, high-density TSV bandwidth", HPCA—16 2010 The Sixteenth International Symposium on High-Performance Computer Architecture, Bangalore, 2010, pp. 1-12.
Yu, "Wafer level system integration for SiP", 2014 IEEE International Electron Devices Meeting, San Francisco, CA, 2014, pp. 27.1.1-27.1.4.
First Office Action in Re-Examination notified Jul. 11, 2022 for Taiwan Patent Application No. 109106755.
Kim et al., "A 1.2 V 12.8 GB/s 2 GB Mobile Wide-I/O DRAM With 4$\times$128 I/Os Using TSV Based Stacking", IEEE Journal of Solid-State Circuits, vol. 47, No. 1, pp. 107-116, Jan. 2012.
Lee et al., "25.2 A 1.2V 8Gb 8-channel 128GB/s high-bandwidth memory (HBM) stacked DRAM with effective microbump I/O test methods using 29nm process and TSV", 2014 IEEE International Solid-State Circuits Conference Digest of Technical Papers (ISSCC), San Francisco, CA, 2014, pp. 432-433.
Non-Final Office Action notified May 24, 2022 for U.S. Appl. No. 16/823,209.
Advisory Action notified Mar. 15, 2023 for U.S. Appl. No. 17/472,308.
Advisory Action notified Mar. 15, 2023 for U.S. Appl. No. 17/472,325.
Final Office Action notified Apr. 17, 2023 for U.S. Appl. No. 17/499,241.
Final Office Action notified Apr. 19, 2023 for U.S. Appl. No. 16/823,209.
Final Office Action notified Feb. 14, 2023 for U.S. Appl. No. 17/472,308.
Final Office Action notified Feb. 14, 2023 for U.S. Appl. No. 17/472,325.
Lexinnova, 3D Stacked Memory, retrieved from the Internet by USPTO at . 2017. 23 pages.
Non-Final Office Action notified Apr. 20, 2023 for U.S. Appl. No. 17/472,308.

(56) References Cited

OTHER PUBLICATIONS

Non-Final Office Action notified Apr. 20, 2023 for U.S. Appl. No. 17/472,325.
Non-Final Office Action notified Mar. 3, 2023 for U.S. Appl. No. 17/449,240.
Notice of Allowance notified Apr. 13, 2023 for U.S. Appl. No. 17/478,841.
Office Action notified Feb. 21, 2023 for Japanese Patent Application No. 2021-546863.
Restriction Requirement notified May 1, 2023 for U.S. Appl. No. 17/230,889.
Wikipedia. Ferroelectric RAM. retrieved from the Internet by USPTO Feb. 21, 2023, https://en.wikipedia.org/wiki/Ferroelectric_RAM, 8 pages.
Advisory Action notified Jun. 14, 2023 for U.S. Appl. No. 16/823,209.
Coskun et al., "Temperature- and Cost-Aware Design of 3D Multiprocessor Architectures," 2009 12th Euromicro Conference on Digital System Design, Architectures, Methods and Tools, Patras, Greece, 2009, pp. 183-190, doi: 10.1109/DSD.2009.233 (8 pages).
Ex Parte Quayle Action notified Aug. 24, 2023 for U.S. Appl. No. 17/408,251.
Final Office Action notified Dec. 22, 2023 for U.S. Appl. No. 17/230,889.
Final Office Action notified Nov. 29, 2023 for U.S. Appl. No. 17/230,890.
Final Office Action notified Oct. 24, 2023 for U.S. Appl. No. 17/472,330.
Final Office Action notified Oct. 27, 2023 for U.S. Appl. No. 17/408,323.
First Office Action notified Jan. 9, 2024 for Taiwan Patent Application No. 112147200.
Koob et al., "Design of a 3-D fully depleted SOI computational RAM," in IEEE Transactions on Very Large Scale Integration (VLSI) Systems, vol. 13, No. 3, pp. 358-369, Mar. 2005, doi: 10.1109/TVLSI.2004.842890 (12 pages).
Lewis et al., "Testing Circuit-Partitioned 3D IC Designs," 2009 IEEE Computer Society Annual Symposium on VLSI, Tampa, FL, USA, 2009, pp. 139-144, doi: 10.1109/ISVLSI.2009.48 (6 pages).
Non-Final Office Action notified Aug. 30, 2023 for U.S. Appl. No. 17/230,889.
Non-Final Office Action notified Jul. 6, 2023 for U.S. Appl. No. 17/229,50.
Non-Final Office Action notified Jul. 26, 2023 for U.S. Appl. No. 7/230,890.
Non-Final Office Action notified May 9, 2023 for U.S. Appl. No. 17/408,323.
Non-Final Office Action notified May 15, 2023 for U.S. Appl. No. 17/472,330.
Non-Final Office Action notified Oct. 5, 2023 for U.S. Appl. No. 17/229,754.
Non-Final Office Action notified Sep. 6, 2023 for Taiwan Patent Application No. 112127062.
Notice of Allowance notified Jul. 12, 2023 for U.S. Appl. No. 16/823,209.
Notice of Allowance notified Jul. 12, 2023 for U.S. Appl. No. 17/499,241.
Notice of Allowance notified Jul. 18, 2023 for Japanese Patent Application No. 2021-546863.
Notice of Allowance notified Jul. 27, 2023 for U.S. Appl. No. 17/229,750.
Notice of Allowance notified Jun. 6, 2023 for U.S. Appl. No. 17/472,308.
Notice of Allowance notified Jun. 6, 2023 for U.S. Appl. No. 17/472,325.
Notice of Allowance notified Jun. 29, 2023 for U.S. Appl. No. 17/407,094.
Notice of Allowance notified May 10, 2023 for U.S. Appl. No. 17/396,585.
Notice of Allowance notified Sep. 11, 2023 for Taiwan Patent Application No. 111129893.
Notice of Allowance notified Sep. 29, 2023 for U.S. Appl. No. 17/408,251.
Non-Final Office Action notified Dec. 15, 2023 for U.S. Appl. No. 17/229,743.
Office Action notified May 8, 2023 for Taiwan Patent Application No. 111129893.
AMD CDNA whitepaper. Retrieved from https://www.amd.com/system/files/documents/amd-cdna-whitepaper.pdf [Sep. 14, 2021].
AMD's V-cache product announcement. Retrieved from https://www.pcworld.com/article/3620871/amd-v-cache-for-ryzen-everything-you-need-to-know.html [Sep. 14, 2021].
Application and Figures as filed for U.S. Appl. No. 17/129,842, filed Dec. 21, 2020.
Application and Figures as filed for U.S. Appl. No. 17/327,614, filed May 21, 2021.
Application and Figures as filed for U.S. Appl. No. 17/327,648, filed May 21, 2021.
Application and Figures as filed for U.S. Appl. No. 17/384,626, filed Jul. 28, 2021.
Chen et al. "System on integrated chips (SoIC (TM) for 3D heterogeneous integration." 2019 IEEE 69th Electronic Components and Technology Conference (ECTC). IEEE, 2019.
Chen et al. "Ultra high density SoIC with sub-micron bond pitch." 2020 IEEE 70th Electronic Components and Technology Conference (ECTC). IEEE, 2020.
Herbert et al., "Analysis of dynamic voltage/frequency scaling in chip-multiprocessors." Proceedings of the 2007 International symposium on Low power electronics and design (ISLPED'07). IEEE, 2007.
Ingerly et al. "Foveros: 3D integration and the use of face-to-face chip stacking for logic devices." 2019 IEEE International Electron Devices Meeting (IEDM). IEEE, 2019.
Leblebici, Y., et al. "A compact high-speed (31, 5) parallel counter circuit based on capacitive threshold logic gates." IEEE Journal of Solid-State Circuits 31.8 (1996): 1177-1183.
Lee et al. "Heterogeneous System-Level Package Integration-Trends and Challenges." 2020 IEEE Symposium on VLSI Technology. IEEE, 2020.
Lent et al. "Quantum cellular automata." Nanotechnology 4.1 (1993): 49.
Manipatruni et al. "Scalable energy-efficient magnetoelectric spin-orbit logic." Nature 565.7737 (2019): 35-42.
Prasad et al. "Buried power rails and back-side power grids: Arm® CPU power delivery network design beyond 5nm." 2019 IEEE International Electron Devices Meeting (IEDM). IEEE, 2019.
Rotem et al. "Power-management architecture of the intel microarchitecture code-named sandy bridge." IEEE micro 32.2 (2012): 20-27.

* cited by examiner

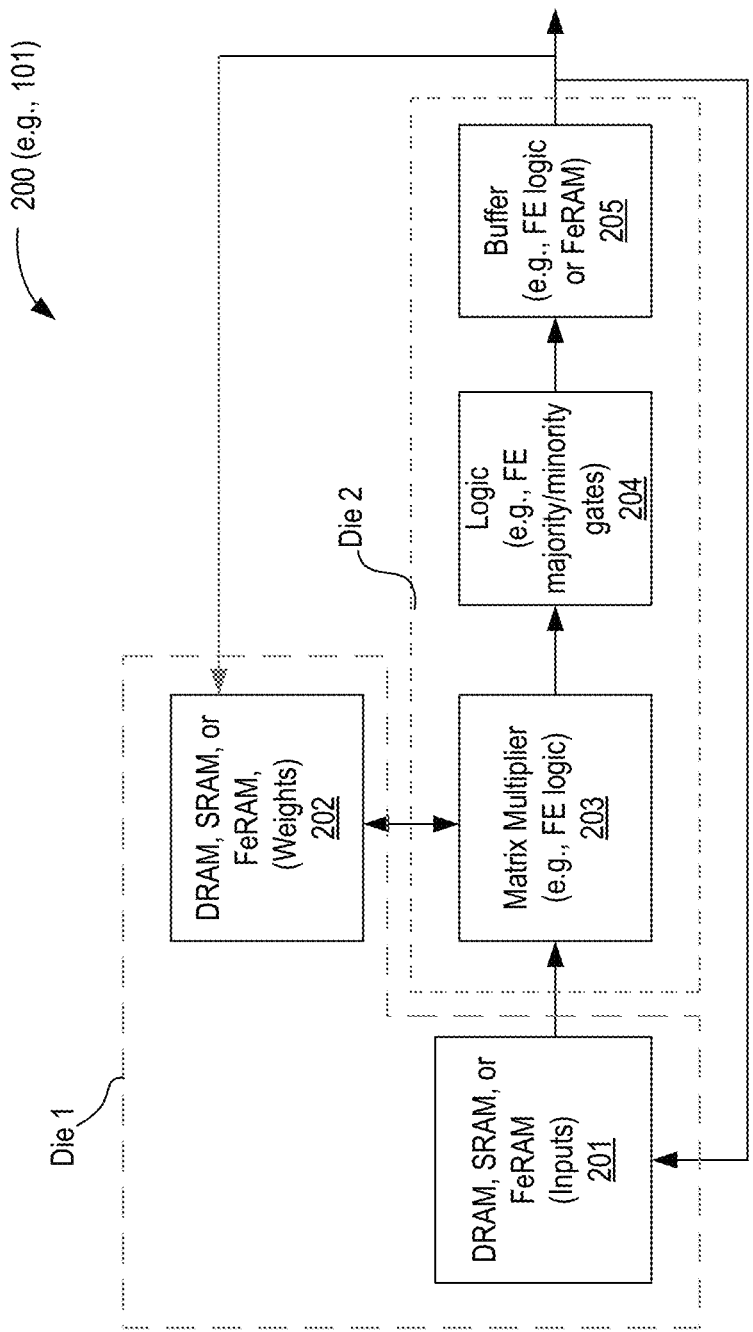

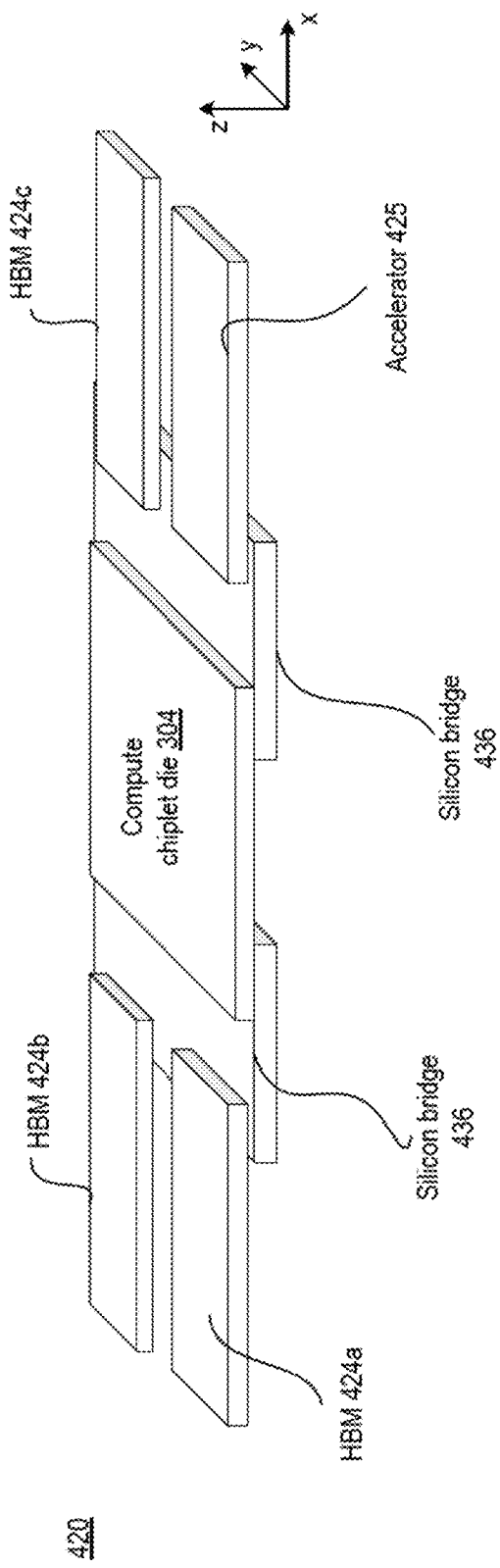
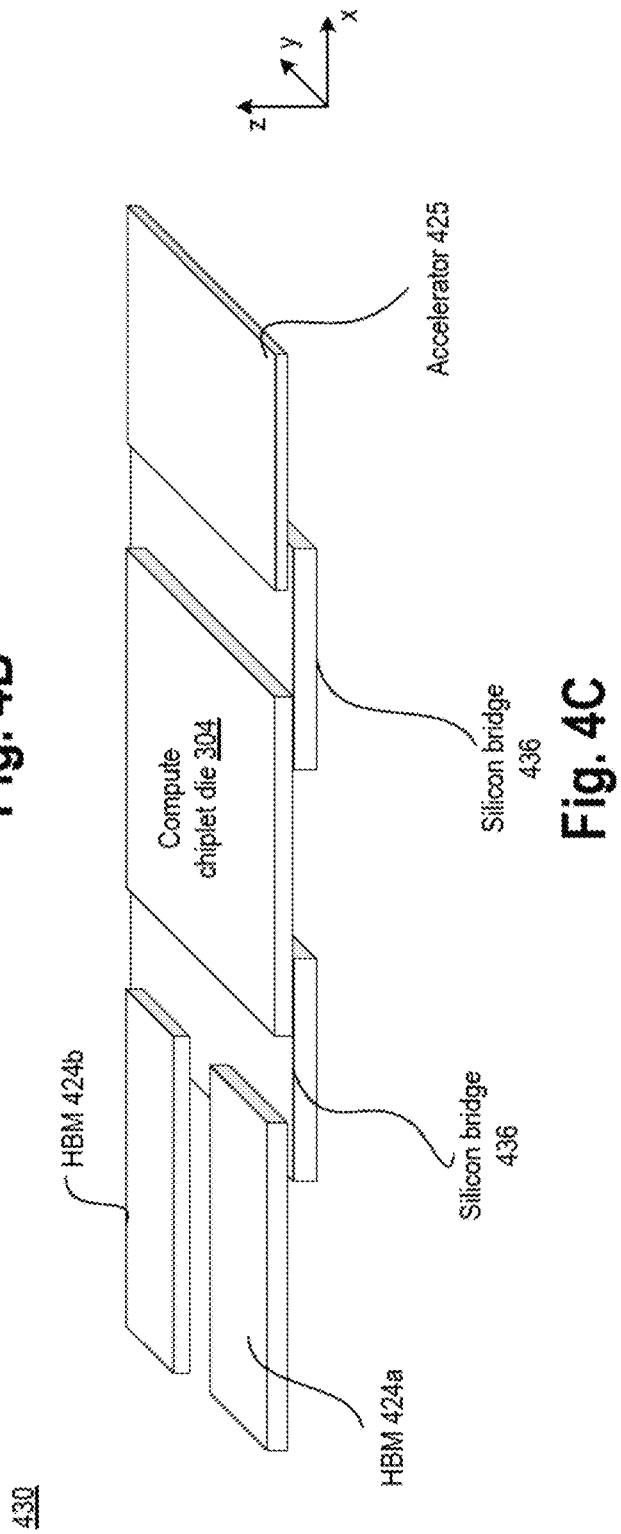

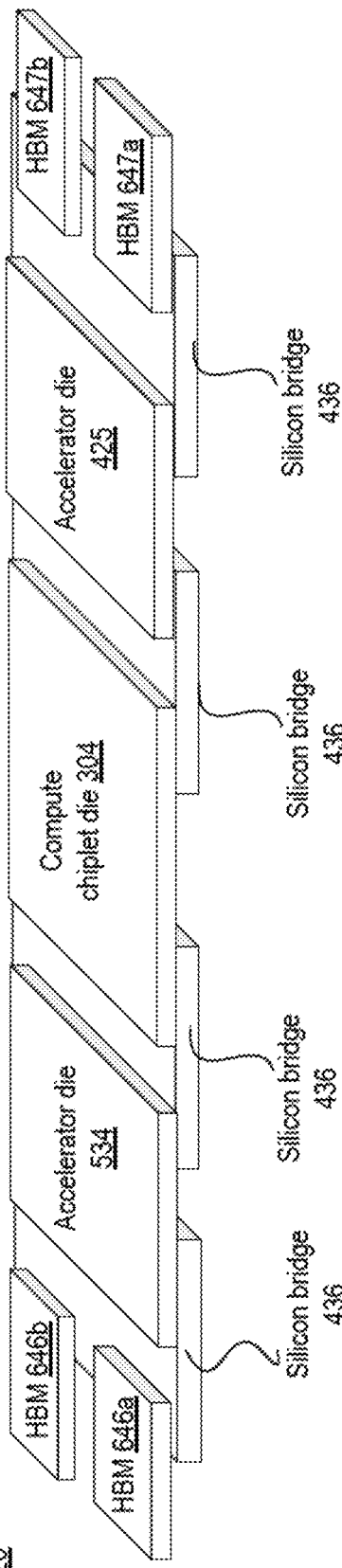
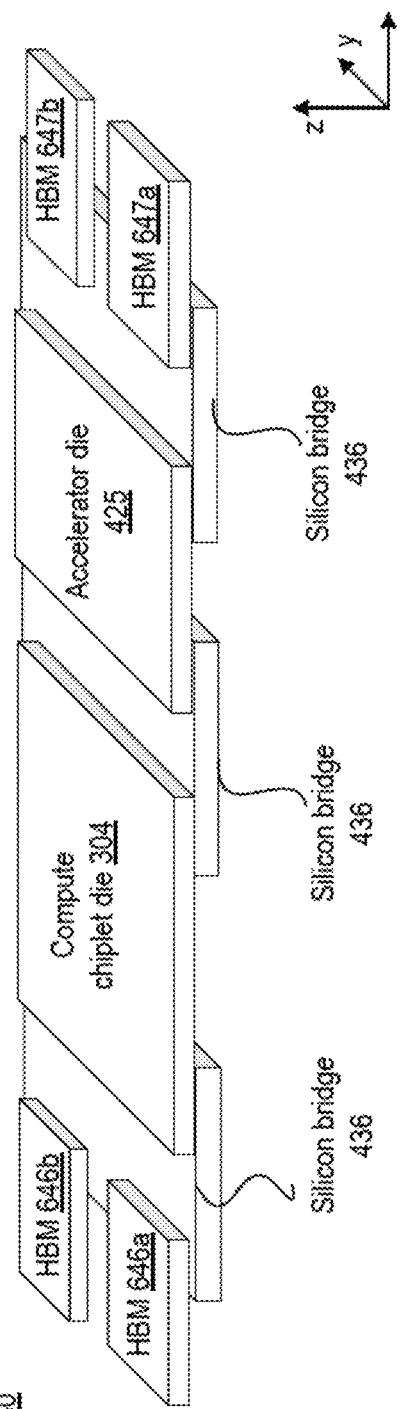
Fig. 6B
Fig. 6C

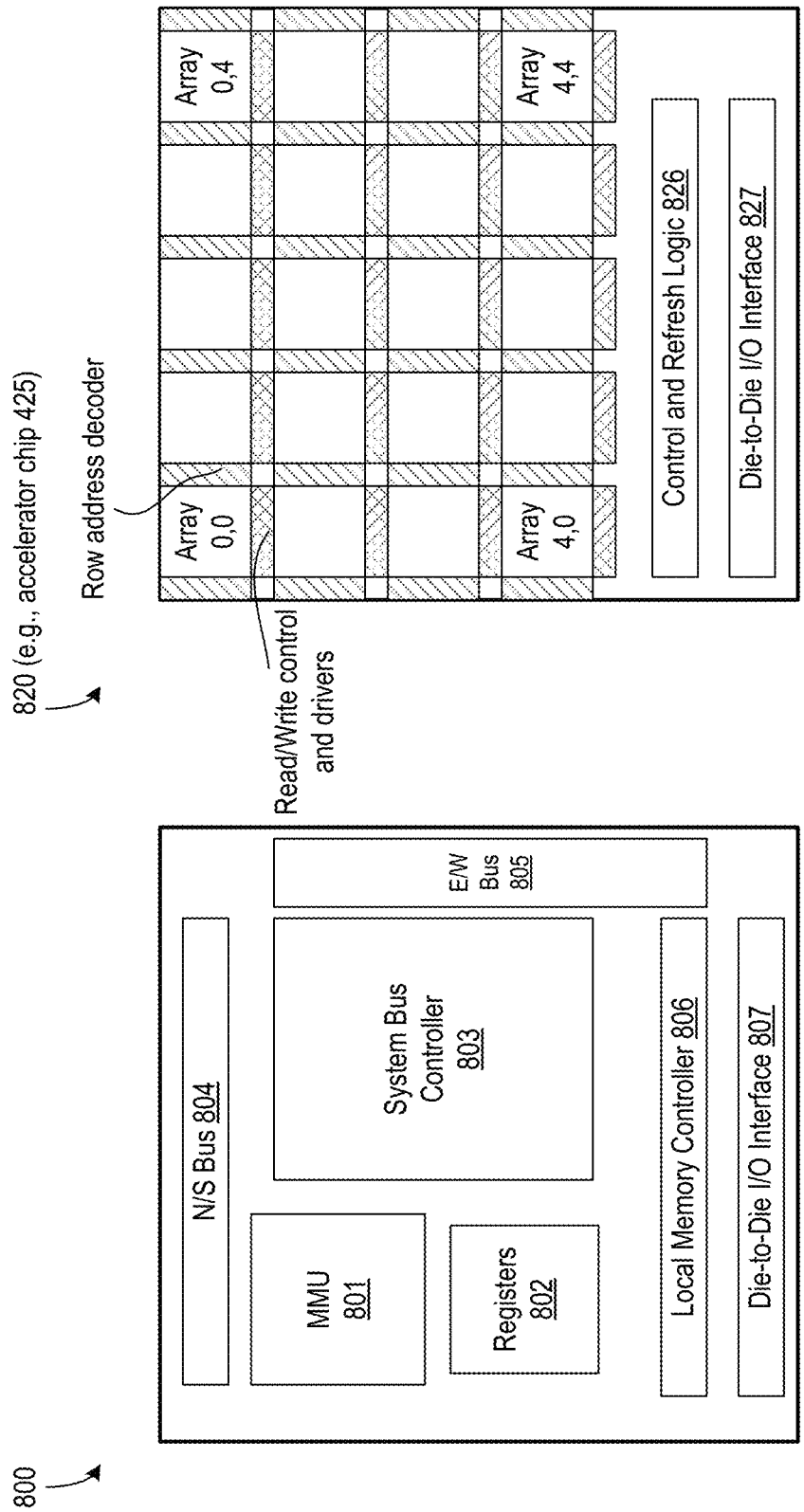

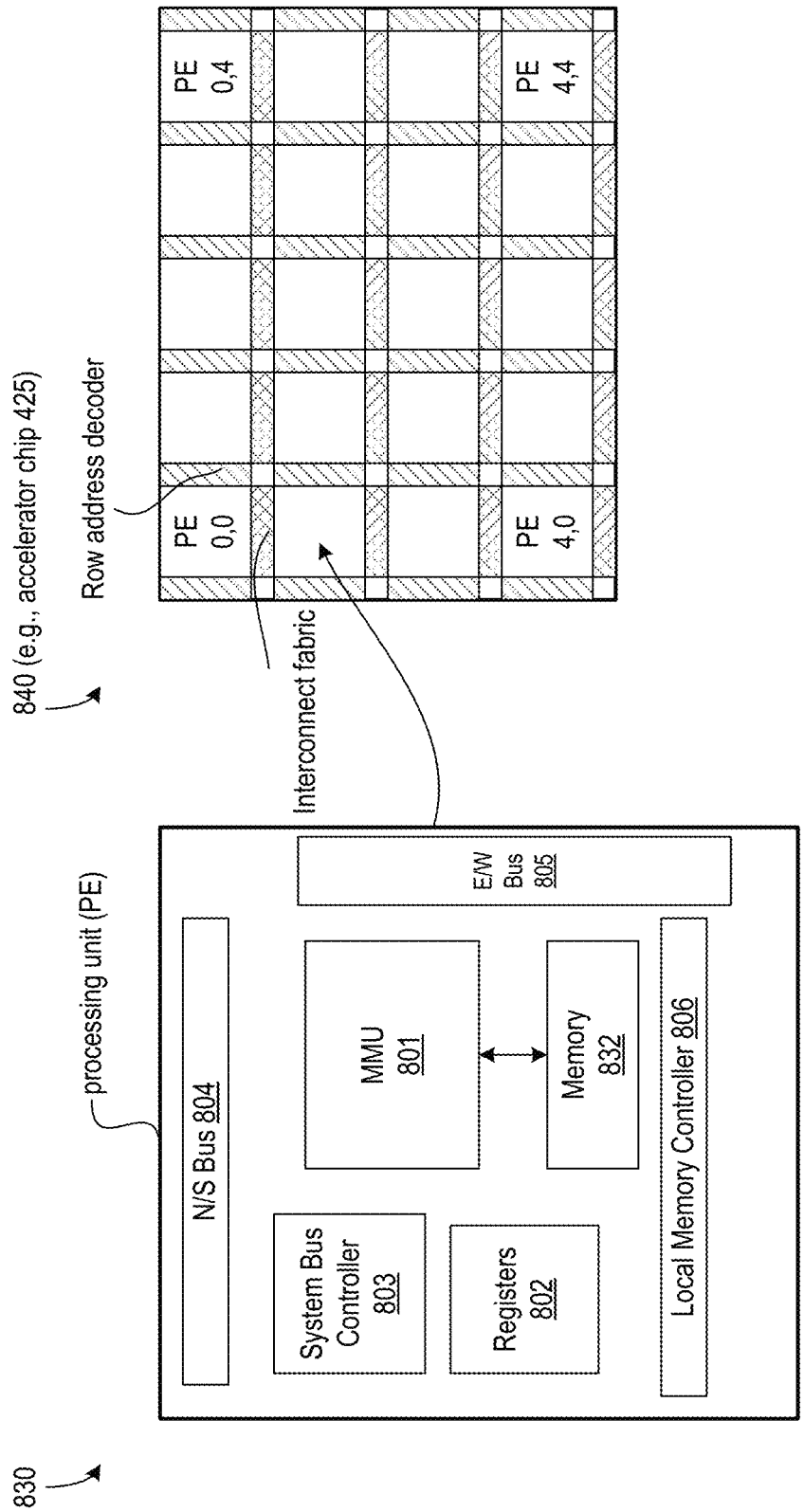

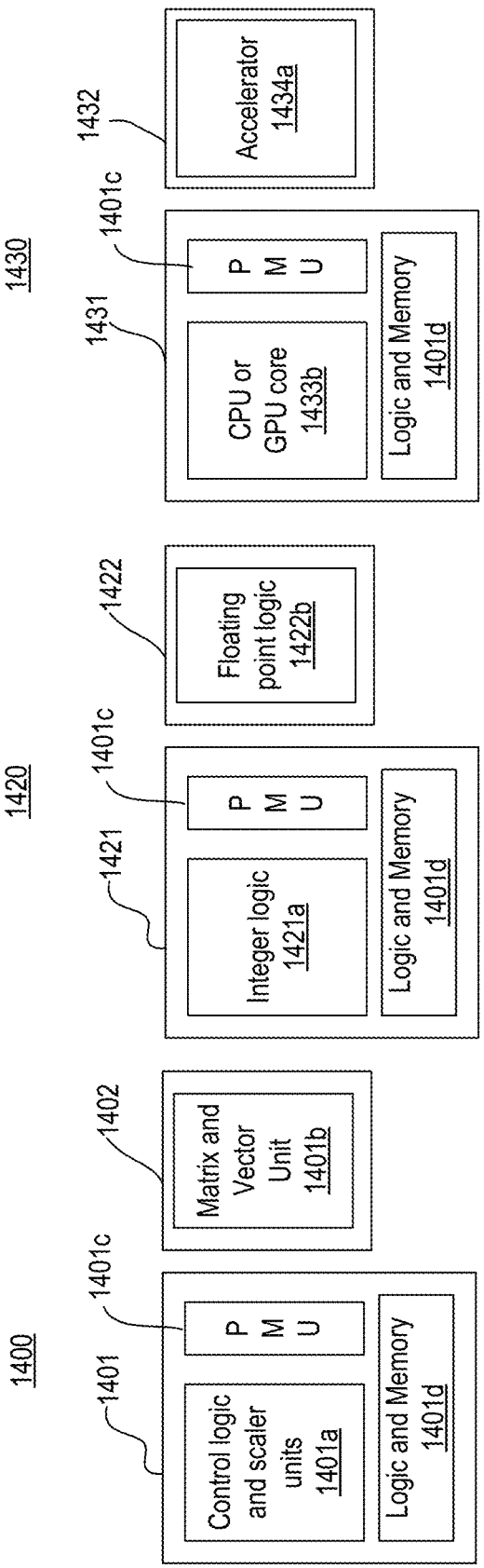
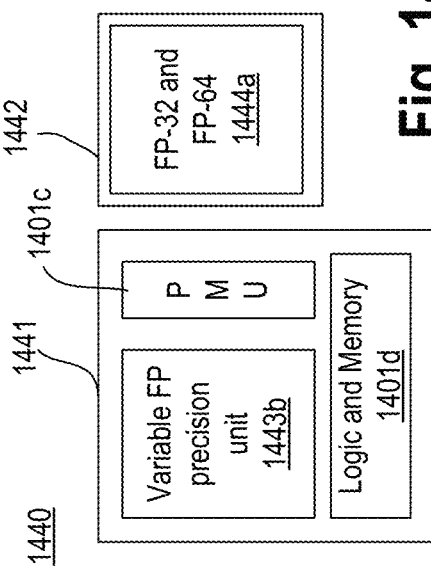
Fig. 14A
Fig. 14B
Fig. 14C
Fig. 14D

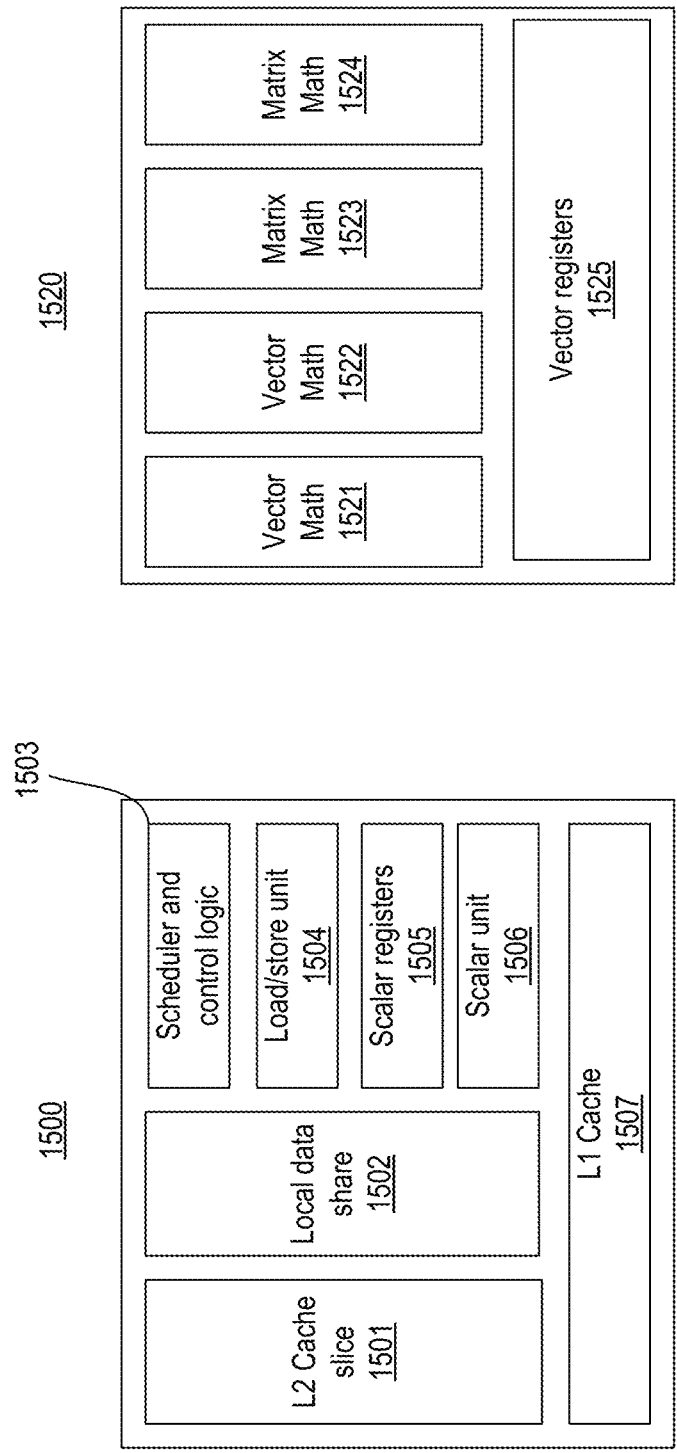

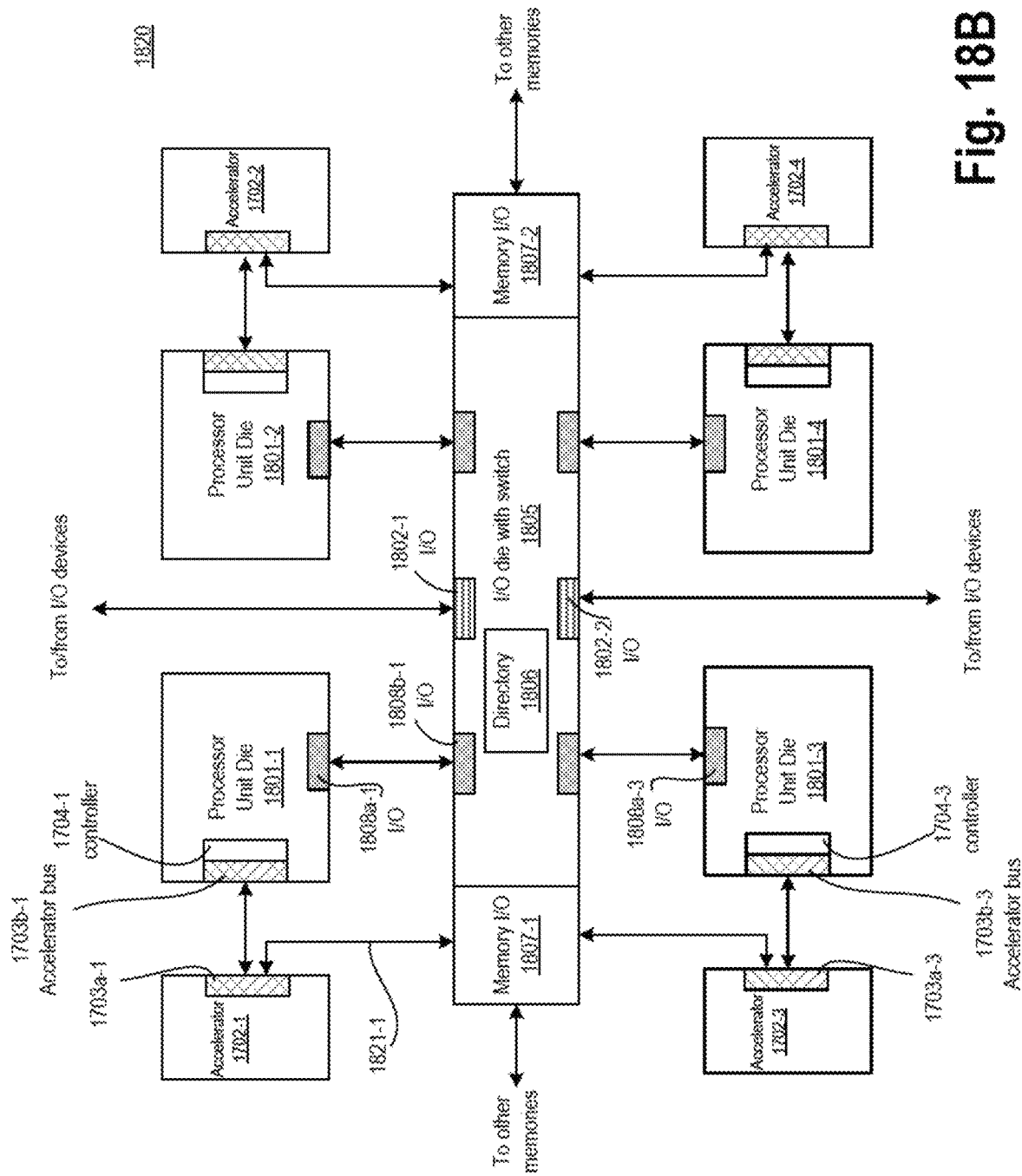

METHOD AND APPARATUS FOR MANAGING POWER IN A MULTI-DIMENSIONAL PACKAGING

CLAIM OF PRIORITY

This Application is a Continuation of, and claims the benefit of priority to, U.S. patent application Ser. No. 17/396,585, filed Aug. 6, 2021, which is incorporated by reference in its entirety for all purposes.

BACKGROUND

Artificial intelligence (AI) is a broad area of hardware and software computations where data is analyzed, classified, and then a decision is made regarding the data. For example, a model describing classification of data for a certain property or properties is trained over time with large amounts of data. The process of training a model requires large amounts of data and processing power to analyze the data. When a model is trained, weights or weight factors are modified based on outputs of the model. Once weights for a model are computed to a high confidence level (e.g., 95% or more) by repeatedly analyzing data and modifying weights to get the expected results, the model is deemed "trained". This trained model with fixed weights is then used to make decisions about new data. Training a model and then applying the trained model for new data is hardware intensive activity. There is a desire to reduce latency of computing the training model and using the training model, and to reduce the power consumption of such AI processor systems. AI processor systems are compute-heavy systems, which translates to heat generation by the processors. Thermal management of processor systems in a multi-dimensional packaging setup is challenging.

The background description provided here is for the purpose of generally presenting the context of the disclosure. Unless otherwise indicated here, the material described in this section is not prior art to the claims in this application and are not admitted being prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrates an architecture of a computational block comprising a compute die positioned on top of a memory die, in accordance with some embodiments.

FIG. 4B illustrates a three-dimensional view (3D) of a portion of the package of FIG. 4A showing one accelerator die next to the compute chiplet while HBMs on either sides of the compute chiplet, in accordance with some embodiments.

FIG. 4C illustrates a three-dimensional view (3D) of a portion of the package of FIG. 4A showing one accelerator die next to the compute chiplet while HBMs on the other side of the compute chiplet, in accordance with some embodiments.

FIG. 6B illustrates a 3D view of a portion of the package of FIG. 6A showing accelerator dies on either side of the compute die and HBM dies on either side of the accelerator dies, in accordance with some embodiments.

FIG. 6C illustrates a 3D view of a portion of the package of FIG. 6A showing accelerator die on one side of the compute die and HBM dies on another side of the compute die and the accelerator die, in accordance with some embodiments.

FIG. 8A illustrates a unit cell (or processing element (PE)) of an accelerator die which is configured to couple with a memory below it, in accordance with some embodiments.

FIG. 8B illustrates a unit cell of a memory which is configured to couple with a compute die above it, in accordance with some embodiments.

FIG. 8C illustrates a unit cell (or processing element (PE)) of an accelerator die with local memory, in accordance with some embodiments.

FIG. 8D illustrates an accelerator die with an array of PEs of FIG. 8B, in accordance with some embodiments.

FIGS. 14A-D illustrates various configurations of logic-on-logic stacking by separating different types of FUBs on different dies to manage thermals efficiently, in accordance with various embodiments.

FIGS. 15A-B illustrate two dies that split FUBs of a graphics processor unit (GPU) for fine grain 3D integration and to manage thermals efficiently, in accordance with some embodiments.

FIG. 18B illustrates a top view of an SoC or package architecture like FIG. 18A but with direct access to memory I/O for each accelerator chiplet, in accordance with some embodiments.

DETAILED DESCRIPTION

Figure 1:
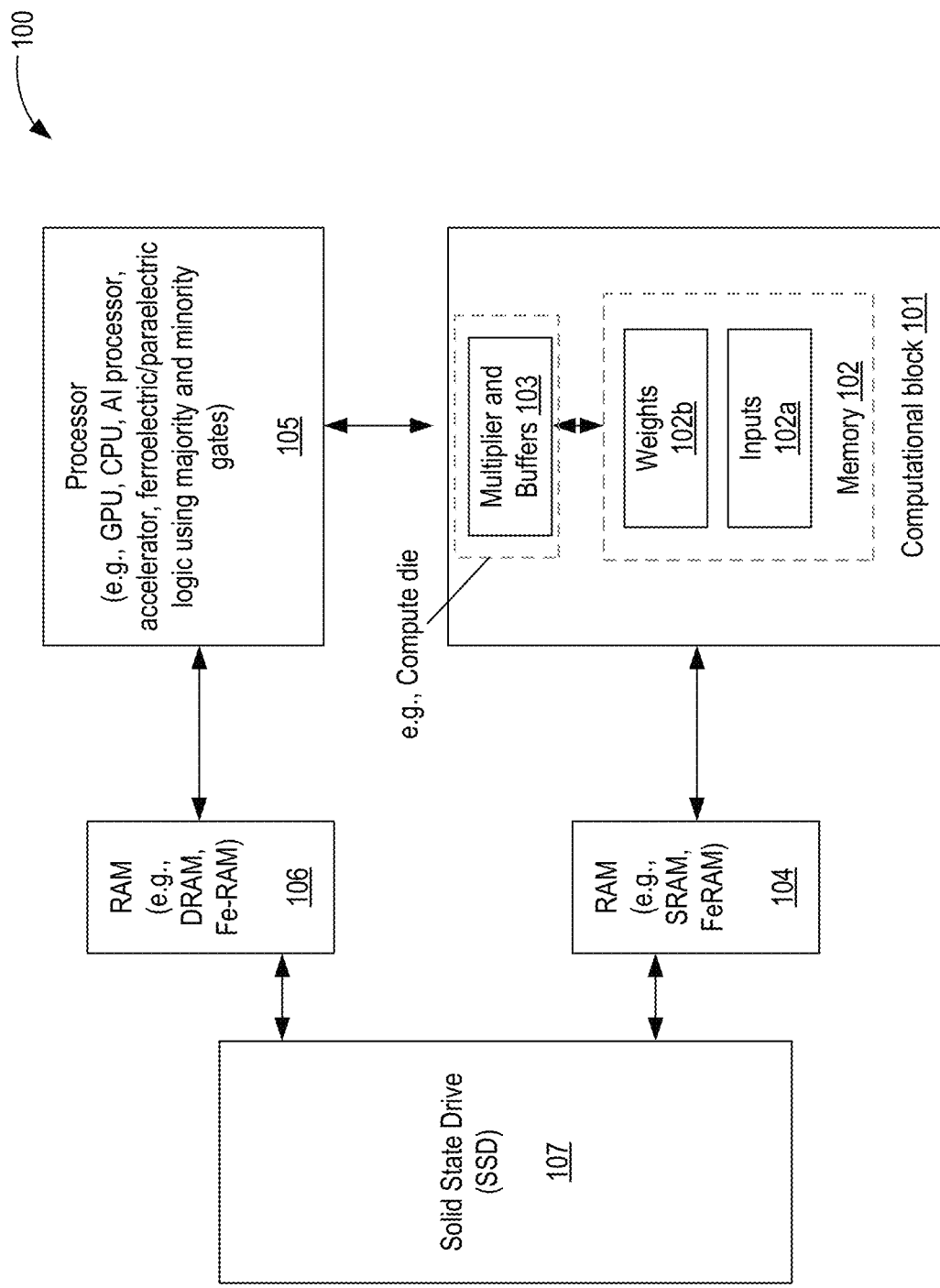
FIG. 1 illustrates a high-level architecture of an artificial intelligence (AI) machine comprising a compute die positioned on top of a memory die, in accordance with some embodiments.

Existing packaging technology that stacks a memory (e.g., a dynamic random-access memory (DRAM)) on top of a compute die results in limited I/O bandwidth due to periphery constraints. These periphery constraints come from vertical interconnect or pillars between a package substrate and the memory die. Further, having the compute die below the memory die causes thermal issues for the compute die because any heat sink is closer to the memory die and away from the compute die. Even with wafer-to-wafer bonded memory die and compute die in a package result in excessive perforation of the compute die because the compute die being stacked below the memory die. These perforations are caused by through-silicon vias (TSVs) that couple the C4 bumps adjacent to the compute die with the micro-bumps, Cu-to-Cu pillars, or hybrid Cu-to-Cu pillars between the memory die and the compute die.

When the memory die is positioned above the compute die in a wafer-to-wafer configuration, the TSV density is lined directly to die-to-die I/O counts, which is substantially like the number of micro-bumps (or Cu-to-Cu pillars) between the memory die and the compute die. Further, having the compute die below the memory die in a wafer-to-wafer coupled stack, causes thermal issues for the compute die because the heat sink is closer to the memory die and away from the compute die. Placing the memory as high bandwidth memory (HBM) on either side of the compute die does not resolve the bandwidth issues with stacked compute and memory dies because the bandwidth is limited by the periphery constraints from the number of I/Os on the sides of the HBMs and the compute die.

Some embodiments describe a packaging technology to improve performance of an AI processing system resulting in an ultra-high bandwidth AI processing system. In some embodiments, an integrated circuit package is provided which comprises: a substrate; a first die on the substrate, and a second die stacked over the first die. The first die can be a first logic die (e.g., a compute chip, a general-purpose processor, a graphics processor unit, etc.) while the second die can be a compute chiplet (e.g., an accelerator) comprising ferroelectric or paraelectric logic. The ferroelectric or paraelectric logic may include AND gates, OR gates, complex gates, majority, minority, and/or threshold gates, sequential logic. These basic building blocks for ferroelectric or paraelectric logic may provide specific functions of arithmetic logic unit, floating point logic unit, matrix units, vector units, multipliers, an accelerator, etc. In some embodiments, the second die can be an inference die that applies fixed weights for a trained model to an input data to generate an output. In some embodiments, the second die includes processing cores (or processing entities (PEs)) that have matrix multipliers, adders, buffers, etc. In some embodiments, first die comprises a high bandwidth memory (HBM). HBM may include a controller and memory arrays.

In some embodiments, the second die includes an application specific integrated circuit (ASIC) which can train the model by modifying the weights and also use the model on new data with fixed weights. In some embodiments, the memory comprises a DRAM. In some embodiments, the memory comprises an SRAM (static random-access memory). In some embodiments, the memory of the first die comprises MRAM (magnetic random-access memory). In some embodiments, the memory of the first die comprises Re-RAM (resistive random-access memory). In some embodiments, the substrate is an active interposer, and the first die is embedded in the active interposer. In some embodiments, the first die is an active interposer itself. In some embodiments, the integrated circuit package is a package for a system-on-chip (SoC). The SoC may include a compute die on top of a memory die; an HBM, and a processor die coupled to memory dies adjacent to it (e.g., on top of or on the side of the processor die). In some embodiments, the dies on a same plane (e.g., on a substrate or interposer) communicate with one another via a silicon bridge. The silicon bridge may be embedded in the substrate or interposer. In some embodiments, the SoC includes a solid-state memory die. As such, logic-on-logic stacking configuration is achieved.

Here, logic-on-logic stacking configuration generally refers to a three-dimensional (3D) packaging configuration or 2.5D packaging configuration of chip and/or chiplets. In a 3D logic-on-logic stacking configuration, the chip and/or chiplets (which may include a compute chiplet and/or memory) are stacked on top of one another along a vertical axis. In a 2.5D configuration, chip and/or chiplets (and/or memory) are stacked in a horizontal stack on a silicon interposer or substrate. In one example, the dies in a 2.5D configuration are packed into a single package in a single plane and both are flip-chipped on a silicon interposer. A logic-on-logic stacking configuration also encompasses logic and/or memory chips or logic embedded in a substrate or active interposer. The chips or chiplets along a horizontal plane may communicate with one another via an embedded silicon fabric (e.g., embedded in a substrate or interposer). Such an embedded silicon fabric is also referred to as a silicon bridge.

In some embodiments, in a logic-on-logic stacking configuration, a memory die is stacked on top of the compute chiplet. In some embodiments, the memory die is not stacked and a heat sink is directly placed over the compute chiplet. The memory die can be a DRAM, ferroelectric or paraelectric RAM (FeRAM), static random-access memory (SRAM), and other non-volatile memories such as flash, NAND, magnetic RAM (MRAM), Fe-SRAM, Fe-DRAM, and other resistive RAMs (Re-RAMs) etc.

To manage thermal issues associated with 3D or 2.5D packaging configurations, in some embodiments, the die or chip that executes more instructions per second, and thus generates more heat, is placed closer to the heat sink. Other dies (e.g., memory die or a low power chiplet) are placed under the higher power compute chip. In one example, a logic die (e.g., a compute die) is placed on top of a memory die or an input-output (I/O) die such that a heat sink is attached to the logic die to absorb the heat generated from the logic die. In some embodiments, the 3D or 2.5D packaging configurations are designed by arranging or designing chips or chiplets to have time distributed processing. In one such example, logic of chips or chiplets is divided up or segregated so that one chip in a 3D or 2.5D stacking arrangement is hot at a time.

There are many technical effects of the packaging technology of various embodiments. For example, by placing the memory die below the compute die, or by placing one or more memory dies on the side(s) of the compute die, AI system performance improves. The thermal issues related to having compute die being away from the heat sink are addressed by placing the memory below the compute die. Ultra-high bandwidth between the memory and compute dies is achieved by tight micro-bump spacing between the two dies. In existing systems, the bottom die is highly perforated by through-silicon vias (TSVs) to carry signals to and from active devices of the compute die to the active devises of the memory die via the micro-bumps. By placing the memory die below the compute die such that their active devices are positioned closer to one another (e.g., face-to-face), the perforation requirement for the bottom die is greatly reduced. This is because the relation between the number of micro-bumps and the TSVs is decoupled. For example, the die-to-die I/O density is independent of the TSV density. The TSVs though the memory die are used to provide power and ground, and signals from a device external to the package. Further, by using ferroelectric or paraelectric logic in compute chiplets allows for low power consumption, which further allows to manage thermals in a package. Designing an SoC with segregated chips of different functions that are managed by a power controller or an instruction scheduler to cause time distributed processing in the segregated or different chips allows for one chip or die to become hot at a time. As such, thermal of the package are managed efficiently yet providing the much-needed processing or computing power. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

It is pointed out that those elements of the figures having the same reference numbers (or names) as the elements of any other figure can operate or function in any manner like that described but are not limited to such.

FIG. 1 illustrates a high-level architecture of an artificial intelligence (AI) machine 100 comprising a compute die positioned on top of a memory die, in accordance with some embodiments. AI machine 100 comprises computational block 101 or processor having random-access memory (RAM) 102 and computational logic 103; first random-access memory 104 (e.g., static RAM (SRAM), ferroelectric or paraelectric RAM (FeRAM), ferroelectric or paraelectric static random-access memory (FeSRAM)), main processor 105, second random-access memory 106 (dynamic RAM (DRAM), FeRAM), and solid-state memory or drive (SSD) 107. In some embodiments, some or all components of AI machine 100 are packaged in a single package forming a system-on-chip (SoC). The SoC can be configured as a logic-on-logic configuration, which can be in a 3D configuration or a 2.5D configuration.

In some embodiments, computational block 101 is packaged in a single package and then coupled to processor 105 and memories 104, 106, and 107 on a printed circuit board (PCB). In some embodiments, computational block 101 is configured as a logic-on-logic configuration, which can be in a 3D configuration or a 2.5D configuration. In some embodiments, computational block 101 comprises a special purpose compute die 103 or microprocessor. For example, compute die 103 is a compute chiplet that performs a function of an accelerator or inference. In some embodiments, memory 102 is DRAM which forms a special memory/cache for the special purpose compute die 103. The DRAM can be embedded DRAM (eDRAM) such as 1T-1C (one transistor and one capacitor) based memories. In some embodiments, RAM 102 is ferroelectric or paraelectric RAM (Fe-RAM).

In some embodiments, compute die 103 is specialized for applications such as Artificial Intelligence, graph processing, and algorithms for data processing. In some embodiments, compute die 103 further has logic computational blocks, for example, for multipliers and buffers, a special data memory block (e.g., buffers) comprising DRAM, FeRAM, or a combination of them. In some embodiments, RAM 102 has weights and inputs stored in-order to improve the computational efficiency. The interconnects between processor 105 (also referred to as special purpose processor), first RAM 104 and compute die 103 are optimized for high bandwidth and low latency. The architecture of FIG. 1 allows efficient packaging to lower the energy, power, or cost and provides for ultra-high bandwidth between RAM 102 and compute chiplet 103 of computational 101.

In some embodiments, RAM 102 is partitioned to store input data (or data to be processed) 102a and weight factors 102b. In some embodiments, input data 102a is stored in a separate memory (e.g., a separate memory die) and weight factors 102b are stored in a separate memory (e.g., separate memory die).

In some embodiments, computational logic or compute chiplet 103 comprises matrix multiplier, adder, concatenation logic, buffers, and combinational logic. In various embodiments, compute chiplet 103 performs multiplication operation on inputs 102a and weights 102b. In some embodiments, weights 102b are fixed weights. For example, processor 105 (e.g., a graphics processor unit (GPU), field programmable grid array (FPGA) processor, application specific integrated circuit (ASIC) processor, digital signal processor (DSP), an AI processor, a central processing unit (CPU), or any other high-performance processor) computes the weights for a training model. Once the weights are computed, they are stored in memory 102b. In various embodiments, the input data, that is to be analyzed using a trained model, is processed by computational block 101 with computed weights 102b to generate an output (e.g., a classification result).

In some embodiments, first RAM 104 is ferroelectric or paraelectric based SRAM. For example, a six transistor (6T) SRAM bit-cells having ferroelectric or paraelectric transistors are used to implement a non-volatile FeSRAM. In some embodiments, SSD 107 comprises NAND flash cells. In some embodiments, SSD 107 comprises NOR flash cells. In some embodiments, SSD 107 comprises multi-threshold NAND flash cells.

In various embodiments, the non-volatility of FeRAM is used to introduce new features such as security, functional safety, and faster reboot time of architecture 100. The non-volatile FeRAM is a low power RAM that provides fast access to data and weights. FeRAM 104 can also serve as a fast storage for inference die 101 (or accelerator), which typically has low capacity and fast access requirements.

In various embodiments, the FeRAM (FeDRAM or FeSRAM) includes ferroelectric or paraelectric material. The ferroelectric or paraelectric (FE) material may be in a transistor gate stack or in a capacitor of the memory. The ferroelectric material can be any suitable low voltage FE material that allows the FE material to switch its state by a low voltage (e.g., 100 mV). Threshold in the FE material has a highly non-linear transfer function in the polarization vs. voltage response. The threshold is related a) non-linearity of switching transfer function, and b) to the squareness of the FE switching. The non-linearity of switching transfer function is the width of the derivative of the polarization vs. voltage plot. The squareness is defined by the ratio of the remnant polarization to the saturation polarization; perfect squareness will show a value of 1.

The squareness of the FE switching can be suitably manipulated with chemical substitution. For example, in PbTiO3 a P-E (polarization-electric field) square loop can be modified by La or Nb substitution to create an S-shaped loop. The shape can be systematically tuned to ultimately yield a non-linear dielectric. The squareness of the FE switching can also be changed by the granularity of a FE layer. A perfectly epitaxial, single crystalline FE layer will show higher squareness (e.g., ratio is closer to 1) compared to a poly crystalline FE. This perfect epitaxial can be accomplished using lattice matched bottom and top electrodes. In one example, BiFeO (BFO) can be epitaxially synthesized using a lattice matched SrRuO3 bottom electrode yielding P-E loops that are square. Progressive doping with La will reduce the squareness.

In some embodiments, the FE material comprises a perovskite of the type $ABO_3$, where 'A' and 'B' are two cations of different sizes, and 'O' is oxygen which is an anion that bonds to both the cations. Generally, the size of atoms of A is larger than the size of B atoms. In some embodiments, the perovskite can be doped (e.g., by La or Lanthanides). In various embodiments, when the FE material is a perovskite, the conductive oxides are of the type $AA'BB'O_3$. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability.

In some embodiments, the FE material comprises hexagonal ferroelectrics of the type h-RMnO3, where R is a rare earth element viz. cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides are of A2O3 (e.g., In2O3, Fe2O3) and ABO3 type, where 'A' is a rare earth element and B is Mn.

In some embodiments, the FE material is perovskite, which includes one or more of: La, Sr, Co, Sr, Ru, Y, Ba, Cu, Bi, Ca, and Ni. For example, metallic perovskites such as: (La,Sr)CoO3, SrRuO3, (La,Sr)MnO3, YBa2Cu3O7, Bi2Sr2CaCu2O8, LaNiO3, etc. may be used for FE material 213. Perovskites can be suitably doped to achieve a spontaneous distortion in a range of 0.3 to 2%. For example, for chemically substituted lead titanate such as Zr in Ti site; La, Nb in Ti site, the concentration of these substitutes is such that it achieves the spontaneous distortion in the range of 0.3-2%. For chemically substituted BiFeO3, BrCrO3, BuCoO3 class of materials, La or rate earth substitution into the Bi site can tune the spontaneous distortion. In some embodiments, the FE material is contacted with a conductive metal oxide that includes one of the conducting perovskite metallic oxides exemplified by: La—Sr—CoO3, SrRuO3, La—Sr—MnO3, YBa2Cu3O7, Bi2Sr2CaCu2O8, and LaNiO3.

In some embodiments, the FE material comprises a stack of layers including low voltage FE material between (or sandwiched between) conductive oxides. In various embodiments, when the FE material is a perovskite, the conductive oxides are of the type $AA'BB'O3$. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability. In various embodiments, when metallic perovskite is used for the FE material, the conductive oxides can include one or more of: $IrO_2$, $RuO_2$, $PdO_2$, $OsO_2$, or $ReO_3$. In some embodiments, the perovskite is doped with La or Lanthanides. In some embodiments, thin layer (e.g., approximately 10 nm) perovskite template conductors such as SrRuO3 coated on top of IrO2, RuO2, PdO2, PtO2, which have a non-perovskite structure but higher conductivity to provide a seed or template for the growth of pure perovskite ferroelectric at low temperatures, are used as the conductive oxides.

In some embodiments, ferroelectric materials are doped with s-orbital material (e.g., materials for first period, second period, and ionic third and fourth periods). In some embodiments, f-orbital materials (e.g., lanthanides) are doped to the ferroelectric material to make paraelectric material. Examples of room temperature paraelectric materials include: SrTiO3, Ba(x)Sr(y)TiO3 (where x is −0.05, and y is 0.95), HfZrO2, Hf—Si—O, La-substituted PbTiO3, PMN-PT based relaxor ferroelectrics.

In some embodiments, the FE material comprises one or more of: Hafnium (HD, Zirconium (Zr), Aluminum (Al), Silicon (Si), their oxides or their alloyed oxides. In some embodiments, the FE material includes one or more of: Al(1−x)Sc(x)N, Ga(1−x)Sc(x)N, Al(1−x)Y(x)N or Al(1−x−y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction. In some embodiments, the FE material includes one or more of: Bismuth ferrite (BFO), lead zirconate titanate (PZT), BFO with doping material, or PZT with doping material, wherein the doping material is one of Nb or La; and relaxor ferroelectrics such as PMN-PT.

In some embodiments, the FE material includes Bismuth ferrite (BFO), BFO with a doping material where in the doping material is one of Lanthanum, or any element from the lanthanide series of the periodic table. In some embodiments, FE material 213 includes lead zirconium titanate (PZT), or PZT with a doping material, wherein the doping material is one of La, Nb. In some embodiments, the FE material includes a relaxor ferro-electric includes one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), Barium Titanium-Barium Strontium Titanium (BT-BST).

In some embodiments, the FE material includes Hafnium oxides of the form, Hf1−x Ex Oy where E can be Al, Ca, Ce, Dy, er, Gd, Ge, La, Sc, Si, Sr, Sn, or Y. In some embodiments, the FE material includes Niobate type compounds LiNbO3, LiTaO3, Lithium iron Tantalum Oxy Fluoride, Barium Strontium Niobate, Sodium Barium Niobate, or Potassium strontium niobate.

In some embodiments, the FE material comprises multiple layers. For example, alternating layers of [Bi2O2]2+, and pseudo-perovskite blocks (Bi4Ti3O12 and related Aurivillius phases), with perovskite layers that are n octahedral layers in thickness can be used. In some embodiments, the FE material comprises organic material. For example, Polyvinylidene fluoride or polyvinylidene difluoride (PVDF).

In some embodiments, the FE material comprises hexagonal ferroelectrics of the type h-RMnO3, where R is a rare earth element viz. cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides are of A2O3 (e.g., In2O3, Fe2O3) and $ABO_3$ type, where 'A' is a rare earth element and B is Mn.

In some embodiments, the FE material comprises improper FE material. An improper ferroelectric is a ferroelectric where the primary order parameter is an order mechanism such as strain or buckling of the atomic order. Examples of improper FE material are LuFeO3 class of materials or super lattice of ferroelectric and paraelectric materials PbTiO3 (PTO) and SnTiO3 (STO), respectively, and LaAlO3 (LAO) and STO, respectively. For example, a super lattice of |PTO/STO|n or |LAO/STO|n, where 'n' is between 1 to 100. While various embodiments here are described with reference to ferroelectric material for storing the charge state, the embodiments are also applicable for paraelectric material. In some embodiments, paraelectric material includes one of: SrTiO3, Ba(x)Sr(y)TiO3 (where x is −0.5, and y is 0.95), HfZrO2, Hf—Si—O, La-substituted PbTiO3, or PMN-PT based relaxor ferroelectrics.

FIG. 2 illustrates architecture 200 (e.g., 101) of a computational block comprising a compute die positioned on top of a memory die, in accordance with some embodiments. The architecture of FIG. 2 illustrates an architecture for a special purpose compute die where RAM memory buffers for inputs and weights are split on die-1 and logic and optional memory buffers are split on die-2.

In some embodiments, memory die (e.g., Die 1) is positioned below compute die (e.g., Die 2) such that heat sink or thermal solution is adjacent to the compute die. In some embodiments, the memory die is embedded in an interposer. In some embodiments, the memory die behaves as an interposer in addition to its basic memory function. In some embodiments, the memory die is a high bandwidth memory (HBM) which comprises multiple dies of memories in a stack and a controller to control the read and write functions to the stack of memory dies. In some embodiments, the memory die comprises a first die 201 to store input data and a second die 202 to store weight factors. In some embodiments, the memory die is a single die that is partitioned such that first partition 201 of the memory die is used to store input data and second partition 202 of the memory die is used to store weights. In some embodiments, the memory die comprises DRAM. In some embodiments, the memory die comprises FE-SRAM or FE-DRAM. In some embodiments, the memory die comprises MRAM. In some embodiments, the memory die comprises SRAM. For example, memory partitions 201 and 202, or memory dies 201 and 202 include one or more of: DRAM, FE-SRAM, FE-DRAM, SRAM, and/or MRAM. In some embodiments, the input data stored in memory partition or die 201 is the data to be analyzed by a trained model with fixed weights stored in memory partition or die 202.

In some embodiments, the compute die comprises ferroelectric or paraelectric logic (e.g., majority, minority, and/or threshold gates) to implement matrix multiplier 203, logic 204, and temporary buffer 205. Matrix multiplier 203 performs multiplication operation on input data 'X' and weights 'W' to generate an output 'Y'. This output may be further processed by logic 204. In some embodiments, logic 204 performs: a threshold operation, pooling and drop out operations, and/or concatenation operations to complete the AI logic primitive functions.

In some embodiments, the output of logic 204 (e.g., processed output 'Y') is temporarily stored in buffer 205. In some embodiments, buffer 205 is memory such as one or more of: DRAM, Fe-SRAM, Fe-DRAM, MRAM, resistive RAM (Re-RAM) and/or SRAM. In some embodiments, buffer 205 is part of the memory die (e.g., Die 1). In some embodiments, buffer 205 performs the function of a re-timer. In some embodiments, the output of buffer 205 (e.g., processed output 'Y') is used to modify the weights in memory partition or die 202. In one such embodiment, computational block 200 not only operates as an inference circuitry, but also as a training circuitry to train a model. In some embodiments, matrix multiplier 203 includes an array of multiplier cells, wherein the DRAMs 201 and 202 include arrays of memory bit-cells, respectively, wherein each multiplier cell is coupled to a corresponding memory bit-cell of DRAM 201 and/or DRAM 202. In some embodiments, computational block 200 comprises an interconnect fabric coupled to the array of multiplier cells such that each multiplier cell is coupled to the interconnect fabric.

Architecture 200 provides reduced memory accesses for the compute die (e.g., die 2) by providing data locality for weights, inputs, and outputs. In one example, data from and to the AI computational blocks (e.g., matrix multiplier 203) is locally processed within a same packaging unit. Architecture 200 also segregates the memory and logic operations on to a memory die (e.g., Die 1) and a logic die (e.g., Die 2), respectively, allowing for optimized AI processing. Desegregated dies allow for improved yield of the dies. A high-capacity memory process for Die 1 allows reduction of power of the external interconnects to memory, reduces cost of integration, and results in a smaller footprint.

Figure 3A:
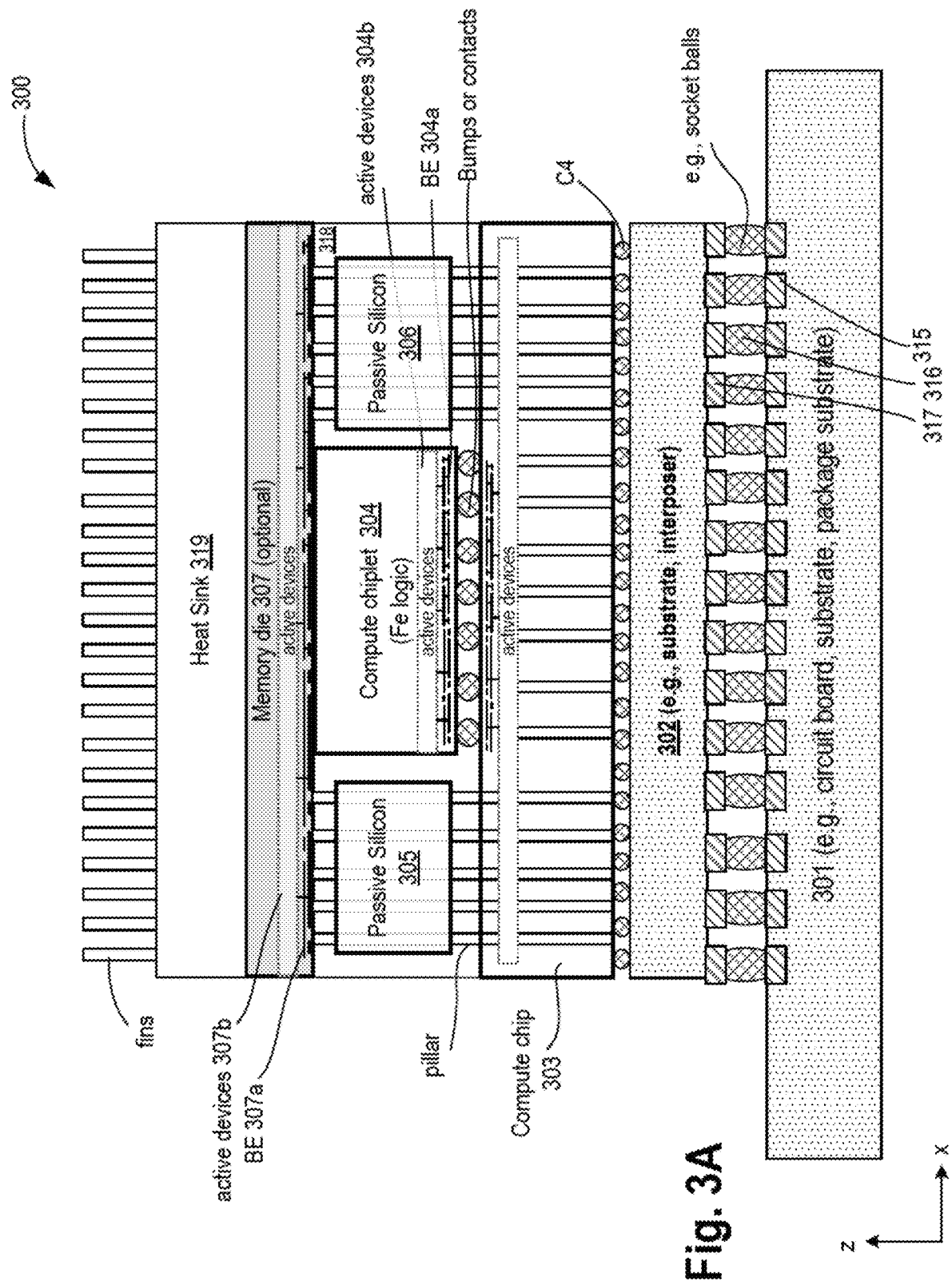
FIG. 3A illustrates a cross-section of a package where a compute chiplet having ferroelectric or paraelectric logic is positioned above a compute chip (e.g., a CPU or graphics processor unit (GPU) with face-to-face active transistors, in accordance with some embodiments.

FIG. 3A illustrates a cross-section of a package 300 (or package configuration 300) where a compute chiplet having ferroelectric or paraelectric logic is positioned above a compute chip (e.g., a CPU or graphics processor unit (GPU) with face-to-face active transistors, in accordance with some embodiments. In some embodiments, integrated circuitry (IC) package assembly is coupled to circuitry board 301. In some embodiments, circuit board 301 may be a Printed Circuit Board (PCB) composed of an electrically insulative material such as an epoxy laminate. For example, circuit board 301 may include electrically insulating layers composed of materials such as, phenolic cotton paper materials (e.g., FR-1), cotton paper and epoxy materials (e.g., FR-3), woven glass materials that are laminated together using an epoxy resin (FR-4), glass/paper with epoxy resin (e.g., CEM-1), glass composite with epoxy resin, woven glass cloth with polytetrafluoroethylene (e.g., PTFE CCL), or other poly tetrafluoroethylene-based prepreg material. In some embodiments, layer 301 is a package substrate and is part of the IC package assembly.

The IC package assembly may include substrate 302, compute die or compute die 303, compute chiplet die 304, and passive silicon 305 and 306. In some embodiments, a memory die 307 is placed over compute chiplet 304. In some embodiments, compute chiplet 304 comprises ferroelectric or paraelectric logic (e.g., majority, minority, and/or threshold gates) to implement matrix multiplier 203, logic 204, temporary buffer 205, vector matrix, floating point unit, and/or any specific functional unit block (FUB). In some embodiments, heat sink 319 is placed over compute chiplet 304. Package configuration 300 is 3D configuration where compute chiplet 304 is above compute chip 303. Package configuration 300 is also a 2.5D configuration where passive silicon 305 and 306 are on either sides of compute chipet 304. In some embodiments, passive silicon 305 and 306 includes passive devices such as capacitors, resistors, inductors, antennas, etc., for use by compute chip 303 and/or compute chiplet 304. In some embodiments, memory die 307 is formed over compute chiplet 304. Here, the active devices of compute chip 303 are closer to compute chiplet 304 than substrate or interposer 302. In some embodiments, the pillar interconnects (e.g., copper-to-copper bonded interconnects or through silicon vias (TSVs)) pass through passive silicon to allow connection between compute chip 303 and memory die 307. In some embodiments, where there is not memory die 307, these TSVs may not pass through passive silicon. The various pillars here can deliver power and ground lines, and signal lines to compute chiplet 304 and/or memory die 307. Power and ground supplies on the power and ground lines are provided via C4 bumps, in accordance with some embodiments.

In some embodiments, memory die 307 is below or under compute chip 303. In some embodiments, compute die 303 is coupled to memory die 307 by pillar interconnects such as copper pillars. Memory die 307 communicates with compute die 304 through these pillar interconnects. In some embodiments, the pillar interconnects are embedded in a dielectric 318 (or encapsulant 318).

Package substrate 302 may be a coreless substrate. For example, package substrate 302 may be a "bumpless" build-up layer (BBUL) assembly that includes a plurality of "bumpless" build-up layers. Here, the term "bumpless build-up layers" generally refers to layers of substrate and components embedded therein without the use of solder or other attaching means that may be considered "bumps." However, the various embodiments are not limited to BBUL type connections between die and substrate but can be used for any suitable flip chip substrates. The one or more build-up layers may have material properties that may be altered and/or optimized for reliability, warpage reduction, etc. Package substrate 302 may be composed of a polymer, ceramic, glass, or semiconductor material. Package substrate 302 may be a conventional cored substrate and/or an interposer. Package substrate 302 includes active and/or passive devices embedded therein.

The upper side of package substrate 302 is coupled to compute die 303 via C4 bumps. The lower opposite side of package substrate 302 is coupled to circuit board 301 by package interconnects 317. Package interconnects 316 may couple electrical routing features 317 disposed on the second side of package substrate 302 to corresponding electrical routing features 315 on circuit board 301.

Here, the term "C4" bumps (also known as controlled collapse chip connection) provides a mechanism for interconnecting semiconductor devices. These bumps are typically used in flip-chip packaging technology but are not limited to that technology.

Package substrate 302 may have electrical routing features formed therein to route electrical signals between compute die 303 (and/or memory die 307) and circuit board 301 and/or other electrical components external to the IC package assembly. Package interconnects 316 and die interconnects 310 include any of a wide variety of suitable structures and/or materials including, for example, bumps, pillars or balls formed using metals, alloys, solderable material, or their combinations. Electrical routing features 315 may be arranged in a ball grid array ("BGA") or other configuration. Compute die 303 and/or memory die 307 includes two or more dies embedded in encapsulant 318. Here, heat sink 319 and associated fins are coupled to memory die 307.

In this example, compute die 303 is coupled to memory die 307 in a front-to-back configuration (e.g., the "front" or "active" side of memory die 307 is coupled to the "back" or "inactive" of compute die 303). Here, the backend (BE) interconnect layers 304a and active device 304b of compute chiplet 304 are closer to the C4 bumps than to memory die 307. The BE interconnect layers 307a and active devices 307b (e.g., transistors) of memory die 307 are closer to compute die 303 than heat sink 319.

In one example, the stacking of memory die 307 on top of compute die 303 is not wafer-to-wafer bonding. This is evident from the different surface areas of the two dies being different. Pillars such as TSVs are used to communicate between circuit board 301, compute die 303, and memory die 307. In some examples, signals from compute die 303 are routed via C4 bumps and through substrate 302 and pillars before they reach active devices 304b via BE 304a of memory die 307. This long route along with limited number of pillars and C4 bumps limits the overall bandwidth of the AI system. While heat sink 319 is shown as a thermal solution, other thermal solutions may also be used. For example, fan, liquid cooling, etc. may be used in addition to or instead of heat sink 319.

Figure 3B:
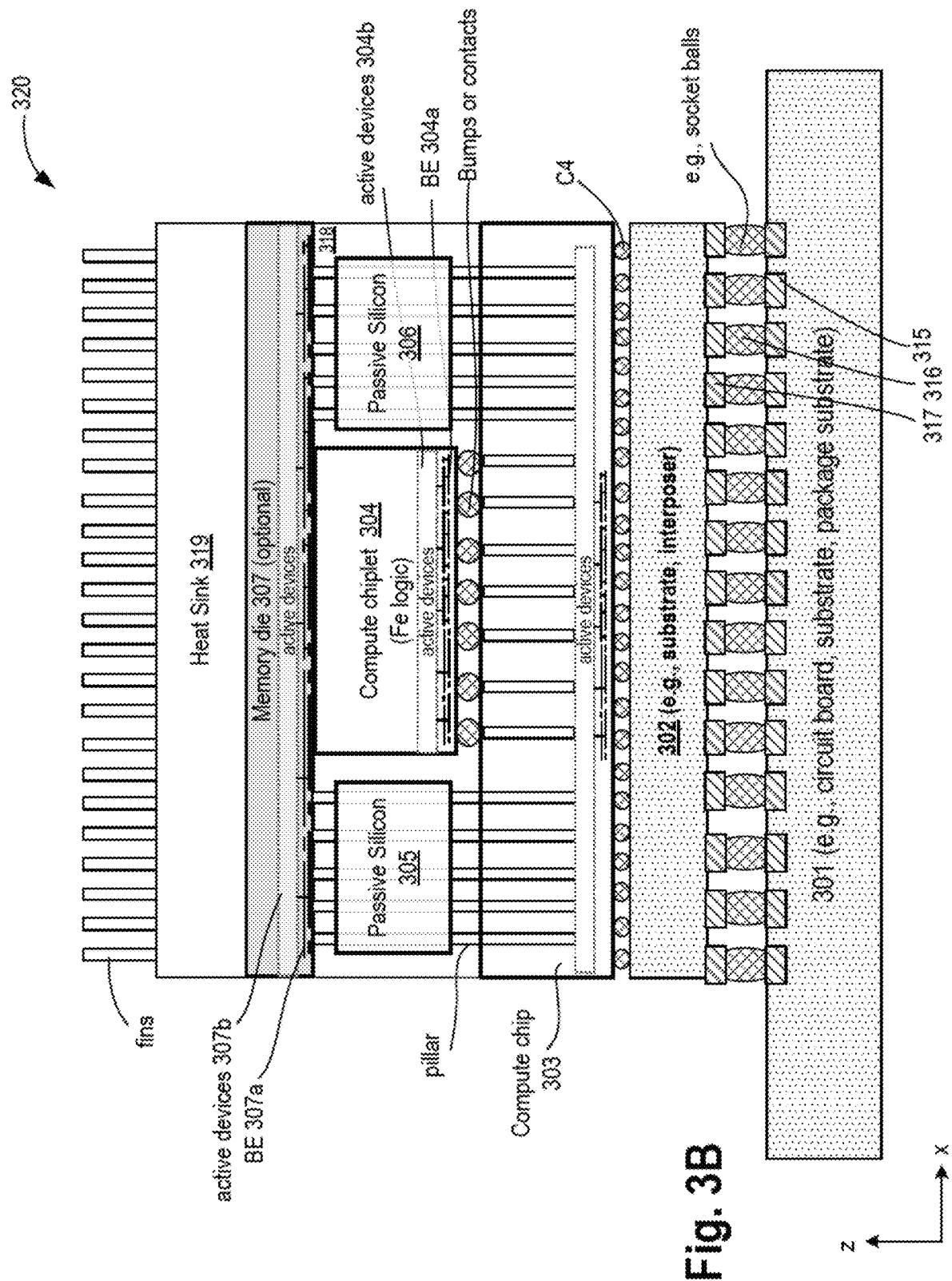
FIG. 3B illustrates a cross-section of a package where a compute chiplet having ferroelectric or paraelectric logic is positioned above a compute chip (e.g., a CPU or GPU) with face-to-back active transistors, in accordance with some embodiments.

FIG. 3B illustrates a cross-section of a package 320 (or package configuration 300) where a compute chiplet having ferroelectric or paraelectric logic is positioned above a compute chip (e.g., a CPU or graphics processor unit (GPU) with face-to-back active transistors, in accordance with some embodiments. Package 320 is like package 300 but for the location of the active devices in the bottom die 202. Here, the active devices of compute chip 303 are closer to substrate or interposer 302 than compute chiplet 304. In some embodiments, power and ground come through the C4 bumps and routed to the pillars through pillar layers (or through TSVs).

In some embodiments one or multiple dies could use buried power rails (BPRs) to deliver the power through the C4 bumps using front-side power delivery network (PDN) or back side PDN. In various embodiments, back-side power delivery network (PDN) with BPRs is highly useful for 3D packaging to allow for advanced pitch scaling of microbumps, thereby enabling higher bandwidth and low power connections between the two dies.

Figure 4A:
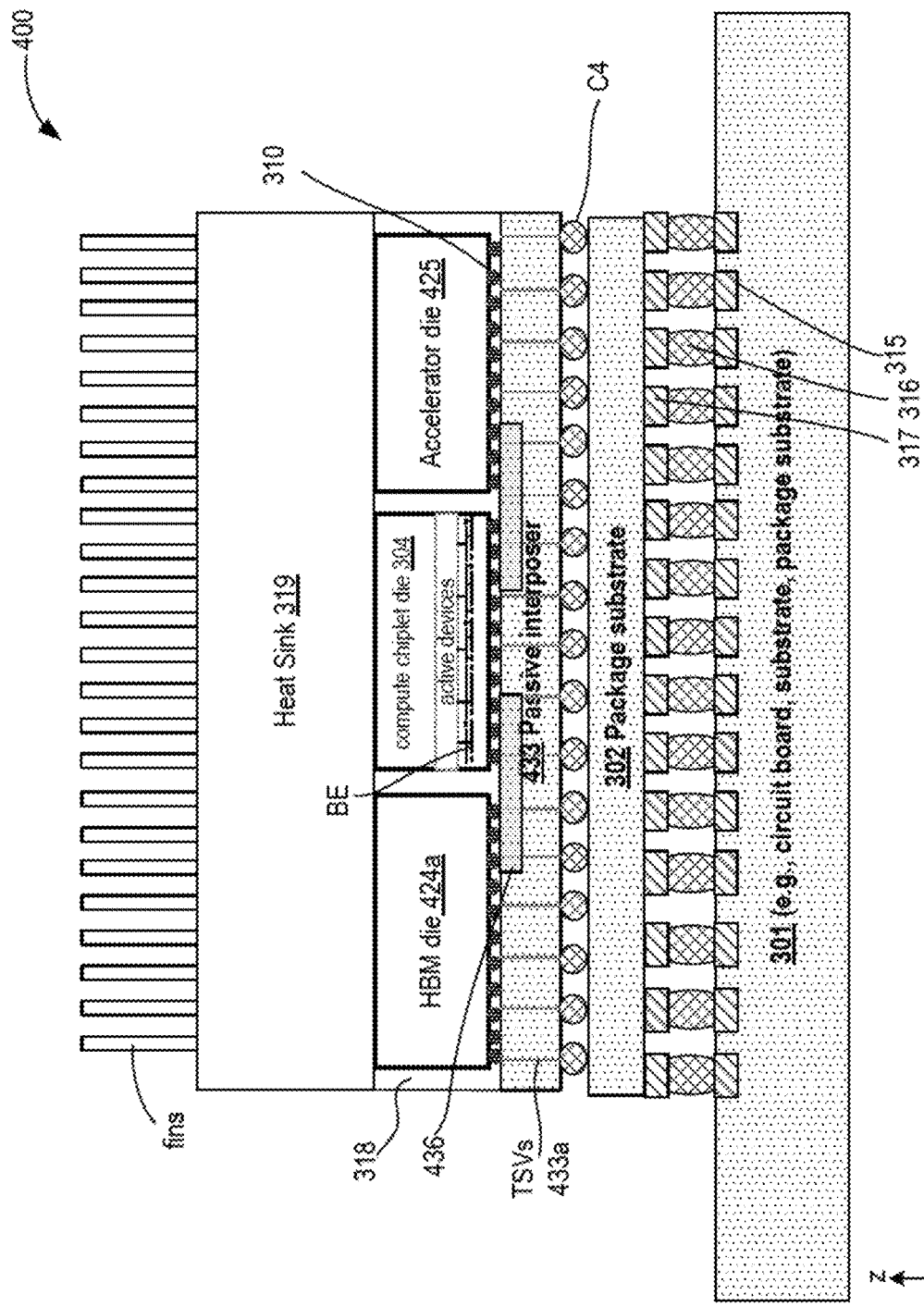
FIG. 4A illustrates a cross-section of a package where high bandwidth memory (HBM) is on one side of the compute chiplet die and an accelerator is on another side of the compute chiplet die, in accordance with some embodiments.

FIG. 4A illustrates a cross-section of package 400 (or package configuration 400) where high bandwidth memory (HBM) is on one side of the compute chiplet die and an accelerator is on another side of the compute chiplet die, in accordance with some embodiments. In this case, memory dies are not stacked over compute chiplet 304 but placed adjacent or laterally next to compute die 304 as HBM 424a and accelerator 425. The bandwidth of this configuration is limited by periphery constraints in region 426 between bumps 310 of HBM 424a and compute die 304, and between bumps 310 of accelerator 425 and compute die 304. In some embodiments, region 426 comprises a silicon bridge. The silicon bridge may be embedded in interposer 433. In some embodiments, interposer 433 is a passive interposer with the silicon bridge. In some embodiments, interposer 433 is an active interposer with the silicon bridge and other active devices (e.g., transistors for logic circuits, or memory). A person skilled in the art would appreciate that a silicon bridge is a multichip packaging architecture that enables high die-to-die interconnect density and corresponding applications. In various embodiments, when interposer is absent and dies 424a, 304, and 425 are on package substrate 302, then silicon bridge 436 is embedded in package substrate 302 to allow for efficient communication between dies 424a, 304, and 425.

In some embodiments, interposer 433 is over substrate 302. Connections between substrate 302 and HDB die 424a, accelerator die 425, and compute chiplet die 304 is via TSVs 433a. In some embodiments, package substrate 302 is removed and is replaced with interposer 433. Package configuration 400 is an example of a 2.5D configuration since logic chips (e.g., compute die 304 and accelerator die 425) are adjacent (side-by-side) rather than in a vertical stack and connected to one another via silicon bridge 436. In various embodiments, heat sink is placed on top of compute chiplet die 304, accelerator die 425, and HBM die 424a. In some embodiments, compute die 304 is a general-purpose processor while accelerator die 425 is a chiplet that includes ferroelectric or paraelectric logic (e.g., majority, minority and/or threshold gates). In some embodiments, compute die 304 also includes ferroelectric or paraelectric logic. In some embodiments, HBM die 424a comprises DRAM, FeRAM, SRAM, or any other sort of volatile or non-volatile memory. In some embodiments, accelerator die 425 is associated with a memory die as illustrated with reference to FIGS. 8A-B, and FIGS. 9A-B. In some embodiments, accelerator die 425 has a plurality of processing elements and its own memory as illustrated with reference to FIGS. 8C-D.

FIG. 4B illustrates a three-dimensional (3D) view 400 of a portion of the package of FIG. 4A showing one accelerator die next to the compute chiplet while HBMs on either sides of the compute chiplet, in accordance with some embodiments. In some embodiments, multiple HBMs (e.g., HBM 424a, 424b, and 424c) are coupled to compute chiplet die 304 via silicon bridge 436. In various embodiments, accelerator 425 is also coupled to compute die 304 though silicon bridge 436. In this example, the HBM is on either sides of compute chiplet die 304.

FIG. 4C illustrates 3D view 430 of a portion of the package of FIG. 4A showing one accelerator die next to the compute chiplet while HBMs on the other side of the compute chiplet, in accordance with some embodiments. In this case, the multiple HBMs (e.g., HBM 424a and 424b) are on one side of compute chiplet die 304 while accelerator 425 is one the other side of compute chiplet die 304. Like in FIG. 4A-B, multiple HBMs (e.g., HBM 424a, 424b) are coupled to compute chiplet die 304 via silicon bridge 436. In various embodiments, accelerator 425 is also coupled to compute die 304 though silicon bridge 436.

Figure 5A:
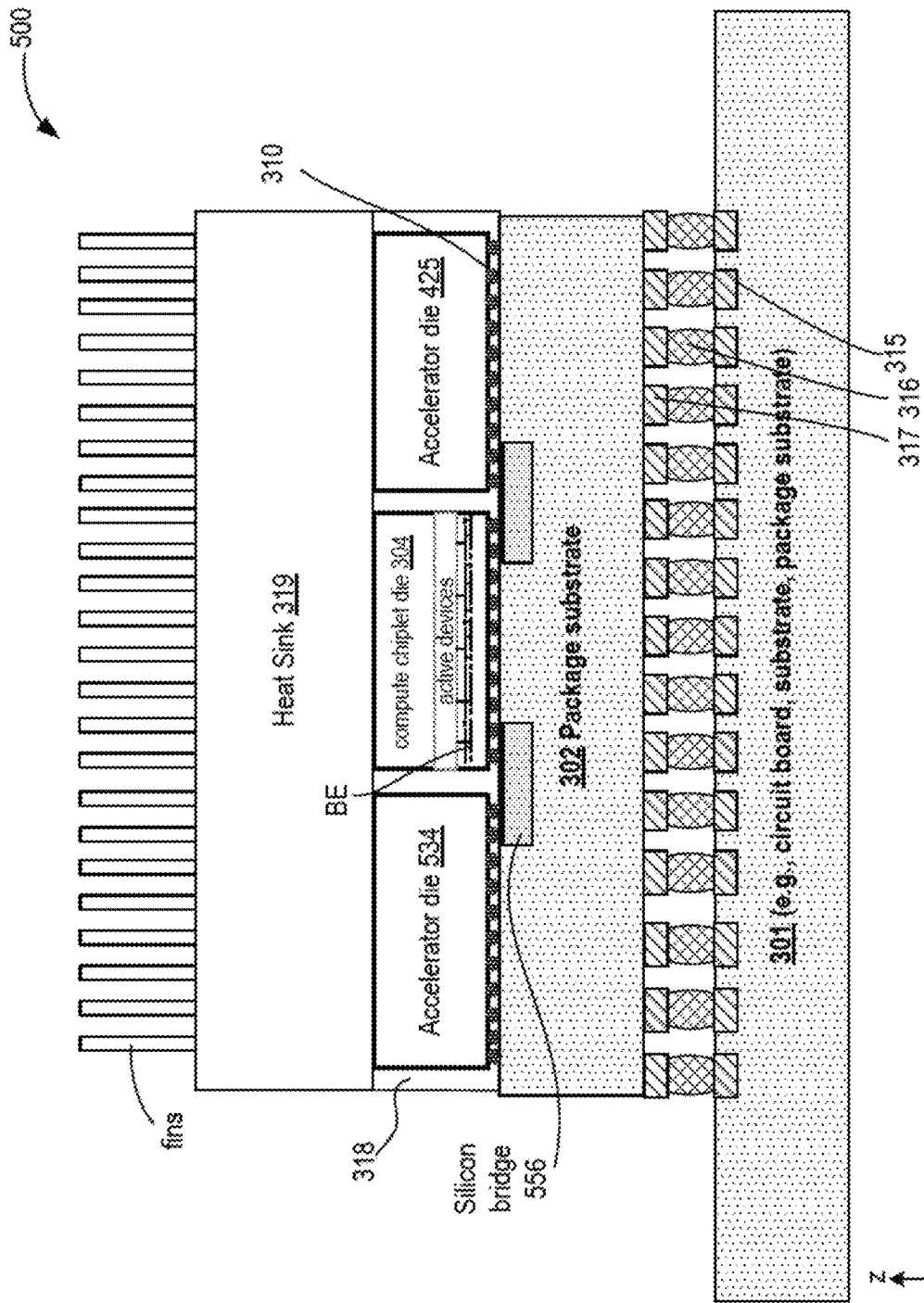
FIG. 5A illustrates a cross-section of a package where accelerator dies are on either sides of the compute chiplet die, in accordance with some embodiments.

FIG. 5A illustrates a cross-section of a package 500 (or package configuration 500) where accelerator dies are on either sides of the compute chiplet die, in accordance with some embodiments. Compared to FIG. 4A, here HBM 424a is replaced with accelerator die 534. In various embodiments accelerator die 534 is coupled to compute chiplet die 304 via silicon bridge 556, which is embedded in package substrate 302. In some embodiments, package substrate 302 can be replaced with a passive or active interposer. In some embodiments, package configuration 500 is a 2.5D configuration where accelerator die 534, compute die, and accelerator die 425 are on a same place and coupled to package substrate 302 via silicon bridge 556.

Figure 5B:
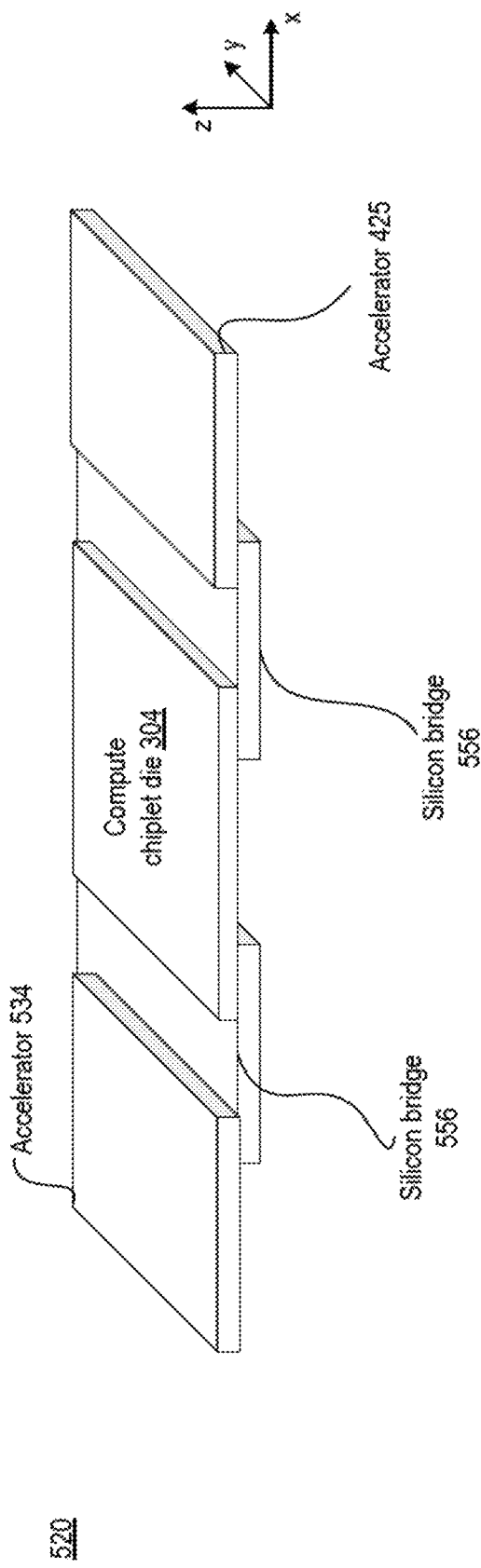
FIG. 5B illustrates a 3D view of a portion of the package of FIG. 5A showing accelerator dies on either sides of the compute chiplet, in accordance with some embodiments.

FIG. 5B illustrates 3D view 520 of a portion of the package of FIG. 5A showing accelerator dies on either sides of the compute chiplet, in accordance with some embodiments. View 320 illustrates package configuration 500 where compute die 304 is in the center and accelerator dies 534 and 425 are on either sides of compute die 304. In various embodiments, accelerator dies 534 and 425 are coupled to compute die 304 via silicon bridge 556.

Figure 5C:
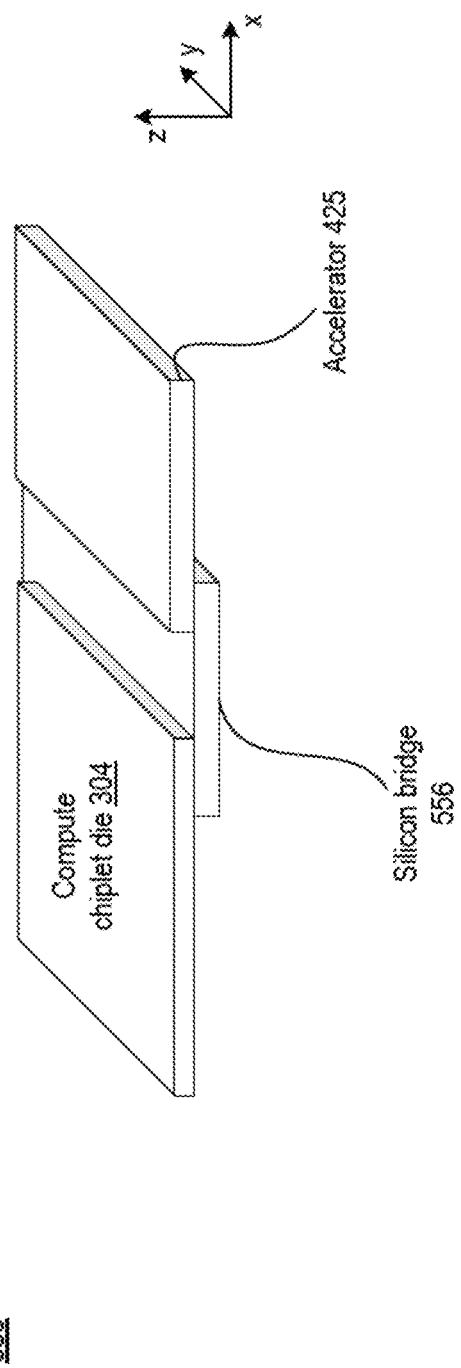
FIG. 5C illustrates a 3D view of a modified version of the package of FIG. 5A showing one compute chiplet communicatively coupled to one accelerator die, in accordance with some embodiments.

FIG. 5C illustrates 3D view 530 of a modified version of the package of FIG. 5A showing one compute chiplet communicatively coupled to one accelerator die, in accordance with some embodiments. In some embodiments, package configuration 500 has one compute chiplet die 304 coupled to one accelerator die 425 via silicon bridge 556. This arrangement is also a 2.5D arrangement and provides a lower performance configuration compared to package configuration 500. As discussed herein, a design tool is provided which identifies what functional logic blocks can be separated from a compute die and placed in a separate die (e.g., an accelerator die) to achieve optimal thermals (e.g., least amount of heat generated while achieving high performance (e.g., high speed of operation)).

Figure 6A:
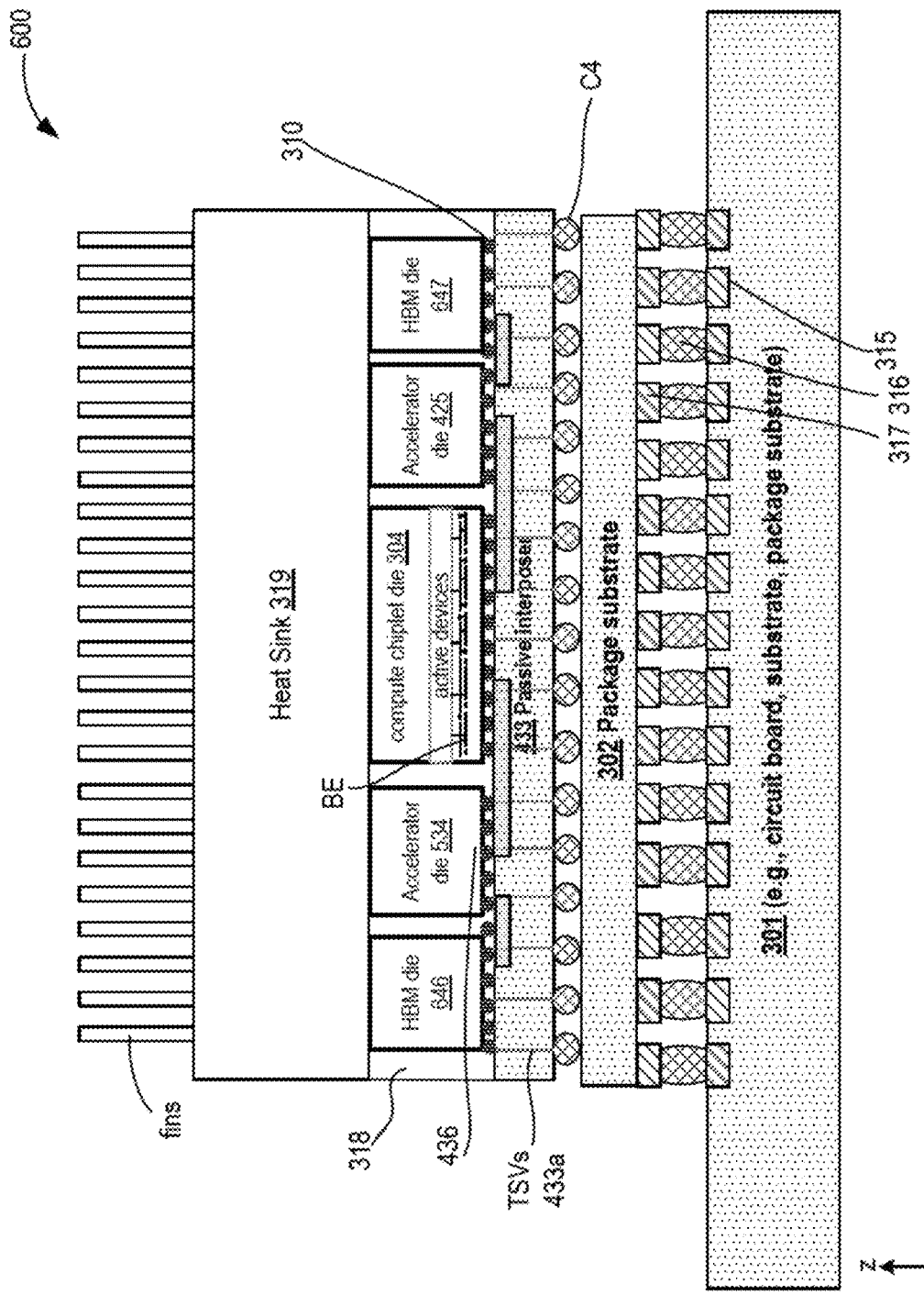
FIG. 6A illustrates a cross-section of a package with a compute die in the center, accelerator die(s) immediately next to the compute die, and HBMs next to the accelerator dies along a same plane, in accordance with some embodiments.

FIG. 6A illustrates a cross-section of a package 600 (also referred to as package configuration 600) with a compute die in the center, accelerator die(s) immediately next to the compute die, and HBMs next to the accelerator dies along a same plane, in accordance with some embodiments. Compared to package configuration 500 HBM dies are also placed in the same 2.5D configuration. In this example, HBM dies 646 and 647 are placed on the periphery and adjacent to accelerator dies 534 and 425, respectively. In various embodiments, when interposer 433 is absent and dies 646, 534, 304, 425, and 647 are on package substrate 302, then silicon bridge 436 is embedded in package substrate 302 to allow for efficient communication between dies 646, 534, 304, 425, and 647.

FIG. 6B illustrates a 3D view of a portion of the package of FIG. 6A showing accelerator dies on either sides of the compute die and HBM dies on either sides of the accelerator dies, in accordance with some embodiments.

FIG. 6C illustrates a 3D view of a portion of the package of FIG. 6A showing accelerator die on one side of the compute die and HBM dies on another side of the compute die and the accelerator die, in accordance with some embodiments.

As discussed herein, any of the dies can have ferroelectric or paraelectric logic and/or ferroelectric or paraelectric memory. The ferroelectric or paraelectric logic can include logic comprising majority, minority, and/or threshold gates. For example, arithmetic and control circuitry are formed of ferroelectric or paraelectric majority, minority, and/or threshold gates. In some embodiments, ferroelectric or paraelectric memory can be replaced with other memory technologies such as magnetic RAM (MRAM). In various embodiments, ferroelectric or paraelectric logic and/or ferroelectric or paraelectric memory can be either packaged as 2.5D configuration, 3D configuration, on-package configuration, or embedded in as part of a system-on-chip. In some embodiments, the compute chiplet may be connected to a HBM via silicon bridge in a 2.5D configuration. In some embodiments, compute chiplet is placed over an HBM in a 3D configuration. In some embodiments, compute chiplet is coupled to an HBM via an I/O die. In some embodiments, the I/O die is a programmable crossbar circuit that allows multiple compute dies, accelerator dies, and memory dies to communicate with one another. In some embodiments, the 3D and/or 2.5 configuration also includes a field programmable grid array (FPGA). The logic of the FPGA can be implemented using traditional CMOS or ferroelectric or paraelectric logic of various embodiments.

Figure 7A:
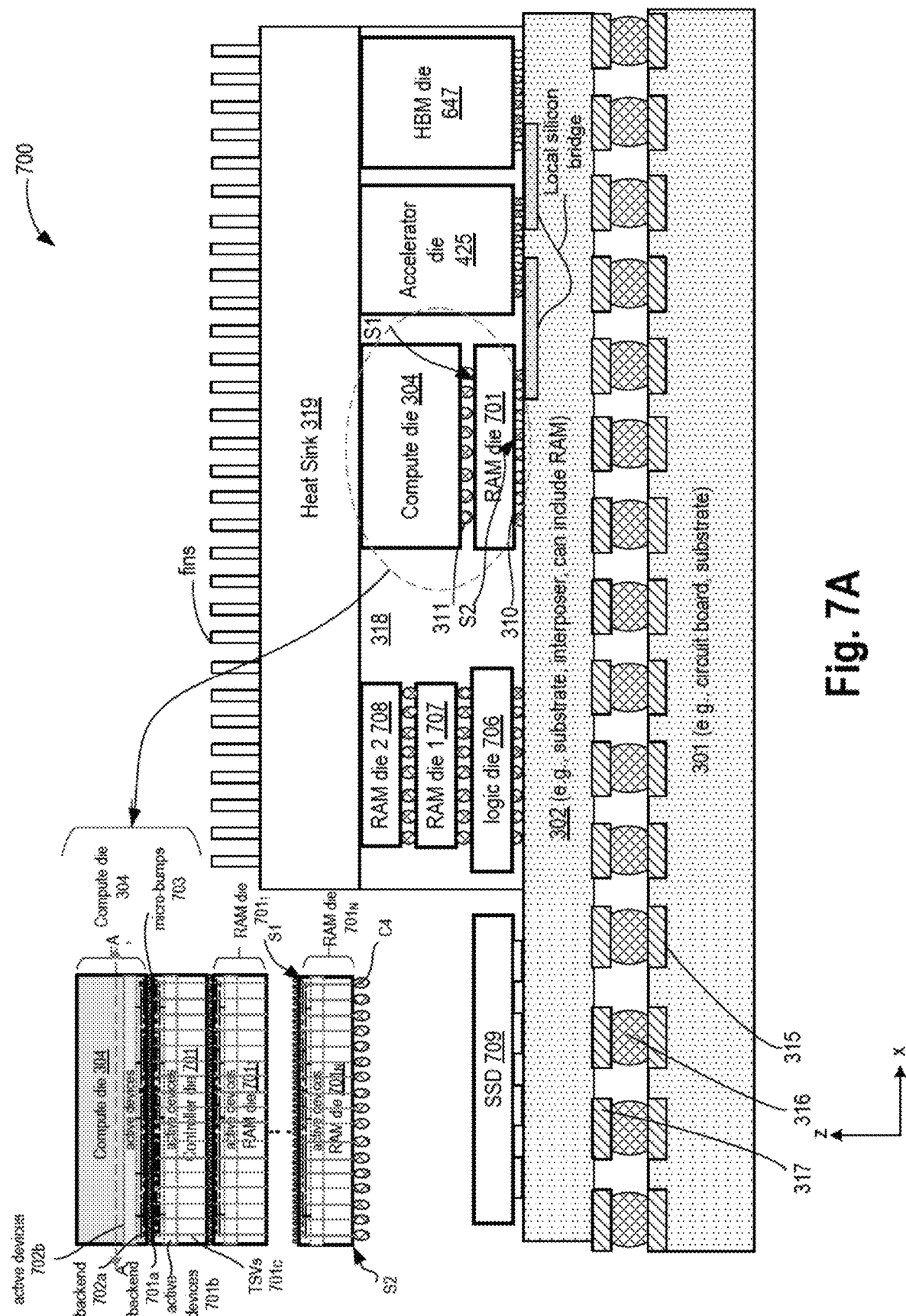
FIG. 7A illustrates a cross-section of package comprising an AI machine, which includes a system-on-chip (SoC) having a computational block, which includes a compute die over a random-access memory (RAM) e.g., ferroelectric or paraelectric RAM (Fe-RAM), and accelerator die on one side of the computation block and HBM die adjacent to the accelerator die, in accordance with some embodiments.

FIG. 7A illustrates a cross-section of package 700 (or package configuration 700) comprising an AI machine, which includes a system-on-chip (SoC) having a computational block, which includes a compute die over a random-access memory (RAM) e.g., ferroelectric or paraelectric RAM (Fe-RAM), and accelerator die on one side of the computation block and HBM die adjacent to the accelerator die, in accordance with some embodiments.

Package 700 comprises processor die 706 coupled to substrate or interposer 302. Two or more memory dies 707 (e.g., memory 104) and 708 (e.g., memory 106) are stacked on processor die 506. Processor die 706 (e.g., 105) can be any one of: central processing unit (CPU), graphics processor unit (GPU), DSP, field programmable grid array (FPGA) processor, or application specific integrated circuit (ASIC) processor. Memory (RAM) dies 707 and 708 may comprise DRAM, embedded DRAM, Fe-RAM, Fe-SRAM, Fe-DRAM, SRAM, MRAM, Re-RAM or a combination of them. In some embodiments, RAM dies 707 and 708 may include HBM. In some embodiments, one of memories 104 and 106 is implemented as HBM.

In some embodiments, package configuration 700 includes a stack of compute die 304 and memory 701 where compute die is stacked on top of memory die 701. In some embodiments, the stacked configuration of compute die 304 and memory die 701 comprises multiple logic dies and memory dies stacked as shown in a zoomed version. This particular topology enhances the overall performance of the AI system by providing ultra-high bandwidth compared to package configurations where Here memory die 701 (e.g., DRAM, Fe-RAM, MRAM, SRAM) is positioned under compute die 304 and the two dies are wafer-to-wafer bonded via micro-bumps 703, copper-to-copper (Cu-to-Cu) pillars, hybrid Cu-to-Cu pillars, wire bond, flip-chip ball grid array routing, chip-on-wafer substrate (COWOS), or embedded multi-die interconnect bridge. In some embodiments, Cu-to-Cu pillars are fabricated with copper pillars formed on each wafer substrate which is to be bonded together. In various embodiments, a conductive material (e.g., Nickel) is coated between the copper pillars of the two wafer dies.

In some embodiments, dies 701 and 304 are bonded such that their respective BE layers and active devices of the two dies 701 and 304 face one another. As such, transistors between the two dies are closest where the die-to-die bonding happens. This configuration reduces the latency because the active devices of the two dies are closer.

In some embodiments, TSVs 701c are decoupled from micro-bumps (or Cu-2-Cu pillars). For example, the number of TSVs 701c are not directly related to the number of micro-bumps 703. As such, memory die TSV perforation requirement is minimized as die-to-die I/O density is independent of TSV density. The ultra-high bandwidth also comes from the tight micro-bump spacing, in accordance with some embodiments. In some embodiments, the micro-bump spacing 703 is tighter than traditional micro-bump spacing because memory 701 is not perforated at the same pitch as in compute die 303 of FIG. 3A. For example, in FIG. 3A micro-bump density is dependent on TSV pitch and overall signal routing design of compute die 303. Package configuration 700 has no such limitation, in accordance with some embodiments.

In some embodiments, memory die 701 is perforated to form few TSVs 701c that carry DC signals such as power and ground from substrate 302 to compute die 304. External signals (e.g., external to package 700) can also be routed to compute die 304 via TSVs 701c. In some embodiments, the bulk of all communication between compute die 304 and memory die 701 takes place through micro-bumps 703 or face-to-face interconnects. In various embodiments, there is no perforation of compute die 304 because TSVs may not be needed. Even if TSVs were used to route to any additional die (not shown) on top of compute die 304, those number of TSVs are not related to the number of micro-bumps 703 in that they may not have to be the same number. In various embodiments, TSVs 701c pass through active region or layers (e.g., transistor regions) of memory die 701.

In various embodiments, compute die 304 comprises logic portions of an inference die. The logic may be implemented using ferroelectric or paraelectric logic such as majority, minority, and/or threshold gates. An inference die or chip is used to apply inputs and fixed weights associated with a trained model to generate an output. By separating the memory 701 associated with inference die 304, the AI performance increases. Further, such topology allows for better use of thermal solution such as heat sink 319, which radiates heat away from the power consuming source, inference die 304. Memory for die 701 can be one or more of: Fe-SRAM, Fe-DRAM, SRAM, MRAM, resistance RAM (Re-RAM), embedded DRAM (e.g., 1T-1C based memory), or a combination of them. Using Fe-SRAM, MRAM, or Re-RAM allows for low power and high-speed memory operation. This allows for placing memory die 701 below compute die 402 to use the thermal solution more efficiently for compute die 304. In some embodiments, memory die 701 is a high bandwidth memory (HBM).

In some embodiments, compute die 304 is an application specific circuit (ASIC), a processor, or some combination of such functions. In some embodiments, one or both of memory die 701 and compute die 304 may be embedded in encapsulant (not shown). In some embodiments, encapsulant can be any suitable material, such as epoxy-based build-up substrate, other dielectric/organic materials, resins, epoxies, polymer adhesives, silicones, acrylics, polyimides, cyanate esters, thermoplastics, and/or thermosets.

The memory circuitry of some embodiments can have active and passive devices in the front side of the die too. Memory die 701 may have a first side S1 and a second side S2 opposite to the first side S1. The first side S1 may be the side of the die commonly referred to as the "inactive" or "hack" side of the die. The backside of memory die 701 may include active or passive devices, signal and power routings, etc. The second side S2 may include one or more transistors (e.g., access transistors), and may be the side of the die commonly referred to as the "active" or "front" side of the die. The second side S2 of memory die 701 may include one or more electrical routing features 310. Compute die 304 may include an "active" or "front" side with one or more electrical routing features connected to micro-bumps 703. In some embodiments, electrical routing features may be bond pads, solder balls, or any other suitable coupling technology.

In some embodiments, the thermal issue is mitigated because heat sink 319 is directly attached to compute die 304, which generates most of the heat in this packaging configuration. While the embodiment of FIG. 7A is illustrated as wafer-to-wafer bonding between dies 701 and 304, in some embodiments, these dies can also be bonded using wafer-to-die bonding technologies. In some embodiments, higher bandwidth is achieved between memory die 701 and compute die 304 as higher number of channels are available between memory die 701 and compute die 304. Further, memory access energy is reduced because memory access is direct and uniform as opposed to indirect and distributed. Due to local access of memory in die by processing elements (PE) of compute die 304, latency is reduced. The close and direct connection between compute die 304 and memory die 701 allows memory of memory die 701 to behave as a fast-accessible cache memory.

In some embodiments, the IC package assembly may include, for example, combinations of flip-chip and wire-bonding techniques, interposers, multi-chip package configurations including system-on-chip (SoC) and/or package-on-package (PoP) configurations to route electrical signals.

In some embodiments, a stack of memory dies is positioned below compute die 304. The zoomed version of memory die 701 includes stack of memory dies including die 701 which may include memory (such as cache) and controller circuitries (e.g., row/column controllers and decoders, read and write drivers, sense amplifiers etc.). In some embodiments, circuits for controller die 701 are implemented as ferroelectric or paraelectric logic (e.g., majority, minority, and/or threshold gates). Below controller die 701, memory dies $703_{1-N}$ are stacked, where die $703_1$ is adjacent to controller die 701 and die $703_N$ is adjacent to substrate 302, and where 'N' is an integer greater than 1. In some embodiments, each die in the stack is wafer-to-wafer bonded via micro-bumps or Cu-to-Cu hybrid pillars. In various embodiments, the active devices 701*b* of each memory die $703_{1-N}$ are away from C4 bumps and more towards active devices of 702*b* near BE 702*a*.

However, in some embodiments, memory dies $703_{1-N}$ can be flipped so that the active devices 701*b* face substrate 302. In some embodiments, connection between compute die 304 and first memory die 701 (or controller die with memory) is face-to-face and can result in higher bandwidth for that interface compared to interfaces with other memory dies in the stack. The TSVs through the memory dies can carry signal and power from compute die 304 to C4 bumps. The TSVs between various memory dies can carry signals between the dies in the stack, or power (and ground) to the C4 bumps. In some embodiments, communication channel between compute die 304 or memory dies across the stack is connected through TSVs and micro-bumps or wafer-to-wafer Cu-hybrid bonds. In some embodiments, memory dies $703_{1-N}$ can be embedded DRAM, SRAM, flash, Fe-RAM, MRAM, Fe-SRAM, Re-RAM, etc. or a combination of them.

In some embodiments, variable pitch TSVs (e.g., TSVs 701*c*) between memory dies (e.g., 701 and/or $703_{1-N}$) enables high count of I/Os between the dies, resulting in distributed bandwidth. In some embodiments, stacked memory dies connected through combinations of TSVs, and bonding between dies (e.g., using micro-hump or wafer-to-wafer bonding), can carry power and signals. In some embodiments, variable pitch TSVs enable high density on bottom die (e.g., die 701), with I/Os implemented with tighter pitch, while power and/or ground lines are implemented with relaxed pitch TSVs.

In some embodiments, package configuration 700 includes accelerator die 425 which is adjacent to the stack of compute die 304 and memory die 701. In some embodiments, accelerator die 425 communicates with memory die 701 and/or compute die 304 via silicon bridge embedded in substrate or interposer 302. In some embodiments, package configuration 700 includes HMB die 647 which is adjacent to and on the same place as accelerator die 425. In some embodiments, the memories in HBM die 647 include any one or more of: DRAM, embedded DRAM, Fe-RAM, Fe-SRAM, Fe-DRAM, SRAM, MRAM, Re-RAM or a combination of them. Heat sink 319 provides a thermal management solution to the various dies in encapsulant 318. In some embodiments, solid-state drive (SSD) 709 is positioned outside of first package assembly that includes heat sink 319. In some embodiments, SSD 709 includes one of NAND flash memory, NOR flash memory, or any other type of non-volatile memory such as DRAM, embedded DRAM, MRAM, Fe-DRAM, Fe-SRAM, Re-RAM etc. In some embodiments, silicon bridge embedded in substrate 302 allows for efficiency communication between the various dies here.

Figure 7B:
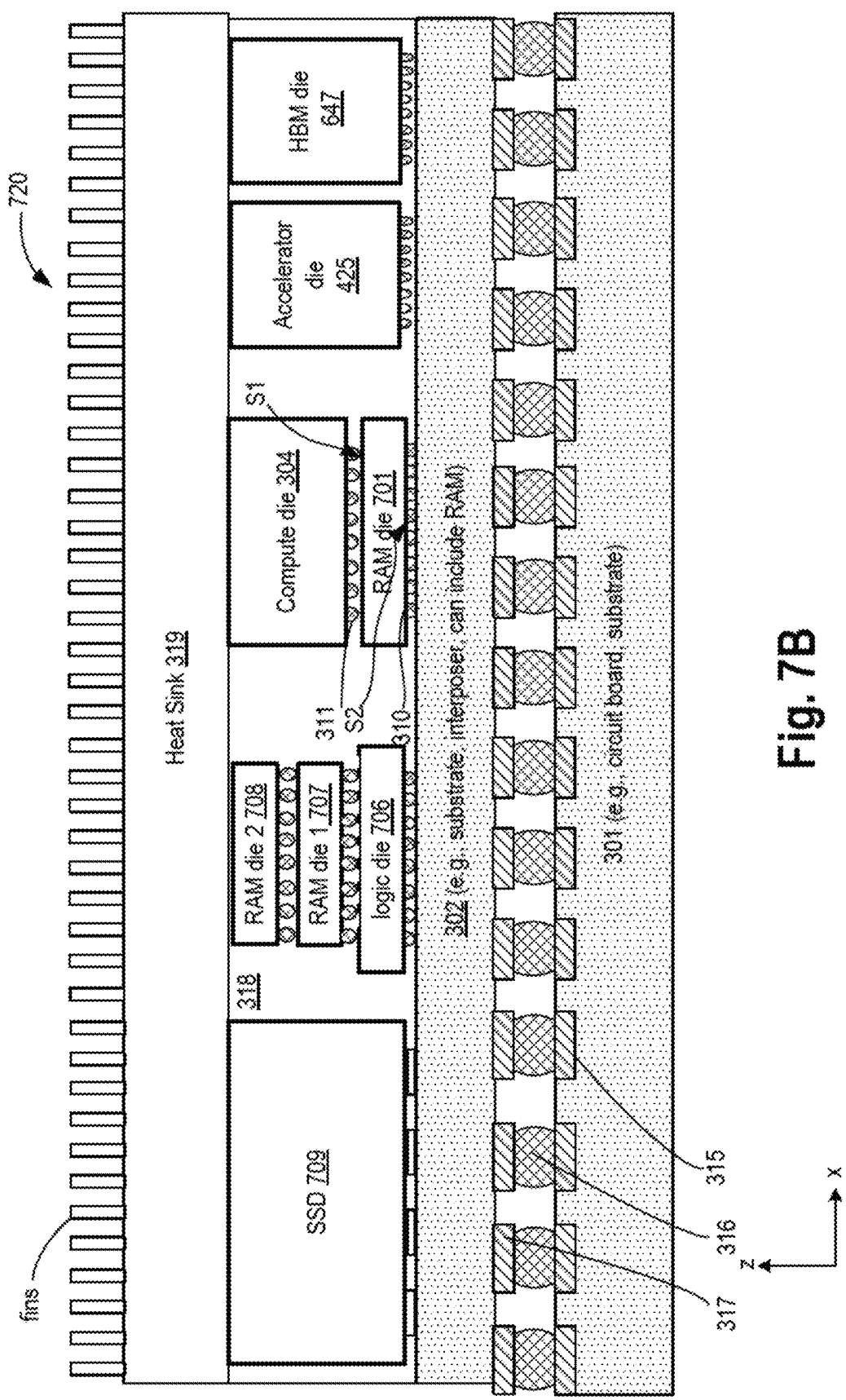
FIG. 7B illustrates a cross-section of a package comprising an AI machine, which includes an SoC having a computational block, which includes a compute die over a Fe-RAM, an accelerator die, a HBM, and a solid-state memory, in accordance with some embodiments.

FIG. 7B illustrates a cross-section of a package 720 (or package configuration 720) comprising an AI machine, which includes an SoC having a computational block, which includes a compute die over a Fe-RAM, an accelerator die, a HBM, and a solid-state memory, in accordance with some embodiments. Package 720 is like package 700 but for incorporating SSD 709 within a single package under a common heat sink 319. In this case, a single packaged SoC provides an AI machine which includes the capability of generating a training model and then using the trained model for different data to generate output. In some embodiments, silicon bridge embedded in substrate 302 allows for efficiency communication between the various dies here.

Figure 7C:
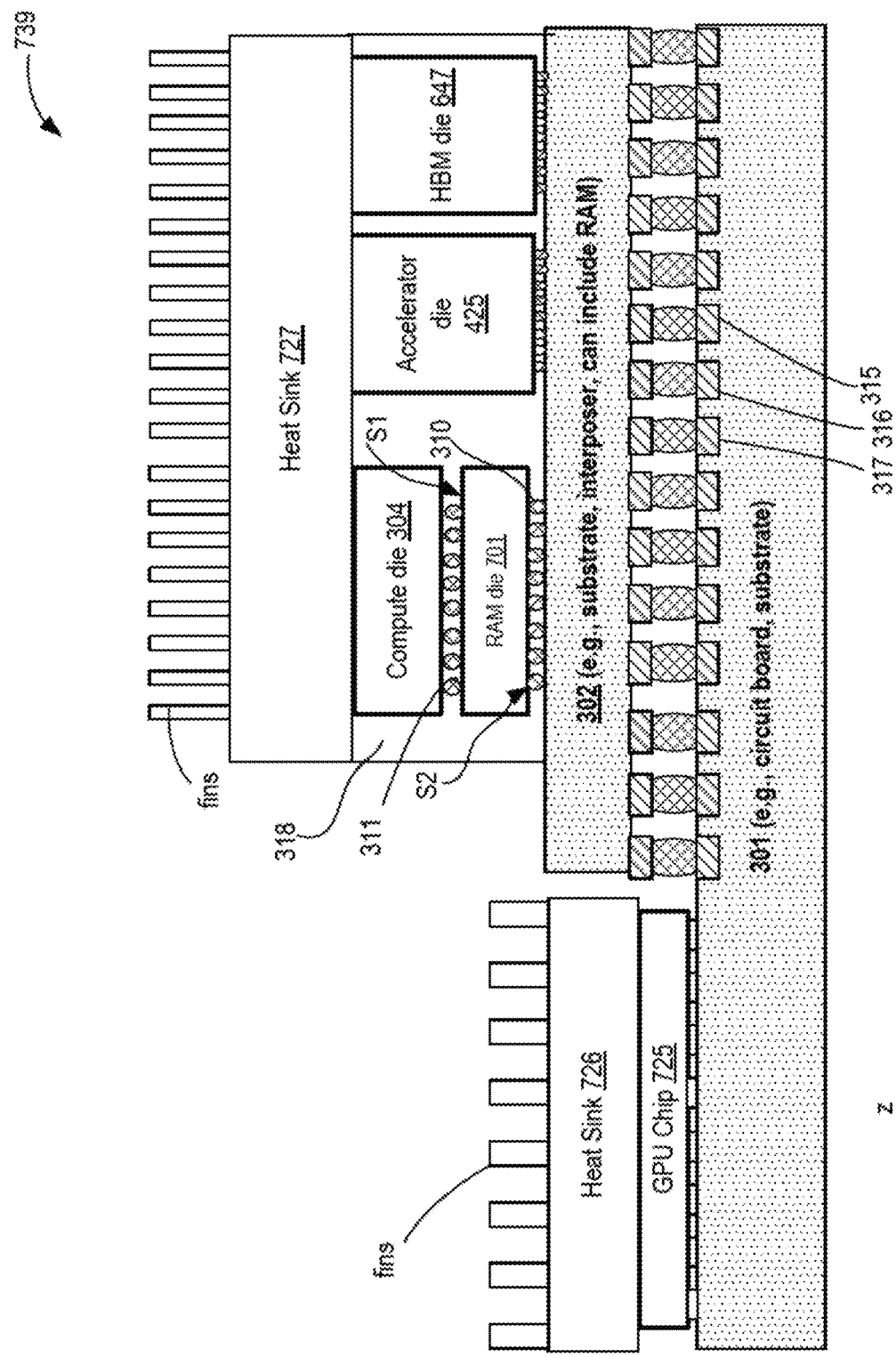
FIG. 7C illustrates a cross-section of multiple packages on a circuit board, where one of the packages includes a compute die over a memory die, and another of the packages includes a graphics processor unit, in accordance with some embodiments.

FIG. 7C illustrates a cross-section of multiple packages on a circuit board, where one of the packages includes a compute die over a memory die, and another of the packages includes a graphics processor unit, in accordance with some embodiments. In this example, an AI processor such as CPU 725 (GPU, DSP, FPGA, ASIC, etc.) is coupled to substrate 301 (e.g., printed circuit board (PCB)). Here, two packages are shown—one with heat sink 726 and the other with heat sink 727. Heat sink 726 is a dedicated thermal solution for GPU chip 725 while heat sink 727 provides a thermal solution for the computational block (dies 701 and 304) with accelerator due 425 and HBM 647). In some embodiments, silicon bridge embedded in substrate 302 allows for efficiency communication between the various dies here.

FIG. 8A illustrates unit cell 800 (or processing element (PE)) of an accelerator die which is configured to couple with a memory below it, in accordance with some embodiments. In some embodiments, PE 800 comprises matrix multiplication unit (MMU) 801, registers 802, system bus controller 803, north/south (N/S) bus 804, east/west (E/W) bus 805, local memory controller 806, and die-to-die I/interface 807. MMU 801 plays the same role as multiplier 103 while registers 802 are used to save inputs 102*a* and weights 102*b*. System bus controller 803 controls the data and control communication by N/S bus 804 and E/W bus 805. Local memory controller 806 controls selection of inputs and weights and associated read and write drivers. Die-to-die I/O interface communicates with the memory unit cell underneath. In various embodiments, the various components of PE 800 are implemented using ferroelectric or paraelectric logic (e.g., majority, minority, and/or threshold gates).

FIG. 8B illustrates a unit cell 820 of a memory 701 which is configured to couple with a compute die 304 above it, in accordance with some embodiments. Memory unit cell 820 comprises an array of bit-cells, where each array can be a unit array cell. In this example, a 4×4 unit array is shown, where each unit array (e.g., Array 0,0; Array 0,4; Array 4,0; Array 4,4) includes a plurality of bit-cells arranged in rows and columns. However, any N×M array can be used for the unit array, where 'N' and 'M' are integers that can be same or different numbers. The bit-cells of each array are accessible by a row address decoder. The bit-cells of each array can be read from and written to using the adjacent read/write control and drivers. Unit cell 820 includes control and refresh logic 826 to control reading and writing to the bit-cells of the array. Unit cell 820 includes die-to-die I/O interface 827 which is used to communicate with die-to-die I/O interface 607 of PE 600.

FIG. 8C illustrates unit cell 830 (or processing element (PE)) of an accelerator die with local memory, in accordance with some embodiments. Unit cell 830 is like unit cell 800. In some embodiments, die-to-die interface 807 with memory die is removed or disabled. In various embodiments, unit cell 830 includes a local memory 832 which is communicatively coupled to MMU 801.

FIG. 8D illustrates accelerator die 840 with an array of PEs, in accordance with some embodiments. This example shows a 4×4 array. However, any number of PEs can be arranged in an array. In some embodiments, the PEs can communicate with one another via an interconnect fabric which can be a ring fabric or a mesh fabric.

Figure 9A:
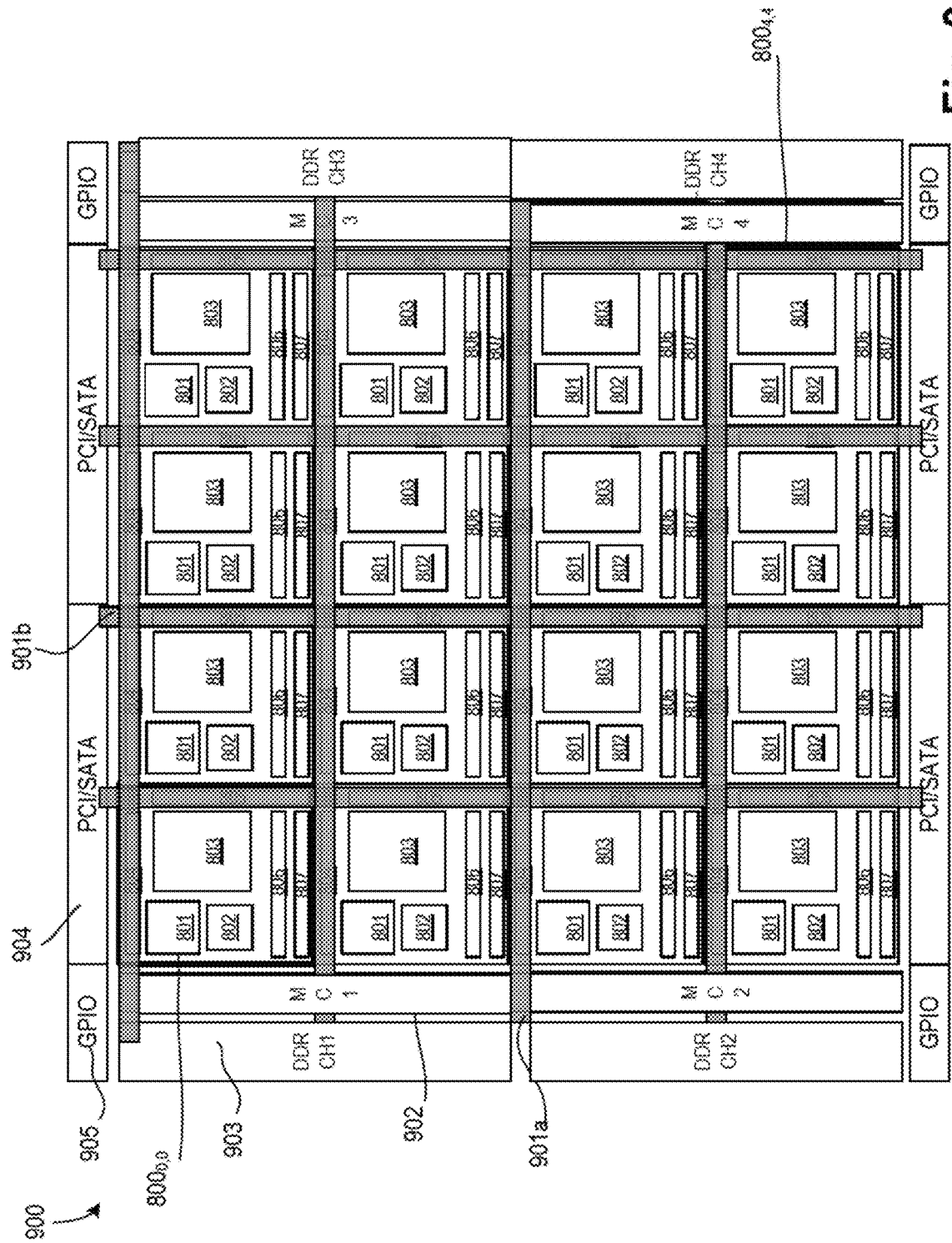
FIG. 9A illustrates a compute die comprising a plurality of unit cells of FIG. 8A, in accordance with some embodiments.

FIG. 9A illustrates compute die 900 (e.g., compute die 304) comprising a $800_{N,M}$ (where 'N' and 'M' are 4 in this example) of FIG. 8A, in accordance with some embodiments. Note, 'N' and 'M' can be any number depending on the desired architecture. Compute die 900 includes I/O interfaces and memory channels along its periphery. PEs $800_{N,M}$ are accessible by network-on-chip (NoC) comprising routers, drivers, and interconnects 901a and 901b. In some embodiments, two sides (or more) have memory channels (MC) 902 including MC1 through MC4. In some embodiments, compute die 900 includes double data rate (DDR) compliant channels 903 (e.g., DDR CH1, DDR CH2, DDR CH3, DDR CH4). However, the embodiments are not limited to DDR compliant I/O interfaces. Other low power and fast interfaces can also be used. In some embodiments, compute die 900 includes PCIe (peripheral component interconnect express) and/or SATA (Serial AT attachment) interfaces 904. Other serial or parallel I/O interfaces can also be used. In some embodiments, additional general purpose I/O (GPIO) interfaces 905 are added along the periphery of compute die 900. Each PE is above a corresponding memory unit cell. The architecture of compute die 900 allows break up the memory of memory die 701 into as many channels as desired, and assists with increased bandwidth, lower latency, and lower access energy.

Figure 9B:
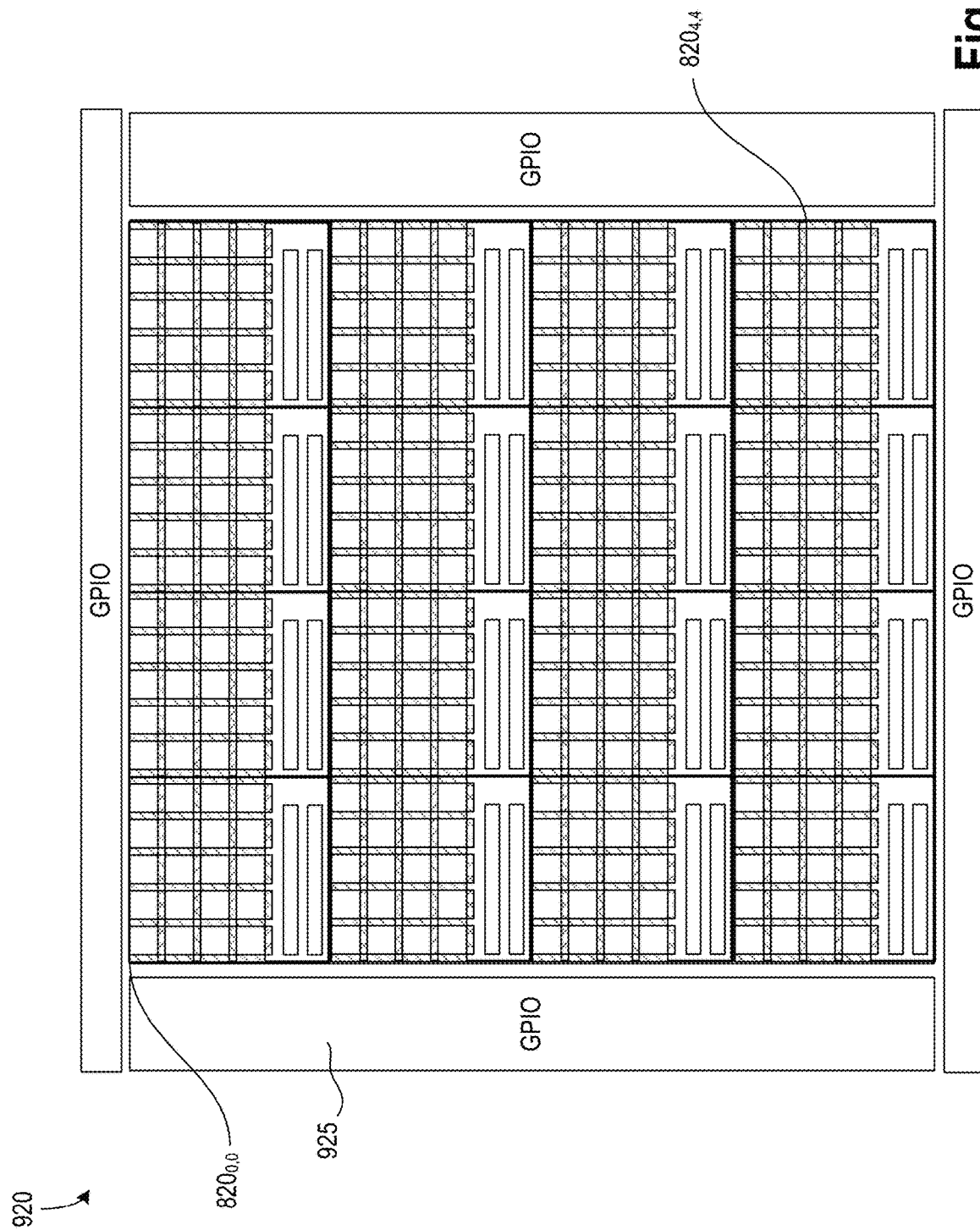
FIG. 9B illustrates a memory die comprising a plurality of unit cells of FIG. 8B, in accordance with some embodiments.

FIG. 9B illustrates memory die 920 comprising a plurality of unit cells 620N,M (where 'N' and 'M' are 4 in this example) of FIG. 8B, in accordance with some embodiments. In some embodiments, memory die 920 communicates with compute die 900 above it via GPIOs 925. In other embodiments, other types of I/Os may be used to communicate with compute die 900.

Figure 10:
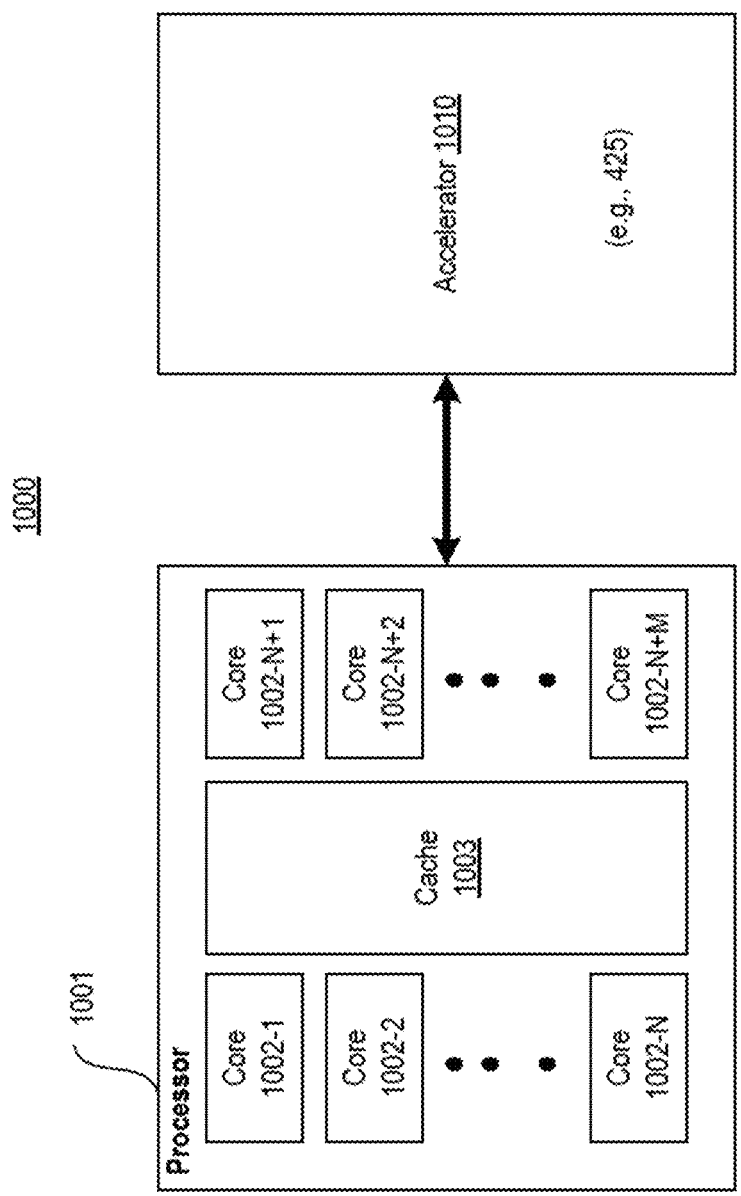
FIG. 10 illustrates an apparatus with a multi-core processor coupled to an accelerator die which is stacked over a memory portion of the multi-core processor, in accordance with some embodiments.

FIG. 10 illustrates apparatus 100 with a multi-core processor coupled to an accelerator die which is stacked over a memory portion of the multi-core processor, in accordance with some embodiments. In a traditional multi-core processor, a processor includes a plurality of cores (e.g., cores 1002-1 through 1002-N+M), where N and M are numbers, shared memory or cache 1003 (such as level-3 (L3) cache) and an accelerator all part of the same chip. To manage thermals and performance better, in some embodiments, the traditional multi-core processor is split into two dies. The first die is a processor die 1001 while the second die is an accelerator die 1010 (e.g., die 425). In some embodiments, processor die 1001 and accelerator die 1010 (e.g., a compute chiplet) are stacked over one another in a 3D configuration. In some embodiments, the die which consumes more power is positioned on top while the die which consumes less power is positioned on the bottom. This allows heat sink 319 to absorb heat from the more heat generating die directly. In some embodiments, accelerator die or chiplet 1010 is positioned directly above cache 1003. This allows for direct communication between accelerator 1010 and cache via an interconnect fabric.

Figure 11:
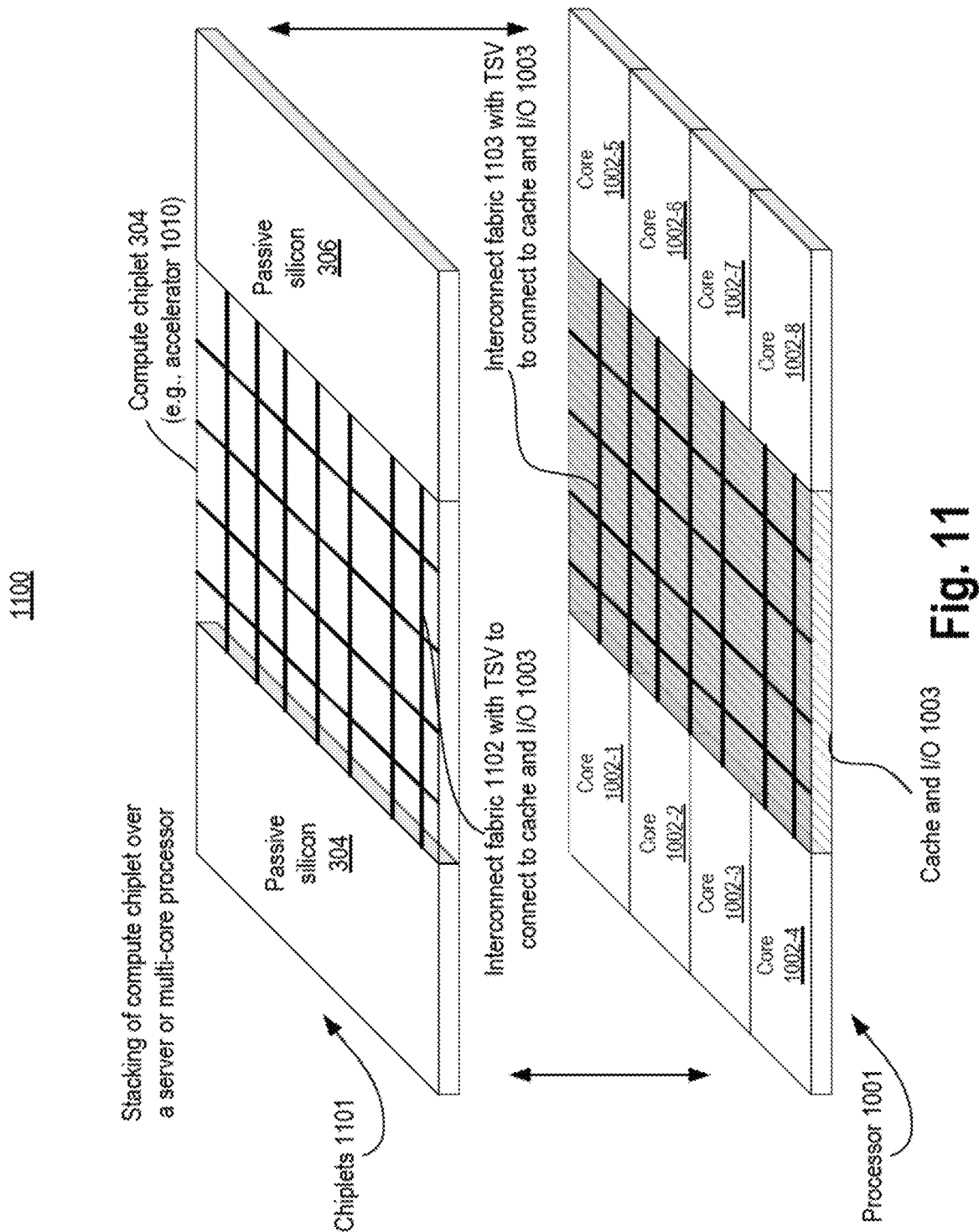
FIG. 11 illustrates a 3D view of the apparatus of FIG. 10, where an interconnect fabric on the accelerator die is coupled to an interconnect fabric of the memory portion, in accordance with some embodiments.

FIG. 11 illustrates 3D view 1100 of apparatus 1000 of FIG. 10, where an interconnect fabric on the accelerator die is coupled to an interconnect fabric of the memory portion, in accordance with some embodiments. View 1100 is like package configuration 300 where a compute chiplet 304 (e.g., accelerator 1010) is placed above compute die 303 (or processor 1001). In some embodiments, the floorplan of processor 1001 is arranged such that processor cores 1002-1 through 1002-8 (in this example an 8-core system is shown) are organized on either sides of cache and I/O 1003. In various embodiments, accelerator 1010 is coupled to passive silicon structures 304 and 306 on either sides of accelerator 1010, forming a group of chiplets 1101. In some embodiments, passive silicon structures 304 and 306 include passive components such as interconnect coupling cores to other logic, capacitors, inductors, etc. for power supply sources for the cores. In some embodiments, accelerator die 1010 includes an interconnect fabric 1102. This interconnect fabric 1102 can be a ring or mesh fabric, or a network-on-chip (NoC). An NoC can have routers (e.g., buffers and multiplexers) to route signals to different paths. In some embodiments, processor 1001 also includes an interconnect fabric 1103. This interconnect fabric 1103 can be a ring or mesh fabric, or NoC. In various embodiments, interconnect fabric 1102 couples to interconnect fabric 1103 to allow accelerator 1101 to have access to cache and I/O 1003. In some embodiments, TSVs are used to connect the die dies 1001 and 1101. These TSVs can connect to the interconnect fabric or NOC. The TSVs may also be used to connect the cores to passive silicon. For example, large passive components for local voltage regulators in the cores are coupled via the TSVs.

Figure 12:
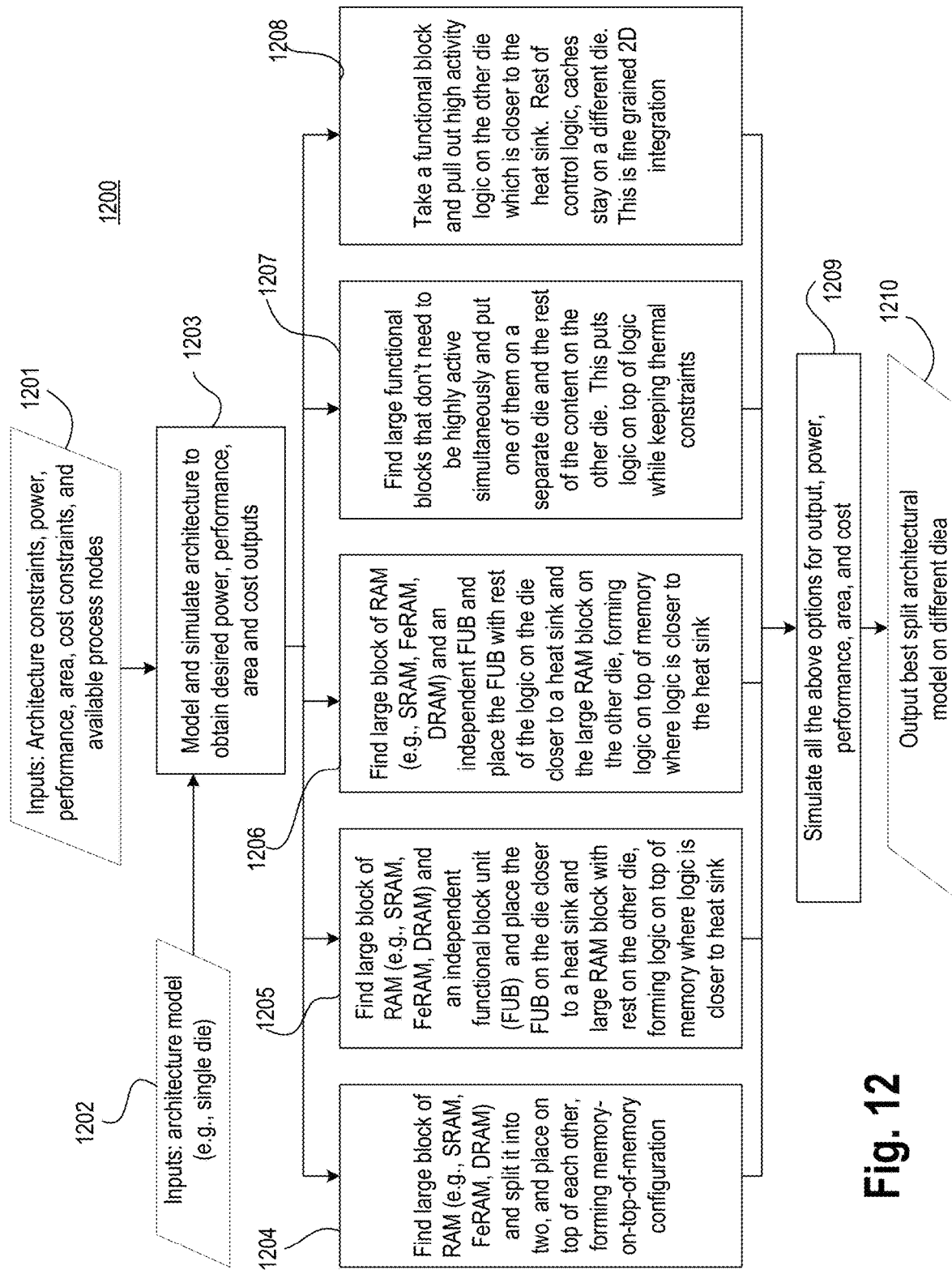
FIG. 12 illustrates a flowchart of a method to identify a 3D stacking configuration of logic-on-logic for improving thermals, in accordance with some embodiments.

FIG. 12 illustrates flowchart 1200 of a method to identify a 3D stacking configuration of logic-on-logic for improving thermals, in accordance with some embodiments. While various blocks in flowchart 1200 are illustrated in a particular order, the order can be modified. For example, some blocks can be performed in parallel, and some blocks can be performed before others. Functions performed by some, or all blocks described herein are implemented in software, hardware, or a combination of them. Here, trapezoidal boxes are inputs or outputs.

Flowchart 1200 allows a designer to segregate logic components that are traditionally on one die into different dies. This is done to manage thermals and performance better. Flowchart 1200 considers various constraints such as available processor nodes, cost, area, power, performance, etc. as indicated by block 1201. In addition to the constraints, additional input 1202 that describes the architectural model is also provided. Example of an architectural model is a single die-based architecture. At block 1203, a designer models and simulates the chip architecture to obtain desired power, performance, area and cost outputs. The idea is to break the architecture into chucks and spatially segregate compute, logics of processor, and/or memory into separate dies. The dies which generate more heat due to their processing activity for a given task are placed closer to the heat sink, while other dies are placed below that die. As such, logic-on-logic configurations are achieved that are customized for performance and thermals.

Blocks 1204, 1205. 1206, 1207, and 1208 are various configurations that are simulated for given architectural constraints or inputs. At block 1204, the tool or flowchart finds a large block of memory (e.g., SRAM, Fe-RAM, SRAM) and splits it into two. The tool then places the split memories into a 3D stack where one memory portion is above another memory portion. After splitting the large memory block and configuring the memory blocks into a stack, the overall architecture is simulated to see if it meets the power, performance, and thermal constraints as indicated by block 1209.

At block 1205, the tool finds a large block of memory and an independent function unit block (FUB). The idea is to separate out a big enough functional logic to be put on a second die, on top of large memory blocks on a first die. The tool places the FUB on the die closer to a heat sink and places the memory block with other dies of the architecture. The other die can be below the die having the FUB. After configuring the FUB and the memory in a stack of dies, the overall architecture is simulated to see if it meets the power, performance, and thermal constraints as indicated by block 1209.

At block 1206, the tool finds a large memory block and an independent FUB, and places the FUB with the rest of logic on a die (logic die) closer to a heat sink. The memory block is placed with other dies separate from the logic die. The other die can be below the die having the FUB. After configuring the FUB and the memory in a stack of dies, the overall architecture is simulated to see if it meets the power, performance, and thermal constraints as indicated by block 1209. Here, large is a relative term and can correspond to a threshold number of transistors or area. For example, a memory larger than 1 GB is considered large, while a logic area with transistors greater than 100K can be considered as large.

At block 1207, the tool identifies larges FUBs that don't need to be highly activity simultaneously. This identification is based on design and architectural considerations. In this case, one of the FUB is placed on a separate die while the rest of the FUBs are placed on another die. After configuring the FUBs in a stack of dies, the overall architecture is simulated to see if it meets the power, performance, and thermal constraints as indicated by block 1209.

At block 1208, the tool identifies FUBs and logics with a high activity (e.g., high activity factor). These highly active FUBs or logic are placed on one die while the rest of the logic and memory (e.g., control logic, cache, etc.) are placed on another die. A FUB that is highly active has an activity after greater than 0.7, for example. After configuring the highly active FUBs and less active logic in a stack of dies, the overall architecture is simulated to see if it meets the power, performance, and thermal constraints as indicated by block 1209. In some embodiments, the highly active FUB are placed closer to the heat sink while the less active dies are placed below them. In some embodiments, logic blocks of an architecture are split such that the execution of those logic blocks are time separated which fits within a given power budget at any point of time. In some embodiments, large functional blocks such as control cores and accelerator cores are separated out on different dies which are not used simultaneously with high activity. Various FUBs which do not need to execute simultaneously with high activity can be separated out on two different dies. Since, these FUBs execute one at a time, heat generated by them is limited due to their synchronous activities. In some embodiments, a power management system manages the activities of the functional blocks that are spatially aligned. The power management system further allocates power budget and monitors heat sensors of these functional blocks. In some embodiments, different arithmetic units that work on different precision are placed on different dies if they are not used simultaneously. The highly active logic portions are placed on a die which is closer to the heat sink.

After simulating the various logic and memory splitting configurations of blocks 1204 through 1208, the split configuration that results in the best power, performance, area, and thermal considerations identified as indicated by block 1210 and is adapted. As such, logic-on-logic configuration is established with the best power, performance, area, and thermal considerations.

Figures 13A, 13B, 13C:
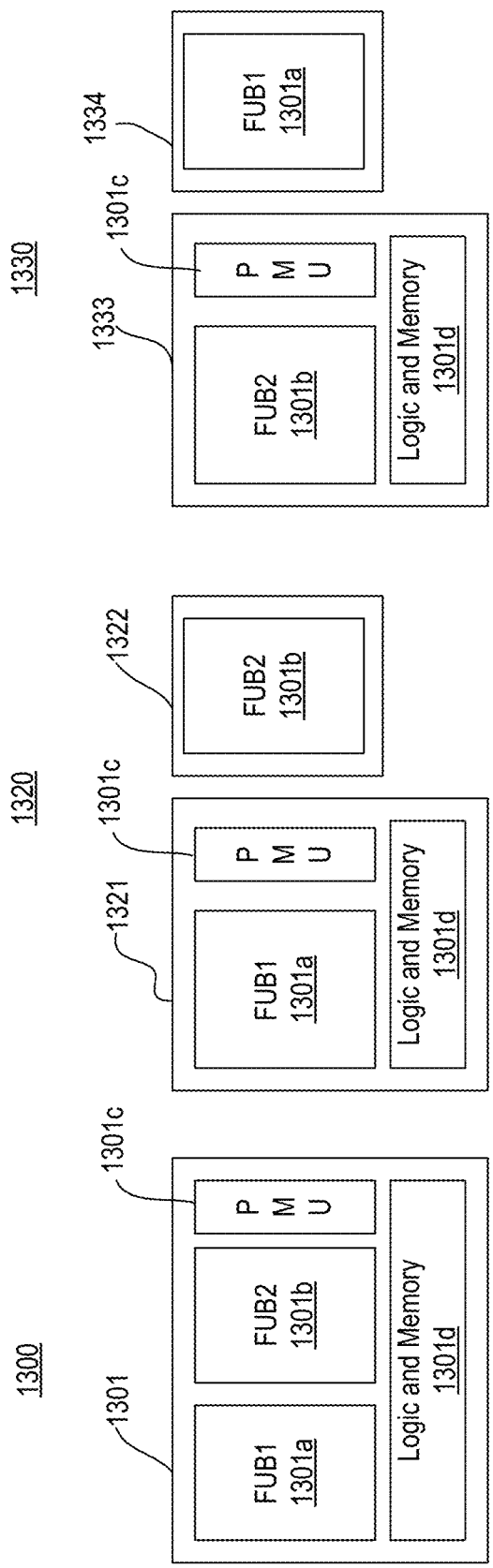
FIG. 13A illustrates a base configuration of single die with multiple function unit blocks (FUBs), a power management unit (PMU).
FIG. 13B illustrates a two-die configuration identified by the flowchart of FIG. 12, where FUB1 is on a processor die and FUB2 is on a separate die, in accordance with some embodiments.
FIG. 13C illustrates a two-die configuration identified by the flowchart of FIG. 12, where FUB2 is on a processor die and FUB1 is on a separate die, in accordance with some embodiments.

FIG. 13A illustrates a base configuration 1300 of single die with multiple function unit blocks (FUBs), a power management unit (PMU). Base configuration 1300 shows processor 1301 with multiple FUBs (e.g., 1301a, 1302b), PMU 1301c, and logic and memory section 1301d. A person skilled in the art would appreciate that a processor has many more components. The components here are simplified to show the operation of flowchart 1200 to achieve a logic-on-logic configuration that proves the best power, performance, and thermal characteristics. Here, FUB1 1301a and FUB2 1301b perform different functions. When FUB1 1301a and FUB1 1301b are not needed to be active simultaneously with high high activity, then FUB1 1301a and FUB1 1301b can be separated into a stacked configuration (also known as logic-on-logic configuration). In some embodiments, PMU 1301c takes care of managing the activities and power allocation of the two dies such that thermal constraints and thermal design power (TDP) limits are satisfied. Both dies need not be the same size. Also, during segregation, the architectural specifications can be adjusted by expanding or compressing various logic units.

FIG. 13B illustrates a two-die configuration 1320 identified by the flowchart of FIG. 12, where FUB1 1201a is on processor die 1321 (e.g., die 1) and FUB2 1322 is on a separate die (e.g., die 2), in accordance with some embodiments.

FIG. 13C illustrates a two-die configuration 1330 identified by the flowchart of FIG. 12, where FUB2 1301v is on processor die 1333 (e.g., die 1) and FUB1 1301a is on a separate die, (e.g., die 2), in accordance with some embodiments.

FIGS. 14A-D illustrates various configurations 1400, 1420, 1430, and 1440, respectively, of logic-on-logic stacking by separating different types of FUBs on different dies to manage thermals efficiently, in accordance with various embodiments. Configuration 1400 shows first die 1401 that includes control logic and scalar units 1401a, PMU 1401c, and logic and memory 1401d. The second die here is die 1402 which includes matrix and vector unit 1401b. Configuration 1420 shows first die 1421 that includes integer logic 1421a, PMU 1401c, and logic and memory 1401d. The second die here is die 1422 which includes floating point logic 1422b. Configuration 1430 shows first die 1431 that includes GPU or CPU core(S) 1433b, PMU 1401c, and logic and memory 1401d. The second die here is die 1432 which includes accelerator 1434a. Configuration 1440 shows first die 1441 that includes variable floating point (FP) precision unit 1443b, PMU 1401c, and logic and memory 1401d. The second die here is die 1442 which includes 32-but floating point unit and 64-bit floating point unit 1444a. The segregation of logic units in the different dies is according to the analysis done by flowchart 1200, in accordance with some embodiments.

FIGS. 15A-B illustrate two dies 1500 and 1520, respectively, that split FUBs of a graphics processor unit (GPU) for fine grain 3D integration and to manage thermals efficiently, in accordance with some embodiments. Sometimes due to architectural or area, power, performance, and/or cost constraints, it is useful to separate out a single functional block in a fine-grained fashion into two or more separate dies. Preference is to keep logic on the die which is closer to a heat sink, and memory associated with that logic on another die to divide the area among the two dies, in accordance with some embodiments. In some embodiments, advanced packaging constraints allow for very fast communication and power for communication among multiple dies. The segregation of logic, memory and other units into separate dies improve product yields because there is more uniformity.

The fine grain 3D segregation can be done for many purposes, such as yield improvement, optimizing process technology for various logic FUBs and memory separately, for integrating novel memory or logic technologies etc. Smaller dies usually result in higher yields. Therefore, a large processor die may be separated into two or more dies to make each of the die smaller.

When there is a special process technology available for various functions such as denser math or denser memory, such kind of separation allows for optimizing various FUBs and memory independently for those process technologies. In some embodiments, a single die is separated into multiple dies to allow for the use of the process technology optimized with Ferro-electric and/or para-electric for logic and/or memory. In some embodiments, we use the segregation of dies for enabling the integration of optics-based interconnects or logic. We also use this type of segregation for integrating other types of novel logic such as the ones based on optics, Quantum cellular automata and other types of emerging memories such as ReRAM, MRAM, CRAM, FRAM etc.

A baseline graphics processor includes a number of functional unit blocks including a plurality of vector registers, vector math unit, matrix math unit, local data sharing unit, level-1 (L1) cache, level-2 (L2) cache, scheduler and control logic, scalar registers, load and store unit, scalar unit, etc. A person skilled in the art would appreciate that a graphics process unit includes many more units including execution units, shared memory, etc. Fewer units here are shown to illustrate how a GPU architecture can be split into two dies for fine-grain integration. In this example, a baseline graphics processor is divided into dies 1500 and 1520. In some embodiments, the division is based on the flowchart of FIG. 12. In this example, die 1 1500 includes L2 cache 1501, local data share unit 1502, scheduler and control logic unit 1503, load and store unit 1504, scalar registers 1505, scalar unit 1506, and L1 cache 1507. Die 2 1520 includes the vector and matrix units 1521, 1522, 1523, and 1524, and vector registers 1525.

In FIG. 15, an individual compute unit of a baseline GPU architecture is shown divided in two dies. Many such unit exists in the GPU with other components such as cache and interconnect fabric. L2 cache 1501 may be shared by multiple of such compute units. Various math units such as scalar, matrix, and vector do arithmetic operations on various types of data. For example, scalar unit 1506 works on individual scalar elements, vector units 1521 and 1522 simultaneously work on multiple data points in SIMD (single instruction multiple data) technique. A matrix multiplication unit (e.g., 1523 and 1524) is a functional block that accomplishes matrix multiplication operation of two matrices. These math units are supported by registers (e.g., 1504) to store the data being worked upon by the math units. Local data share unit 1502 allows to share data between multiple arithmetic units. Similarly, L1 cache 1507 is bigger in size memory, but also supports data sharing. L2 cache 1501 shown here, is usually shared by multiple compute units. However, with the segregation in two dies, a slice of L2 1501 can be associated with the compute units to be able to uniformly divide an entire GPU die.

Figures 16A, 16B:
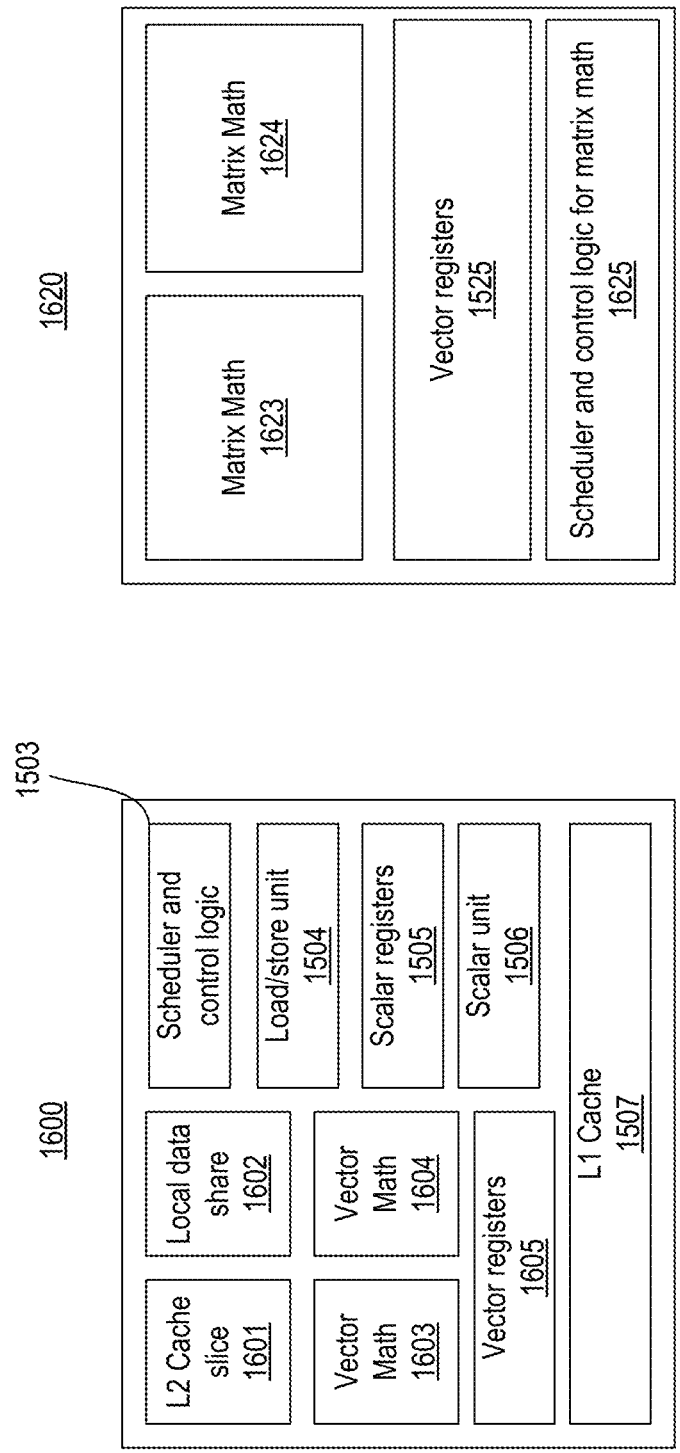
FIGS. 16A-B illustrate two dies that split FUBs of a GPU for fine grain 3D integration and to manage thermals efficiently, where larger matrix units are designed and placed on a separate die, in accordance with some embodiments.

FIGS. 16A-B illustrate two dies 1600 and 1620, respectively, that split FUBs of a GPU for fine grain 3D integration and to manage thermals efficiently, where larger matrix units are designed and placed on a separate die, in accordance with some embodiments. In this example bigger matrix units are designed and put on to a separate die, which are supported with vector registers. The rest of the logic, registers and caches reside on the other die. Die 1 1600 accordingly has L2 cache slice 1601, local data share 1602, vector math unit 1603, vector math unit 1604, vector registers 1605, scheduler and control logic unit 1503, load and store unit 1504, scalar registers 1505, scalar unit 1506, and L1 cache 1507. Die 2 1620 in the example includes larger versions of matrix math units 1623 and 1624, vector registers 1525, and scheduler and control logic for matrix math units 1625. The die that generates more heat is placed closer to a heat sink, in accordance with some embodiments, while the other die is placed underneath it. As such thermals are managed efficiently.

Figure 17:
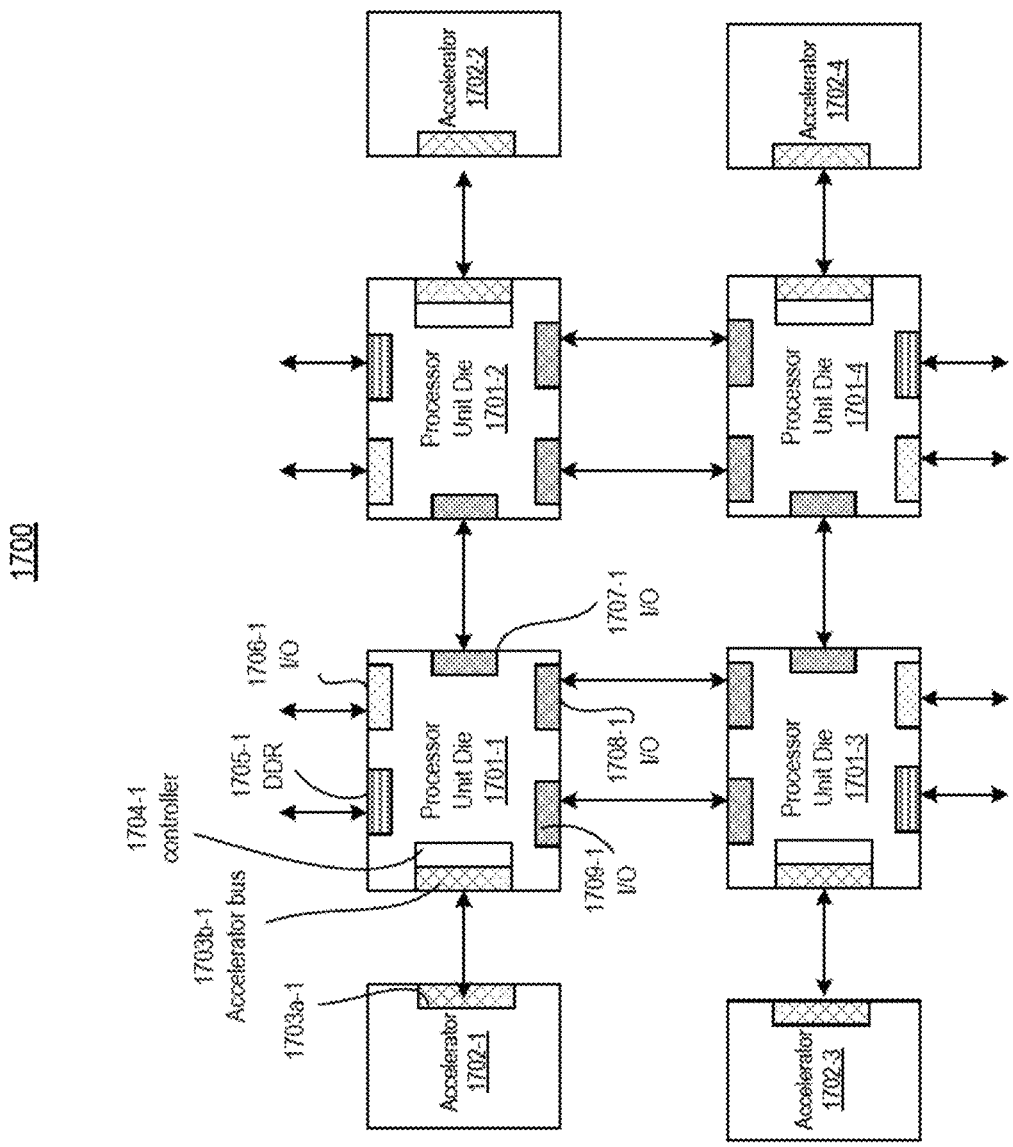
FIG. 17 illustrates a top view of a system-on-chip (SoC) or package architecture with one or more accelerator chiplets are coupled to one or more compute dies or processor dies, where the accelerator chiplets have local connections to their respective compute dies, in accordance with some embodiments.

FIG. 17 illustrates a top view of a system-on-chip (SoC) or package architecture 1700 with one or more accelerator chiplets are coupled to one or more compute dies or processor dies, where the accelerator chiplets have local connections to their respective compute dies, in accordance with some embodiments.

Architecture 1700 comprises processor unit dies 1701-1, 1701-2, 1701-3, and 1701-4, and accelerator dies 1702-1, 1702-2, 1702-3, and 1702-4. While four processor unit dies and four accelerator dies are shown, any number of processor unit dies and accelerator dies can be used in a packaged architecture. Here, discrete labels for components can be expressed by their general label. For example, discrete label for accelerator chiplet 1702-1 may be referred by its general label accelerator chiplet 1702. In that case, the features or functions described with reference to the general label are applicable to the individual labels. In various embodiments, each accelerator die and processor unit die communicates via a dedicated I/O port, referred to as accelerator bus. This I/O port between accelerator die 1702-1 and processor unit die 1701-1 is accelerator bus 1703a-1 and 1703b-1 as shown. Likewise, other accelerator dies and processor unit dies have their respective I/O ports to communicate with one another. In some embodiments, processor unit die 1701-1 includes controller 1704-1, memory I/O (e.g., double data rate (DDR) compliant I/O 1705-1), I/O 1706-1 to communicate with peripheral units, and I/Os 1707-1, 1708-1 and 1709-1 to communicate with neighboring processor units dies 1701-2, and 1701-3. When number of processor unit dies are small, an all-to-all communication shown in the figure scales well since the number of connections needed are small. This kind of design is suitable for this design point vs. having a centralized hub for I/O connections among the processor dies.

Figure 18A:
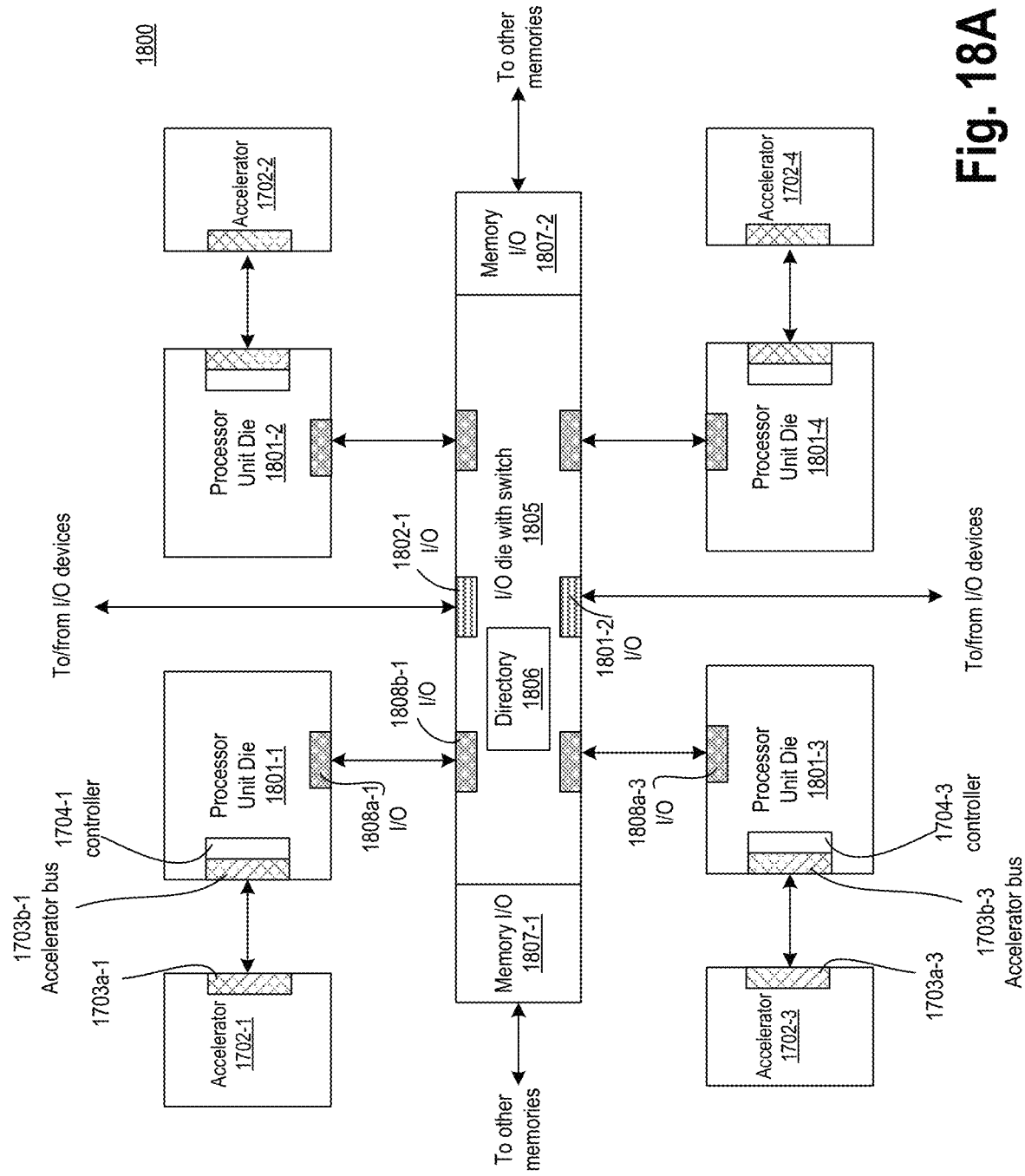
FIG. 18A illustrates a top view of an SoC or package architecture with one or more architecture chiplets connected to other compute dies via an input-output (IO) die and include direct connections to their respective compute dies, in accordance with some embodiments.

FIG. 18A illustrates a top view of an SoC or package architecture 1800 with one or more architecture chiplets connected to other compute dies via an input-output (IO) die and include direct connections to their respective compute dies, in accordance with some embodiments. Compared to architecture 1700, architecture 1800 includes simplified processor units dies 1801-1, 1801-2, 1801-3, and 1801-4, I/O die and switch 1805, and memory I/Os 1807-1 and 1807-2. Here, processor unit dies communicate with one another via I/O die with switch 1805, which can be a separate chiplet in 2.5D or 3D package configuration. For example, accelerator dies 1702 are connected to processor unit dies 1801 with 2.5D or 3D connections. In some embodiments, a 2.5D connection is via a silicon bridge. In some embodiments, a 3D connection is via TSVs and/or micro bumps as dies are vertically stacked. In some embodiments, the connections between dies are implemented in a silicon interposer. In some embodiments, the connections between dies are implemented on package.

In one example, processor unit die 1801-1 includes I/O 1808a-1 to communicate with I/O 1808b-1 of I/O die with switch 1805. I/O die with switch 1805 includes I/Ps 1802-1 and 1802-2 to communicate with other off-chip devices or other chiplets. In some embodiments, I/O die with switch 1805 includes directory 1806. Directory 1806 may include a list of addresses, and which caches they can be found in. It minimizes snooping by providing a centralized "directory" to look at where we can find cache lines. In some embodiments, I/O die with switch 1805 includes Memory I/Os 1807-1 and 1807-2 to provide processor unit dies and/or accelerator dies access to other memories. These memories can be any type of memories including DRAM, SRAM, Fe-RAM, MRAM, etc. The various chiplets shown herein can include ferroelectric or paraelectric logic (e.g., majority, minority, and/or threshold gates). In some embodiments, the I/O connections between processor unit dies and I/O die with switch 1805 are SERDES (serial/de-serializer) I/Os. In some embodiments, I/O die with switch 1805 is embedded in an interposer or substrate. In some embodiments, I/O die with switch 1805 is part of the silicon bridge that allows communication between processor unit die 1801 and accelerator chiplet 1702. In some embodiments, the memory I/Os 1807 are double data rate compliant interfaces. In some embodiments, the buses for connecting to the memory and/or the dies are Compute Express Link (CXL) type of memory interface. CXL is an open standard interconnection. CXL is used for high-speed processor-to-device and processor-to-memory communications. The various interfaces can be implemented in a silicon interposer, organic interposer, on-package interconnects, silicon bridge through substrate, etc.

FIG. 18B illustrates a top view of an SoC or package architecture 1820 like FIG. 18A but with direct access to memory I/O for each accelerator chiplet, in accordance with some embodiments. Compared to FIG. 18A, here accelerator dies 1702 are connected to processor unit dies 1801 with 2.5D or 3D connections as well as via I/O die with switch 1805. In some embodiments, a 2.5D connection is via a silicon bridge. In some embodiments, a 3D connection is via TSVs and/or micro bumps as dies are vertically stacked. In architecture 1820, accelerator 1702-1 communicates with memory I/O 1807-1 directly via interface 1821-1.

Figure 18C:
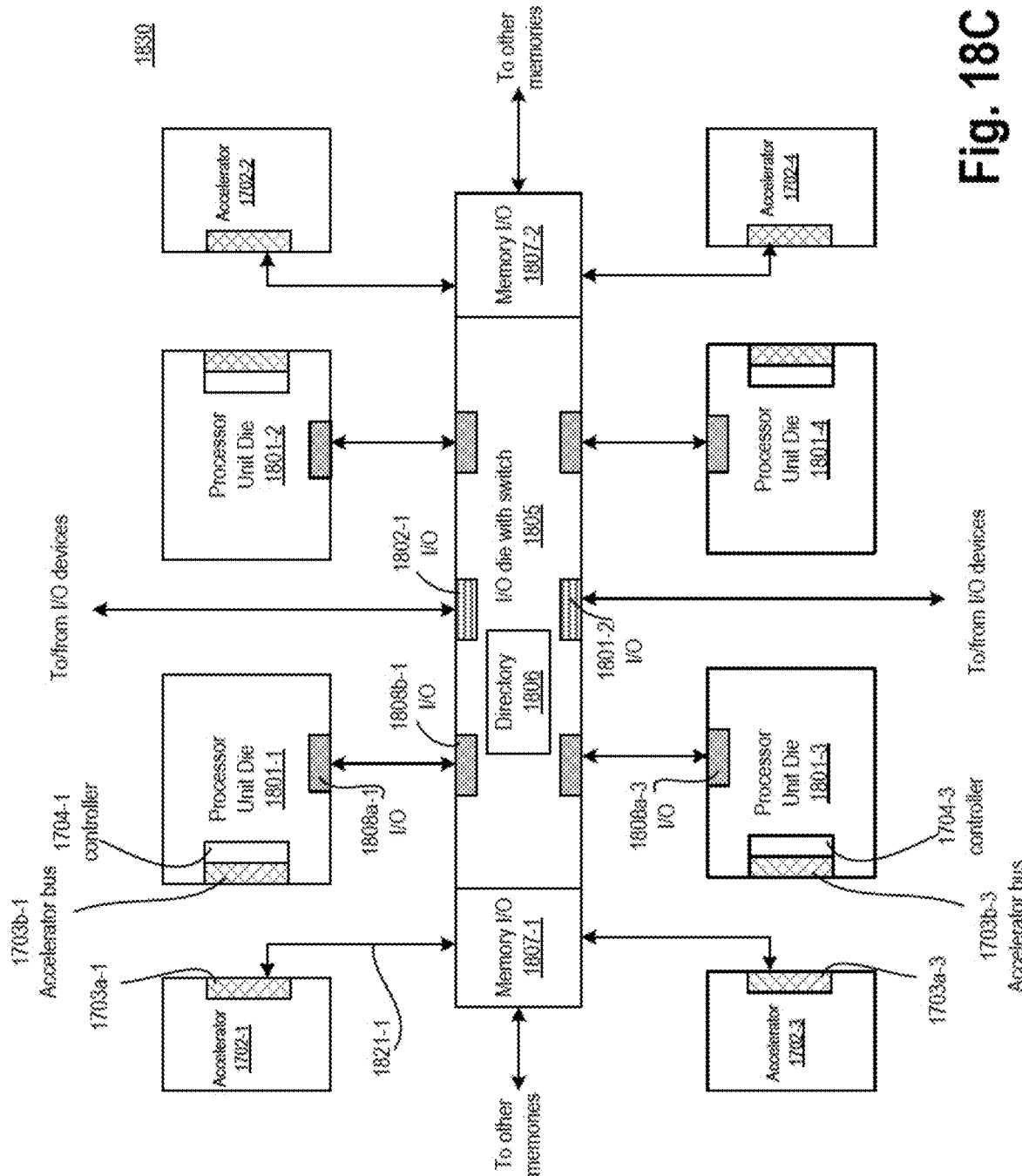
FIG. 18C illustrates a top view of an SoC or package architecture like FIG. 18B but without direct coupling between an accelerator chiplet and a compute die, in accordance with some embodiments.

FIG. 18C illustrates a top view of an SoC or package architecture 1830 like FIG. 18B but without direct coupling between an accelerator chiplet and a compute die, in accordance with some embodiments. Here accelerator dies 1702 are "loosely" connected to processor unit dies 1801 via I/O die with switch 1805. This example relies more on I/O die with switch 1805 for communication between accelerator chiplet 1702 and processor unit die 1801. In some embodiments, accelerator dies 1702 and processor unit dies are coupled with 2.5D or 3D connections as well as via I/O die with switch 1805. For example, accelerator die 1702-1 is coupled to processor unit die 1801 via I/O die with switch 1805 through a silicon bridge in a 2.5D configuration. In some embodiments, accelerator die 1702-1 is coupled to processor unit die 1801 via I/O die with switch 1805 via TSVs in a 3D configuration when I/O die with switch 1805 is a chiplet is a 3D stack.

Figure 19:
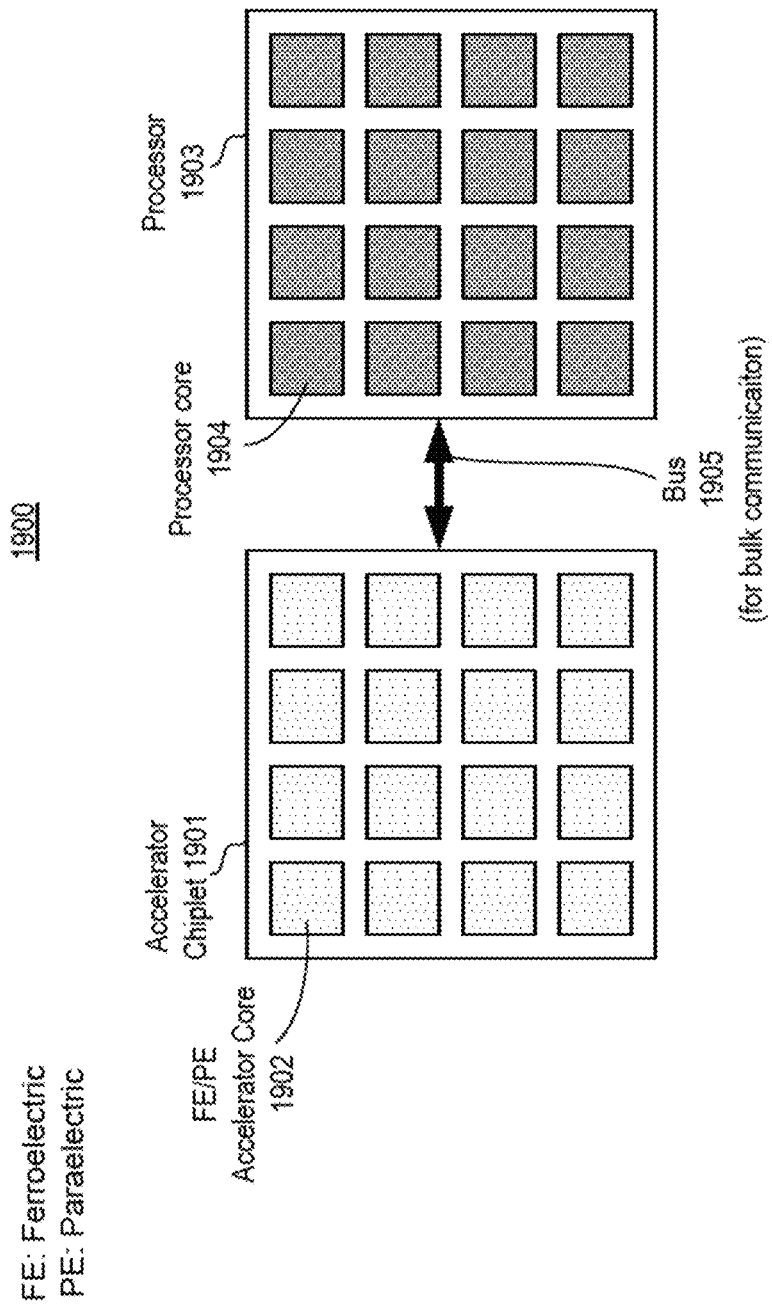
FIG. 19 illustrates an apparatus showing ferroelectric or paraelectric accelerator logic cores of an accelerator chipset which are loosely coupled to processor cores of a processor chip via a bulk communication channel, in accordance with some embodiments.

FIG. 19 illustrates apparatus 1900 showing ferroelectric or paraelectric accelerator logic cores of an accelerator chipset which are loosely coupled to processor cores of a processor chip via a bulk communication channel, in accordance with some embodiments. In some embodiments, apparatus 1900 comprises accelerator chiplet 1901 having ferroelectric or paraelectric accelerator cores 1902. These ferroelectric or paraelectric cores include majority, minority, and/or threshold gates. In some embodiments, apparatus 1900 comprises processor 1902 with processor cores 1904. Processor 1903 can be a general-purpose processor, ARM® based processor, a graphics processor, etc. In various embodiments, accelerator chiplet 1901 is coupled to processor 1903 via bus 1905 for bulk communication. Bus 1905 may show relatively high latency and low bandwidth communication because each accelerator core has to communicate to a processor core through bus 1905. One advantage of such configuration is that its allows processor 1903 and accelerator 1901 to communicate through a flexible interface, minimizing changes to the original design. The relatively high latency and low bandwidth of this configuration implies a bulk execution model with large compute tasks being allocated to accelerator 1901.

Figure 20:
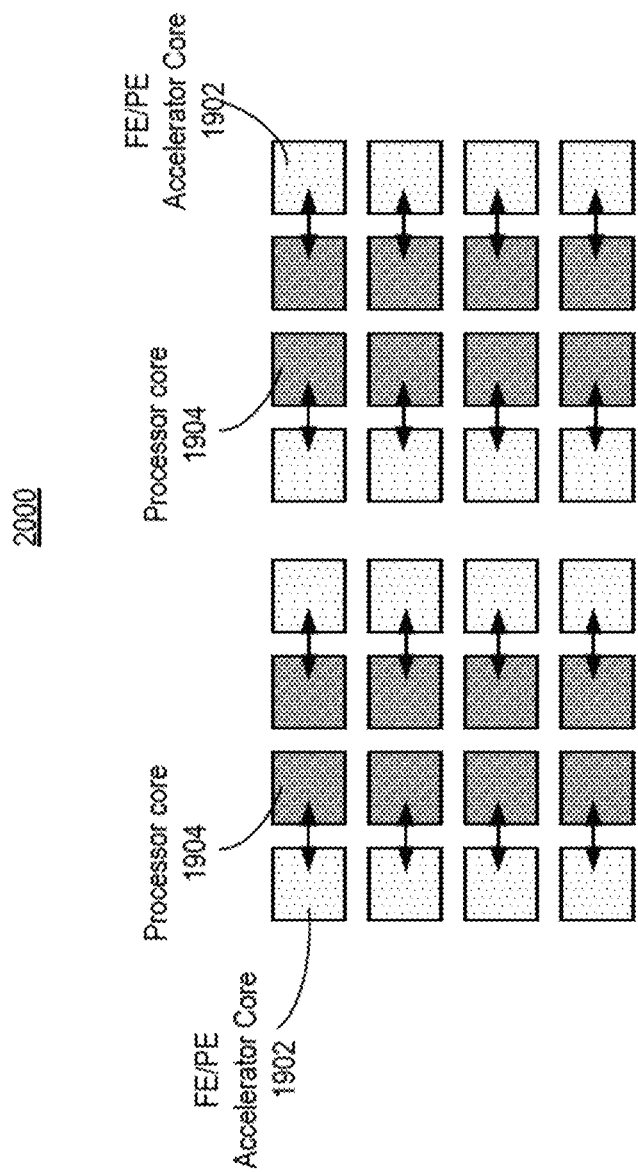
FIG. 20. illustrates an apparatus with distributed accelerator logic core that are tightly coupled to processor cores of a processor chip, in accordance with some embodiments.

FIG. 20. Illustrates apparatus 2000 with distributed accelerator logic core that are tightly coupled to processor cores of a processor chip, in accordance with some embodiments. Compared to apparatus 1900, apparatus 2000 comprises a distributed logic core where each accelerator core 1902 is tightly coupled to a neighboring processor core 1904. This configuration implies very high aggregate bandwidth and low latency (compared to configuration of FIG. 19), with accelerator 1901 acting as an extension of processor 1903. This configuration enables instruction by instruction control of accelerator core 1902, with the processor core 1904 dispatching individual instructions such as large vector or matrix operations on accelerator 1901.

Figure 21:
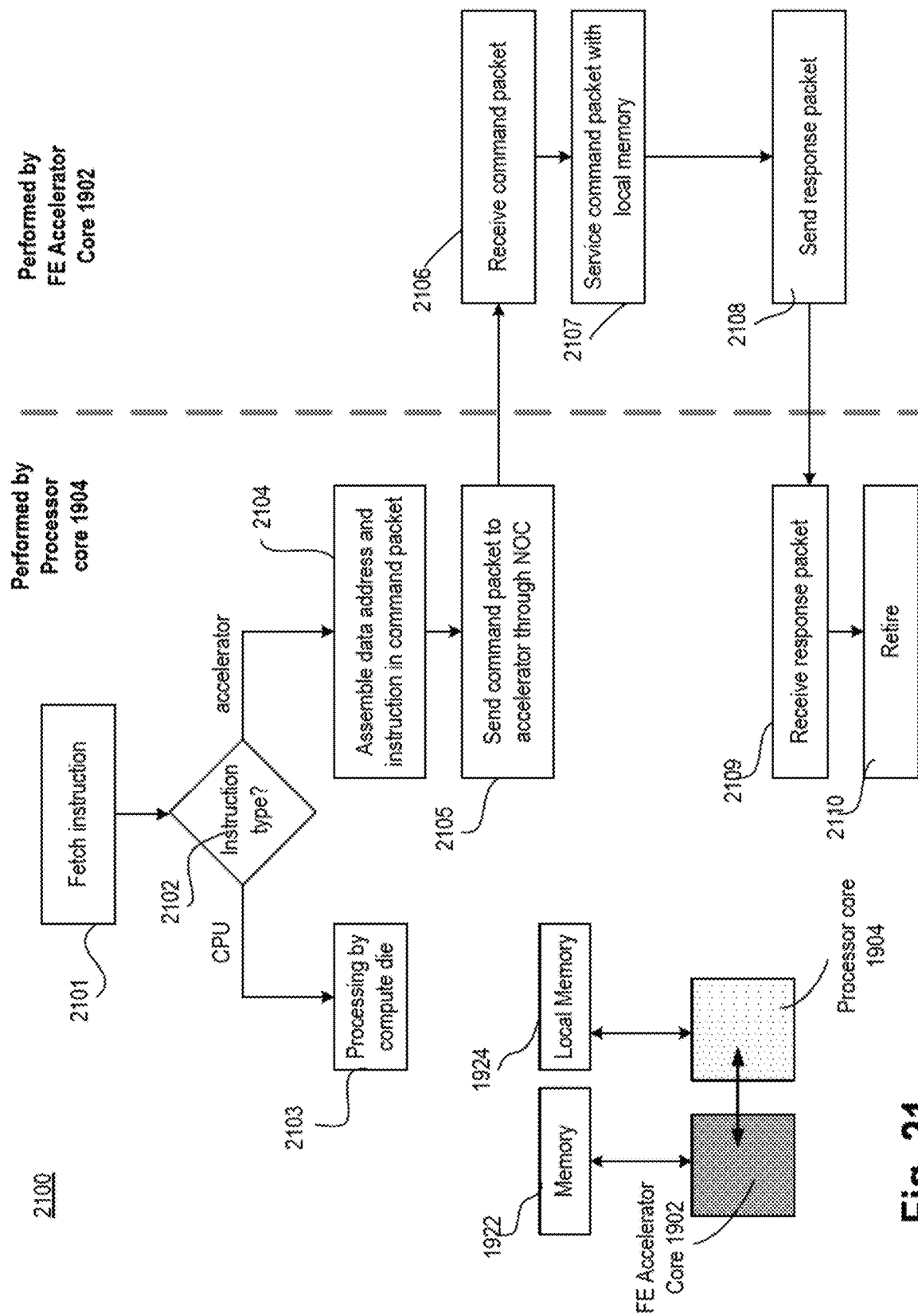
FIG. 21 illustrates a flowchart of communication between a processor core and an accelerator core for tightly coupled configuration of FIG. 20, in accordance with some embodiments.

FIG. 21 illustrates flowchart 2100 of communication between a processor core and an accelerator core for tightly coupled configuration of FIG. 20, in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. In various embodiments, processor core 1904 is tightly coupled to accelerator core 1902 via a point-to-point interconnect or a fast interconnect fabric. Each core has an associated memory. For example, ferroelectric or paraelectric (FE) accelerator core 1902 has associated local memory 1922 while processor core 1904 has a local memory 1924. In some embodiments, processor core 1904 communication instructions to accelerator core 1902, wherein the instructions operate on local data from a local memory coupled to accelerator core 1902. Such a configuration allows for fine-grained control by processor cores 1904 of accelerator control flow.

At block 2101, processor core 1904 fetches an instruction to be executed. At block 2102, processor core 1904 determines whether the instruction is to be executed by processor core 1904 (because it is a processor instruction) or is to be executed by accelerator core 1902. If the instruction is a processor instruction, then at block 2103, a scheduler of processor core 1904 schedules the instruction for processing by processor core 1904 (which is part of a compute die). The process then proceeds to block 2101. If the instruction is an instruction for accelerator core 1902, then the process proceeds to block 2104 where processor core 1904 assembles the data address and the instruction in command packet. At block 2105, the command packet is sent to accelerator core 1902 via an interconnect. The interconnect can be a point-to-point interconnect, a mesh fabric, a ring fabric, or part of a network-on-chip (NOC). At block 2106, accelerator core 1902 receives the command packet. In some embodiments, an acknowledgement is sent by accelerator core 1902 to processor core 1904 once the command packet is received. At block 2107, a scheduler of accelerator core 1902 services the instruction by serving the command packet with data from local memory 1922 using the address in local memory 1922. At block 2108, accelerator 1902 sends the result of the instruction or respond of executing the command packet back to processor core 1904. At block 2109, processor core 1904 receives the packet from accelerator core 1902. At block 2110, processor core 1904 retires the accelerator instructions and marks it as completed. The process then proceeds to lock 2101. In some embodiments, the processor core 1904 waits to receive the packet from the accelerator core 1902 before the instruction is retired. In some embodiments, accelerator core may be interrupted when it receives the command packet to process it.

Figure 22:
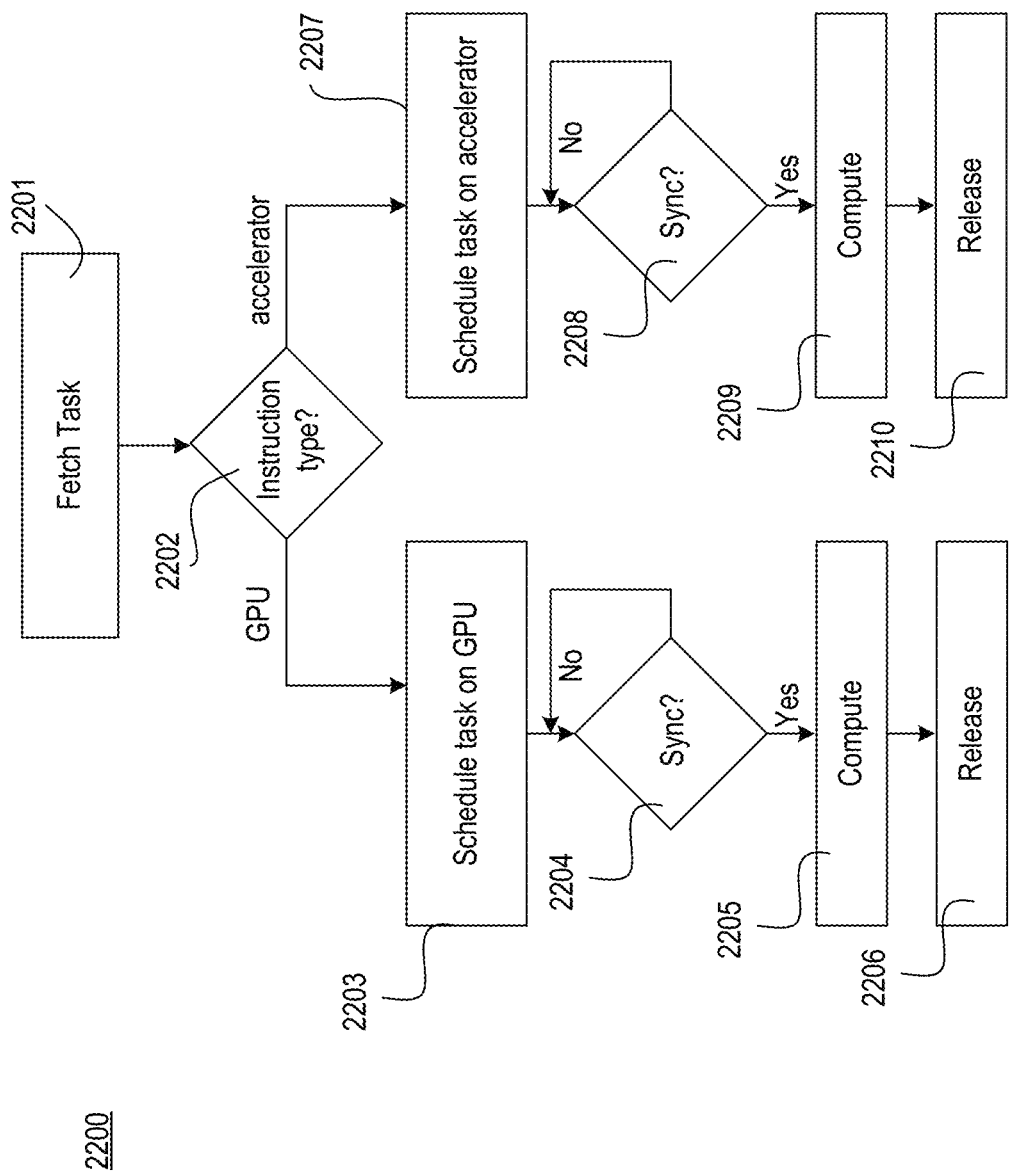
FIG. 22 illustrates a flowchart of a task scheduler that schedules tasks between a graphics processor unit (GPU) and a chiplet accelerator, in accordance with some embodiments.

FIG. 22 illustrates flowchart 2200 of a task scheduler that schedules tasks between a graphics processor unit (GPU) and a chiplet accelerator, in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them.

At block 2201, a CPU core fetches a task in the form of an instruction. The CPU core then dispatches the instruction to either the GPU or an accelerator according to a type of the instruction. At block 2202, the GPU (or GPU code 1904) determines whether the instruction is for processing by the GPU or for processing by accelerator core 1902. If the instruction is an instruction for the GPU, then at block 2203, a scheduler of GPU core 1904 schedules the task. At block 2204, GPU core 1904 determines whether its local memory 1924 is synchronized, and once it is, the process proceeds to block 2205 where GPU core 1904 processes or computes the task. An accelerator has many simultaneous tasks or computations happening at a time, and synchronization may be needed among those parallel tasks or computations. After the task is executed, the instruction is marked completed and the resources to execute the task are released. The process then proceeds to block 2201. If the instruction is an accelerator instruction, then GPU core 1904 instructs accelerator core 1902 to execute the instruction. At block 2207, a scheduler of accelerator core 1902 schedules the task. At block 2208, accelerator core 1902 determines whether its local memory 1922 is synchronized, and once it is, the process proceeds to block 2205 where GPU core 1904 processes or computes the task. A GPU has many simultaneous tasks or computations happening at a time, and synchronization may be needed among those parallel tasks or computations. After the task is executed, the instruction is marked completed and the resources to execute the task by accelerator core 1902 are released. The process then proceeds to block 2201.

Figure 23:
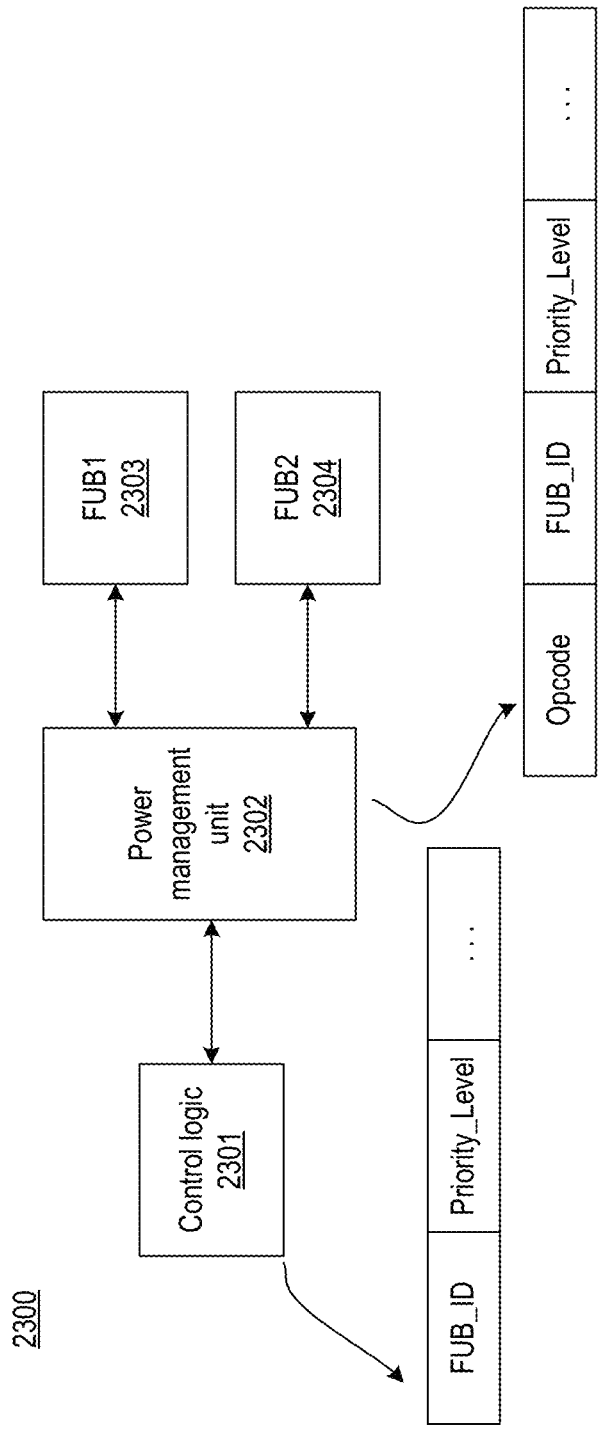
FIG. 23 illustrates a power management architecture with instruction sets to adjust activity level of FUBs according to their assigned priorities, in accordance with some embodiments.

FIG. 23 illustrates power management architecture 2300 with instruction sets to adjust activity level of FUBs according to their assigned priorities, in accordance with some embodiments. In some embodiments, power management architecture 2300 comprises control logic 2301 and power management unit 2302 which is communicatively coupled to several functional unit blocks (FUBs) such as FUB1 2303 and FUB2 2304. In various embodiments, architecture 2300 ensures that the power spent during the execution of an instruction does not exceed thermal design power (TDP), and thermal constraints of the chip or chiplet are satisfied. In some embodiments, architecture 2300 ensure these constraints by making sure that the logic blocks (e.g., FUBs) on multiple dies that are spatially allocated on top of each other are synchronized in activity and power usage.

There are various methods which power management architecture 2300 uses to identify the change in logic activity and thereby updates the allocated power and applies various power management techniques such as a dynamic voltage and frequency scaling (DVFS), power gating, clock gating, sleep states, etc. Methods of identifying change in activity may include a dedicated instruction provided by control logic 2301. In some embodiments, control logic 2301 sets a control register to start the adjustment activity by identifying that certain instruction stream is targeted towards a particular FUB. In some embodiments, power management unit 2302 gets inputs from thermal sensors present on various dies and monitors them for overheating and under-heating of those dies. Such units may receive signals to give priority of execution to one of the FUBs present on particular dies and adjust the execution behavior of various FUBs accordingly.

In some embodiments, FUBs 2303 and 2304 (and other FUBs for that matter) are present on different dies that are stacked on top of one another. In some embodiments, control logic 2301 and power management unit 2302 may be present on either one of the dies in where a FUB is located or a separate die altogether. In some embodiments, control logic 2301 identifies the need for an activity management for various FUBs by analyzing the instruction stream, using a dedicated instruction supported by a micro-architecture, etc. In some embodiments, control logic 2301 implement a protocol to regularly instruct power management unit 2302 to implement a fair policy or a policy that prefers a particular FUB. In some embodiments, control logic 2301 instructs power management unit 2302 to adjust the activity of FUB1 2303 and FUB2 2304 according to their assigned priority levels. In some embodiments, this communication can happen through control registers, dedicated instructions, or similar methods.

One example of a system that can use this type of power management architecture is a CPU complex with stacks of matrix multiplier units (MMU) or vector units on top of control logic and/or scalar units that may include SRAM. While the vectors or matrix units are active on one die, another die containing control logic and/or I/O and or scalar units could go into low power mode with lower frequency or sleep mode with methods such as power gating, clock gating, etc. Once the MMU or vector unit completes execution, it signals power management unit 2302. In some embodiments, power management unit 2302 in turn adjusts the activity of the FUBs 2303 and 2304.

In some embodiments, a power management instruction is designed which includes three fields. These fields are opcode, FUB_ID (identification of a FUB), and priority level (priority_level). In some embodiments, opcode identifies the instruction as power management instruction. In some embodiments, FUB_ID is an identification of a functional block for which the instruction corresponds to. In some embodiments, priority_level field gives a specific priority level (e.g., low, intermediate, and high). In some embodiments, the instruction can contain other desired information as well. In some embodiments, power management unit 2302 can have other input parameters and knows information about the system such as which functional blocks (FUBs) are spatially aligned. In some embodiments, power management unit 2302 can figure out the power budget allocated to each of those FUBs and makes sure that the thermal and current draw constraints are always satisfied. In some embodiments, priority_level field is optional.

In some embodiments, control logic 2301 communicates information to power management unit 2302 with a control register. In some embodiments, this information can also be stored and communicated through a control register which may include the fields such as FUB_ID and priority_level. In some embodiments, the control register is part of power management unit 2302. In some embodiments, the control register can be used for communicating information with power management unit 2302 to let it know how to adjust the power among the various FUBs that are spatially aligned. Here, spatially aligned means FUBs or dies that are placed relative to one another in a spatial coordinate system. For example, the FUBs are on top of each other in a vertical 3D stack. Spatially aligned with reference to FUBs also means whichever FUBs need to work with each other to manage the thermal heat or current draw. In some embodiments, there can be multiple such control registers to convey and store the information about various spatial regions for a system.

Figure 24:
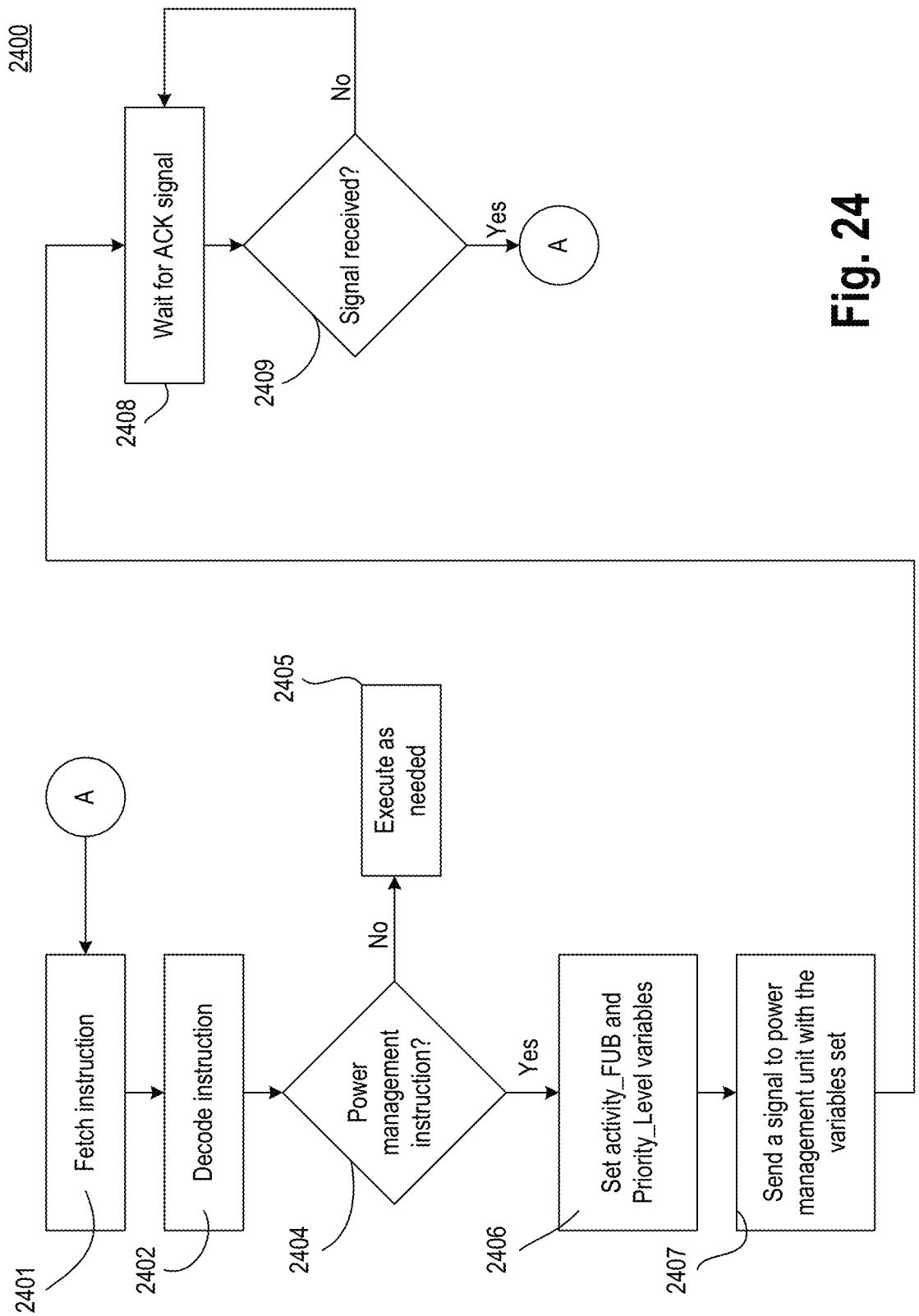
FIG. 24 illustrates a flowchart showing operation of a control logic of the power management architecture of FIG. 23, in accordance with some embodiments.

FIG. 24 illustrates flowchart 2400 showing operation of a control logic of the power management architecture of FIG. 23, in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. Flowchart 2400 describes a mechanism of how control logic 2301 participates in the power management architecture. In some embodiments, control logic 2301 is part of processor core 1904. In some embodiments, control logic 2301 is part of power management unit 2302. In some embodiments, control logic 2301 is independent of power management unit 2302.

At block 2401, control logic 2301 fetches instruction 2401. At block 2302, control logic 2301 decodes the instruction. As part of decoding the instruction, control logic 2301 parses the instruction and separates out the opcode and other parameters. At block 2404, control logic 2301 determines whether the instruction is a power management instruction, and if so, the process proceeds to block 2406. If the instruction is not a power management instruction, at block 2405, control logic 2301 sends the instruction to the correct execution unit for scheduling. In some embodiments, when control logic 2301 receives a power management instruction, it sets variables for power management unit 2302 to act upon. These variables include FUB_ID and priority_level as indicated by block 2406. At block 2407, control logic 2301 sends a signal to power management unit 2302 with the variables set. This signal is an activation signal that the power management unit 2302 listens for in block 2501 with reference to FIG. 5. This type of communication between control logic 2301 and power management unit 2302 can happen with instructions, control register(s), interrupts, or any other suitable methods of communication. At blocks 2408 and 2409, after waiting for a certain period of time (which can be a fixed time or a programmable time), control unit 2301 receives an acknowledgement (ACK) from power management unit 2302. After receiving the ACK, control unit 2301 proceeds to fetch the next instruction, as indicated by identifier 'A'.

Figure 25:
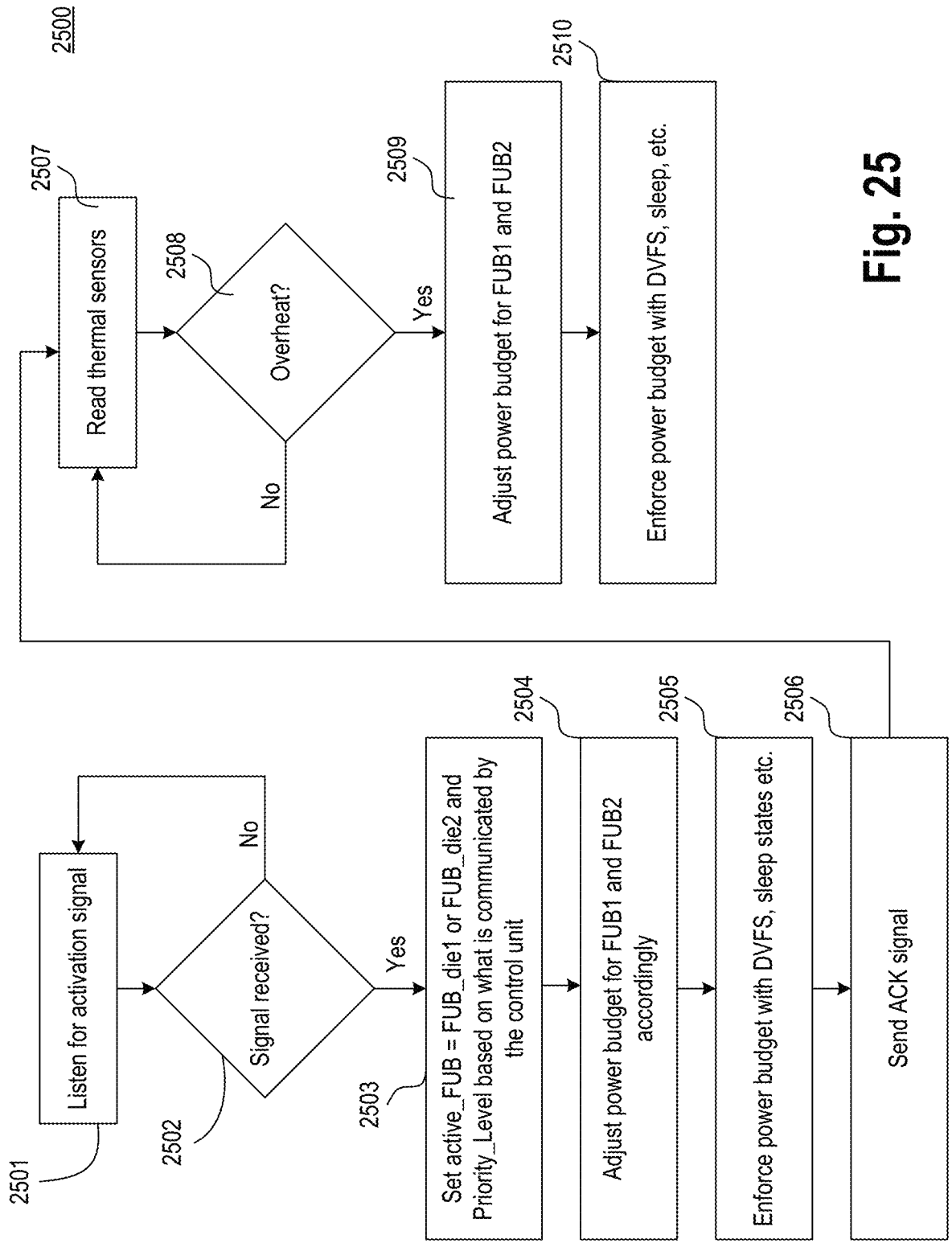
FIG. 25 illustrates a flowchart showing operation of a power management unit of the power management architecture of FIG. 23 for thermal management, in accordance with some embodiments.

FIG. 25 illustrates flowchart 2500 showing operation of a power management unit of the power management architecture of FIG. 23 for thermal management, in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. In some embodiments, power management unit 2302 adjusts the activities of the function unit blocks (FUBs) present on multiple dies on top of each other on a particular spatial area, according to a given activity level.

At block 2501, power management unit 2302 listens for an activation signal. As discussed with reference to FIG. 4, the activation signal is sent to the power management unit 2302 by control unit 2301. The process is a like a polling process, as indicated by block 2502, where power management unit 2302 continues to listen for the activation signal and then sets the variables of its instruction once the activation signal is received. At block 2503, power management unit 2302 reads values of FUB_ID and priority_level provided by control logic 2301. Power management unit 2302 sets the active_FUB (current active FUB) as FUB1 of die 1 or FUB2 of die 2, and also sets the priority_level based on what is communicated by control unit 2301. At block 2504, power management unit 2302 adjust the power budget for FUB1 and FUB2, accordingly. For example, power management unit 2302 sets the limit of activity level (e.g., activity factor) for FUB1 and FUB2 to meet a power or thermal budget. At block 2505, power management unit 2302 enforces the power and/or thermal budget using any suitable scheme. For example, power management unit 2302 applies dynamic supply voltage and frequency tuning for FUB1 and/or FUB2 to meet power and/or thermal budget. Other techniques include clock gating, power gating, clock stretching, supply voltage adjustment, various sleep states (e.g., such as those defined by the Advanced Configuration and Power interface).

After applying the power management technique(s), power management unit 2302 sends an ACK signal to control logic 2301 confirming application of the power management techniques. At blocks 2507 and 2508, power management unit 2302 continuously reads temperature readings from thermal sensors to determine whether the FUB or die is overheating. If the FUB or die is overheating, power management unit 2302 adjusts the power budget for FUB1 and FUB2 at block 2509. This adjustment is made to lower the heat generated by FUB1 and/or FUB2. At block 2510, power management unit 2302 enforces the adjusted power budget with any of the power management techniques discussed herein. As such, power management unit 2302 ensures that the FUBs are working within the thermal constraints while giving priority of execution to FUBs on a particular die (based on the priority_level defined in the instruction). In some embodiments, power management unit 2302 communicates with control logic 2301 using control registers, interrupts, and/or instructions.

Figure 26:
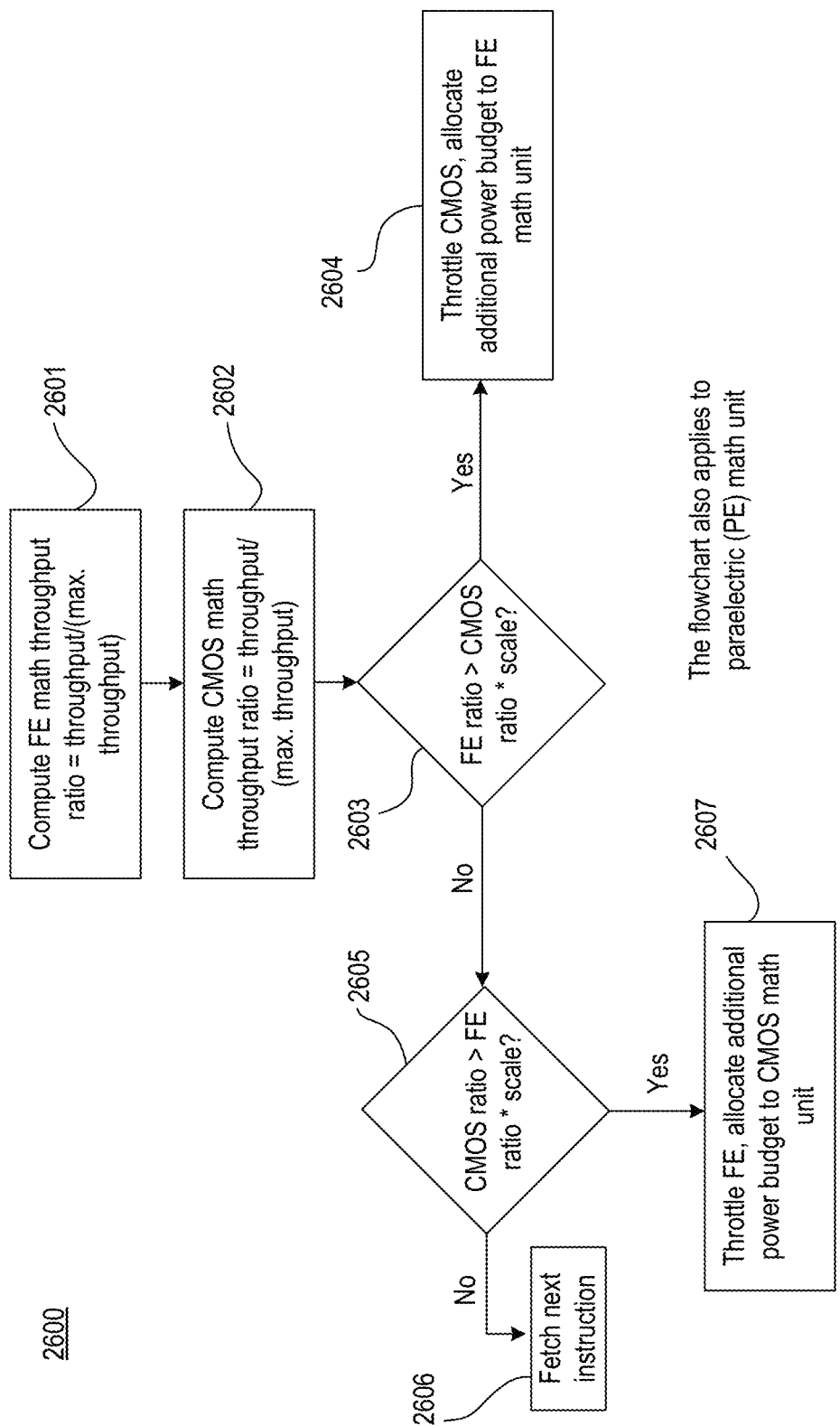
FIG. 26 illustrates a flowchart for scheduling tasks between ferroelectric or paraelectric logic and non-ferroelectric logic (e.g., CMOS logic), in accordance with some embodiments.

FIG. 26 illustrates flowchart 2600 for scheduling tasks between ferroelectric or paraelectric logic and non-ferroelectric logic (e.g., CMOS logic), in accordance with some embodiments. While various blocks in the flowchart are illustrated in a particular order, the order can be modified.

For example, some blocks can be performed in parallel, and some blocks can be performed before others. Functions performed by some, or all blocks described herein are implemented in software, hardware, or a combination of them. In various embodiments, when a ferroelectric or paraelectric logic based chiplet (having majority, minority and/or threshold gates) is attached to a power limited die, careful management is needed for the current power budget and thermal budget. The current power budget is a short-term constraint and may require rapid response to avoid voltage droops. Conversely, thermal budget is a longer-term constraint and is mitigated using longer term responses. In some embodiments, power gating and clock gating are performed to limit the power of both a ferroelectric or paraelectric logic block as well as a CMOS logic block. In some embodiments, since the ferroelectric or paraelectric logic and power budget for the ferroelectric or paraelectric logic block and the CMOS logic block have some overlapping functionality, lowering power to the ferroelectric or paraelectric logic blocks is preferred for a similar function of CMOS logic block. In some embodiments, power can be immediately reduced by power gating, clock gating, reducing frequency by adjusting output of a clock source, clock stretching, inserting no-operations (NoOPs), etc. In some embodiments, over longer time periods, core voltage may be dropped to further reduce power and create additional power budget for the ferroelectric or paraelectric logic.

In some embodiments, power management unit 2302 manages power for ferroelectric or paraelectric based logic blocks and CMOS based logic blocks. The following example is illustrated for math units that are implemented by ferroelectric or paraelectric logic blocks and CMOS logic blocks. At block 2601, power management unit 2302 computes the throughput ratio of a ferroelectric or paraelectric math unit. This ratio (FE ratio) is obtained by dividing throughput with a maximum throughput of the ferroelectric or paraelectric math unit. At block 2602, power management unit 2302 computes the throughput ratio of the CMOS math unit. This ratio (CMOS ratio) is obtained by dividing throughput with a maximum throughput of the CMOS math unit.

At block 2603, power management unit 2302 determines whether the throughput ratio for the ferroelectric or paraelectric math unit (FE ratio) is greater than the throughput ratio for the CMOS math unit (CMOS ratio). If the FE ratio is greater than the CMOS ratio, power management unit 2302 throttles the CMOS math unit, and allocates additional power budget to the ferroelectric or paraelectric math unit as indicated by block 2604. If the FE ratio is less than or equal to the CMOS ratio, power management unit 2302 then proceeds to block 2605. At block 2605, power management unit 2302 determines whether the CMOS ratio is greater than a scaled version of the FE ratio. Here scale generally refers to a predetermined factor by an architect of the chip to allow for FE or PE ratio to exceed CMOS ratio by a certain factor. This factor is dependent on the total power budget, maximum throughput of each of the units and prioritization policy of the architecture for different functional units such as CMOS and FE FUB units.

If the CMOS ratio is greater than a scaled version of FE ratio, power management unit 2302 throttles the FE math unit, and allocates additional power budget to the CMOS math unit as indicated by block 2607. If the CMOS ratio is less than or equal to a scaled version of FE ratio, a scheduler fetches the next instruction for execution. In various embodiments, continuing with the example of math units, the CMOS math units are clock gated when work is scheduled on the ferroelectric or paraelectric math units. Ferroelectric or paraelectric math units are clock gated when work is scheduled on the CMOS math units. Clock gating may have a latency of about 1 to 2 cycles. Given the comparatively higher latency of power gating (e.g., about 10 cycles), power gating heuristics may be used to predict the future occurrence of ferroelectric or paraelectric math unit instructions, in accordance with some embodiments.

Figure 27:
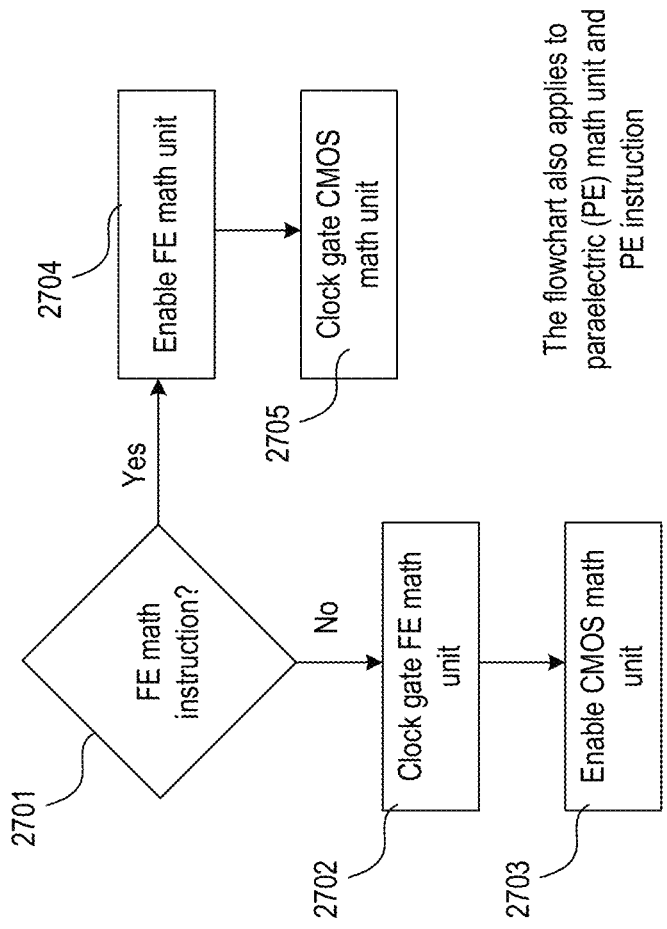
FIG. 27 illustrates a flowchart for cycle-by-cycle clock gating for ferroelectric or paraelectric logic and non-ferroelectric logic (e.g., CMOS logic), in accordance with some embodiments.

FIG. 27 illustrates flowchart 2700 for cycle-by-cycle clock gating for ferroelectric (FE) or paraelectric (PE) logic and non-ferroelectric logic (e.g., CMOS logic), in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. Flowchart 2700 also uses the math unit example and its instruction. At block 2701, when power management unit 2302 (or any other suitable logic) determines that the instruction is a ferroelectric or paraelectric (FE) math instruction, then the process proceeds to block 2704. At block 2704, the FE math unit is enabled and the math instruction is executed. At block 2705, power management unit 2302 clock gates the CMOS math unit because the instruction is being executed by the FE math unit. If the instruction is not an FE math instruction, the process proceeds to block 2702. At block 2702, power management unit 2302 clock gates the FE math unit. At block 2703, power management unit 2302 enables the CMOS math unit to execute the non-FE math instruction.

Figure 28:
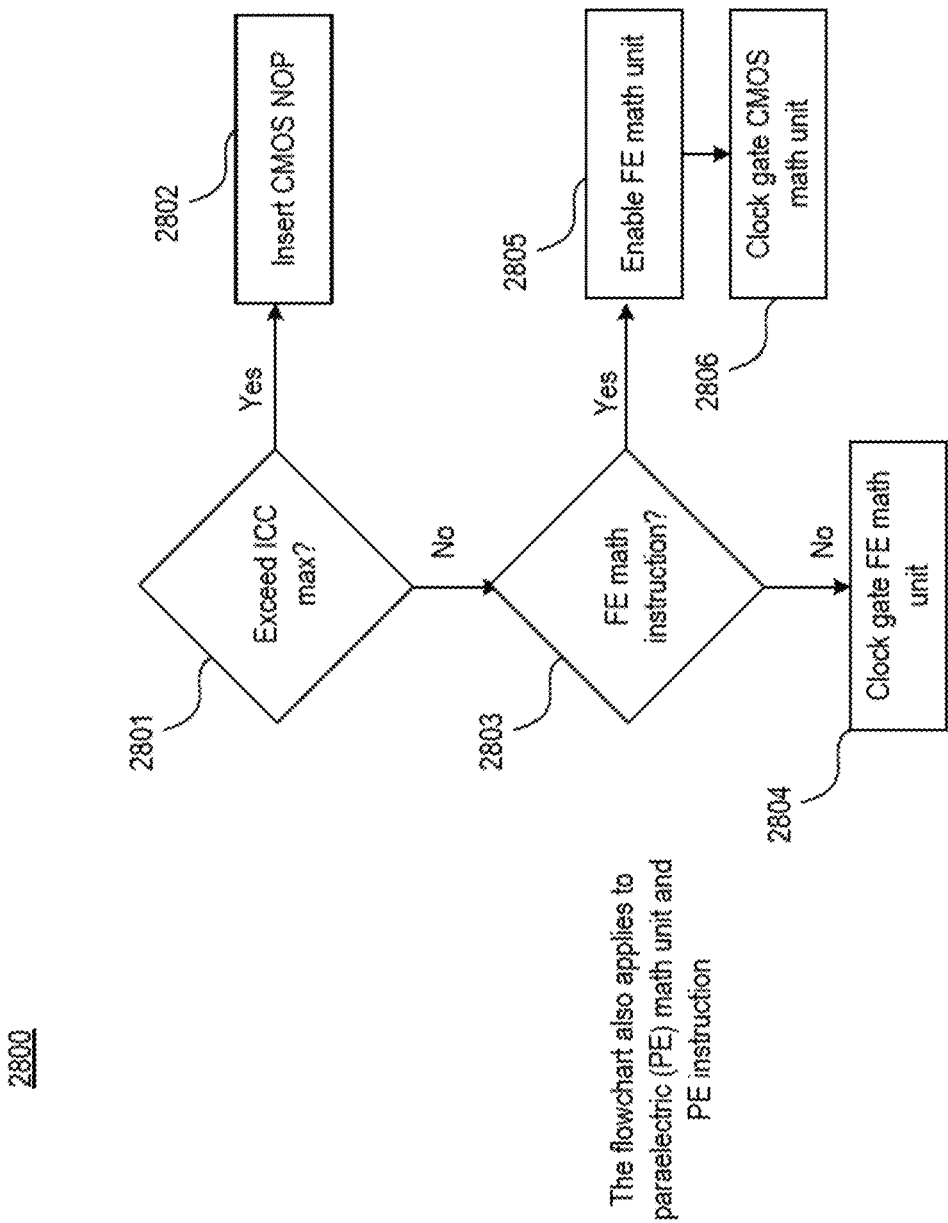
FIG. 28 illustrates a flowchart showing cycle-by-cycle clock gating for ferroelectric or paraelectric logic and non-ferroelectric logic (e.g., CMOS logic) and cycle throttling with insertion of no-operations (NOP), in accordance with some embodiments.

FIG. 28 illustrates flowchart 2800 showing cycle-by-cycle clock gating for ferroelectric or paraelectric logic and non-ferroelectric logic (e.g., CMOS logic) and cycle throttling with insertion of no-operations (NOP), in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. At block 2801, power management unit 2302 determines whether the maximum current (ICC max) is exceeded by a given processor unit or SoC. If the ICC max is exceeded, then at block 2802, power management unit 2302 instructs the scheduler to insert CMOS no-operation instructions (No-Ops). If the ICC Max limit is not exceeded, then power management unit 2302 determines whether the instruction is a ferroelectric or paraelectric math instruction, as indicated by block 2803. If the instruction is a ferroelectric or paraelectric math instruction, then the process proceeds to block 2805. At block 2805, power management unit 2302 enables the ferroelectric or paraelectric math unit. At block 2806, power management unit 2302 clock gates the CMOS math unit. If the instruction is not a ferroelectric or paraelectric math instruction, then at block 2804 power management unit 2302 clock gates the ferroelectric or paraelectric math unit.

Figure 29:
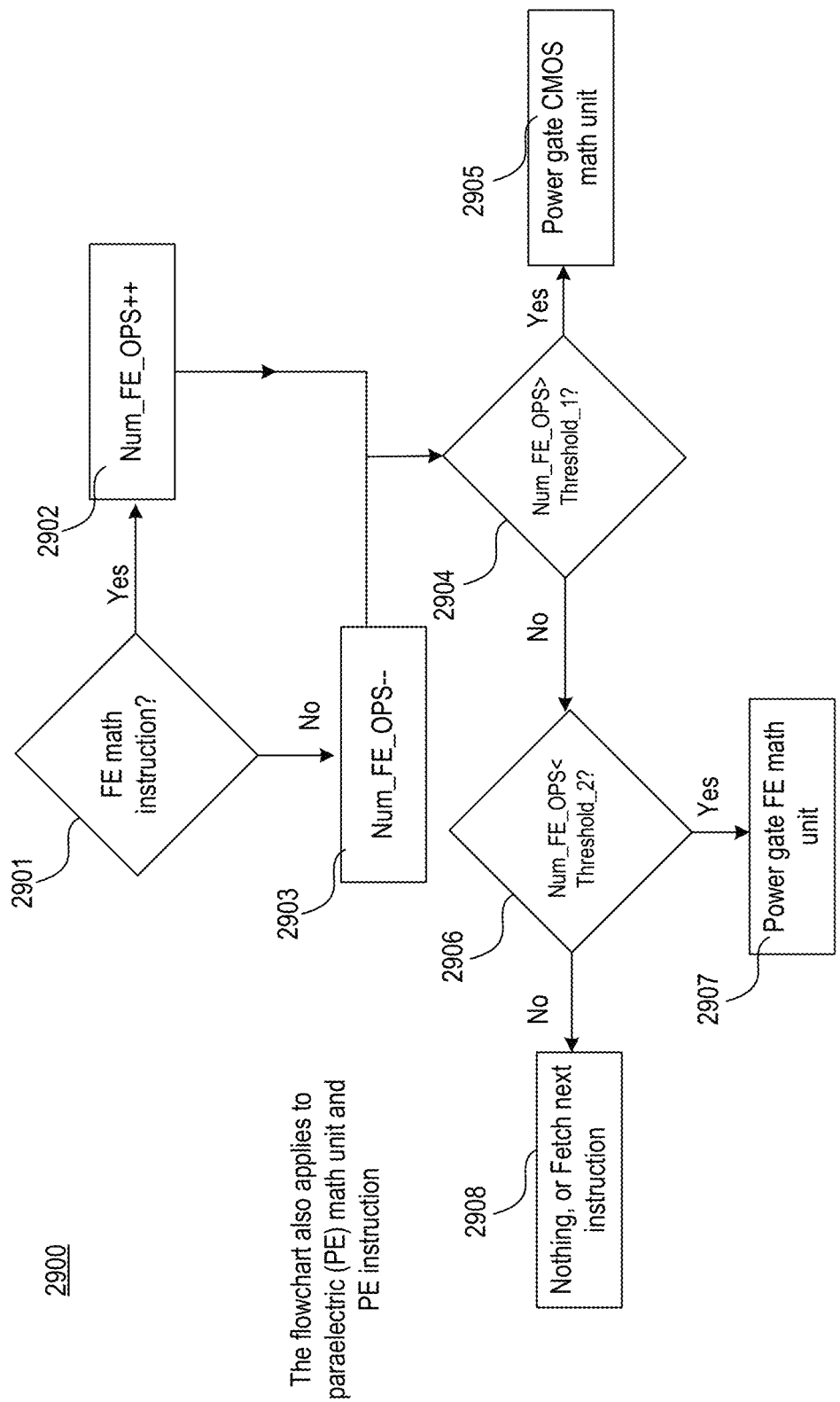
FIG. 29 illustrates a flowchart showing heuristic based power gating for ferroelectric or paraelectric logic and non-ferroelectric logic (e.g., CMOS logic), in accordance with some embodiments.

FIG. 29 illustrates flowchart 2900 showing heuristic based power gating for ferroelectric or paraelectric logic and non-ferroelectric logic (e.g., CMOS logic), in accordance with some embodiments. While various blocks in the flowchart are illustrated in a particular order, the order can be modified. For example, some blocks can be performed in parallel, and some blocks can be performed before others. Functions performed by some, or all blocks described herein are implemented in software, hardware, or a combination of them. At block 2901, power management unit 2302 determines whether the instruction is a ferroelectric or paraelectric math instruction. If it is, then power management unit 2302 increments the number of ferroelectric or paraelectric operations by one (e.g., Num_FE_OPS++). If the instruction is not a ferroelectric or paraelectric math instruction, then at block 2903, power management unit 2302 decrements the number of ferroelectric or paraelectric operations by one (e.g., Num_FE_OPS--). The process then proceeds to block 2904. At block 2904, power management unit 2302 determines whether the number of ferroelectric or paraelectric operations (Num_FE_OPS) is greater than a first threshold (Threshold_1) If so, then at block 2905, power management unit 2302 power gates the CMOS math unit. Otherwise, at block 2906, power management unit 2302 determines whether the number of ferroelectric or paraelectric operations (Num_FE_OPS) is less than a second threshold (Threshold_2). If so, the process proceeds to block 2907 where power management unit 2302 power gates the ferroelectric or paraelectric math unit. Otherwise, the schedule fetches the next instruction at block 2908.

In some embodiments, power gating of FE math unit and CMOS math unit can be replaced with a different mechanism. Such a mechanism may include checking at regular intervals for power draw and removing the power gating as needed if the power draw is well below the TDP (thermal design power).

Figure 30:
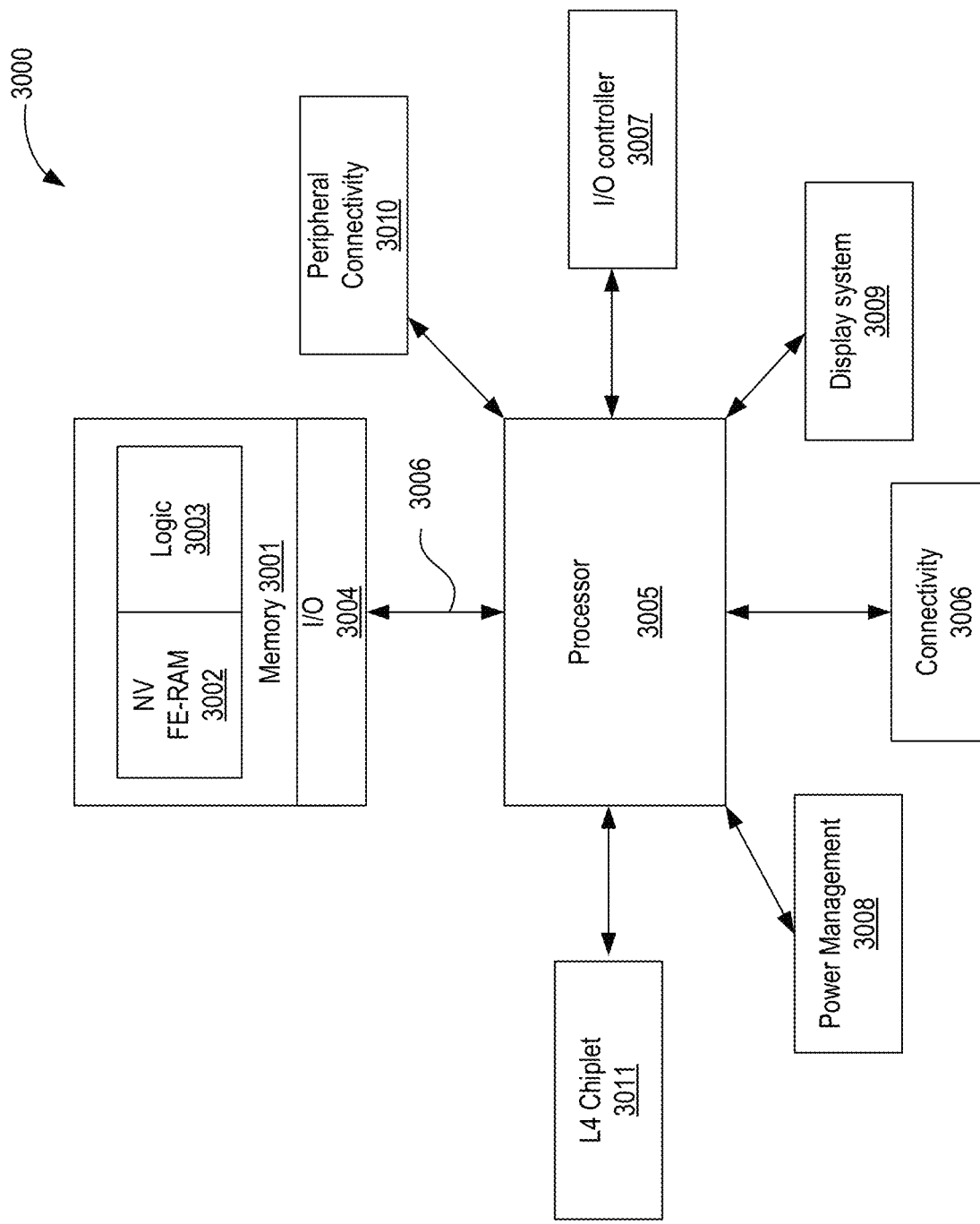
FIG. 30 illustrates a computing system with processor coupled to a ferroelectric or paraelectric chiplet, in accordance with some embodiments.

FIG. 30 illustrates a computing system with a processor coupled to a ferroelectric or paraelectric chiplet, in accordance with some embodiments. System-on-chip (SoC) 3000 comprises memory 3001 having static random-access memory (SRAM) or FE based random-access memory FE-RAM, or any other suitable memory. The memory can be non-volatile (NV) or volatile memory. Memory 3001 may also comprise logic 3003 to control memory 3002. For example, write and read drivers are part of logic 3003. These drivers and other logic are implemented using the majority or threshold gates of various embodiments. The logic can comprise majority or threshold gates and traditional logic (e.g., CMOS based NAND, NOR etc.).

SoC further comprises a memory I/O (input-output) interface 3004. The interface may be double-data rate (DDR) compliant interface or any other suitable interface to communicate with a processor. Processor 3005 of SoC 3000 can be a single core or multiple core processor. Processor 3005 can be a general-purpose processor (CPU), a digital signal processor (DSP), or an Application Specific Integrated Circuit (ASIC) processor. In some embodiments, processor 3005 is an artificial intelligence (AI) processor (e.g., a dedicated AI processor, a graphics processor configured as an AI processor).

AI is a broad area of hardware and software computations where data is analyzed, classified, and then a decision is made regarding the data. For example, a model describing classification of data for a certain property or properties is trained over time with large amounts of data. The process of training a model requires large amounts of data and processing power to analyze the data. When a model is trained, weights or weight factors are modified based on outputs of the model. Once weights for a model are computed to a high confidence level (e.g., 95% or more) by repeatedly analyzing data and modifying weights to get the expected results, the model is deemed "trained." This trained model with fixed weights is then used to make decisions about new data. Training a model and then applying the trained model for new data is hardware intensive activity. In some embodiments, the AI processor has reduced latency of computing the training model and using the training model, which reduces the power consumption of such AI processor systems.

Processor 3005 may be coupled to a number of other chip-lets that can be on the same die as SoC 3000 or on separate dies. These chip-lets include connectivity circuitry 3006, I/O controller 3007, power management 3008, and display system 3009, and peripheral connectivity 3006.

Connectivity 3006 represents hardware devices and software components for communicating with other devices. Connectivity 3006 may support various connectivity circuitries and standards. For example, connectivity 3006 may support GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. In some embodiments, connectivity 3006 may support non-cellular standards such as WiFi.

I/O controller 3007 represents hardware devices and software components related to interaction with a user. I/O controller 3007 is operable to manage hardware that is part of an audio subsystem and/or display subsystem. For example, input through a microphone or other audio device can provide input or commands for one or more applications or functions of SoC 3000. In some embodiments, I/O controller 3007 illustrates a connection point for additional devices that connect to SoC 3000 through which a user might interact with the system. For example, devices that can be attached to the SoC 3000 might include microphone devices, speaker or stereo systems, video systems or other display devices, keyboard or keypad devices, or other I/O devices for use with specific applications such as card readers or other devices.

Power management 3008 represents hardware or software that perform power management operations, e.g., based at least in part on receiving measurements from power measurement circuitries, temperature measurement circuitries, charge level of battery, and/or any other appropriate information that may be used for power management. By using majority and threshold gates of various embodiments, non-volatility is achieved at the output of these logic. Power management 3008 may accordingly put such logic into low power state without the worry of losing data. Power management may select a power state according to Advanced Configuration and Power Interface (ACPI) specification for one or all components of SoC 3000.

Display system 3009 represents hardware (e.g., display devices) and software (e.g., drivers) components that provide a visual and/or tactile display for a user to interact with the processor 3005. In some embodiments, display system 3009 includes a touch screen (or touch pad) device that provides both output and input to a user. Display system 3009 may include a display interface, which includes the particular screen or hardware device used to provide a display to a user. In some embodiments, the display interface includes logic separate from processor 3005 to perform at least some processing related to the display.

Peripheral connectivity 3010 may represent hardware devices and/or software devices for connecting to peripheral devices such as printers, chargers, cameras, etc. Peripheral connectivity 3010 say support communication protocols, e.g., PCIe (Peripheral Component Interconnect Express), USB (Universal Serial Bus), Thunderbolt, High-Definition Multimedia Interface (HDMI), Firewire, etc.

In various embodiments, SoC 3000 includes coherent cache or memory-side buffer chiplet 3011 which include ferroelectric or paraelectric memory. Coherent cache or memory-side buffer chiplet 3011 can be coupled to processor 3005 and/or memory 3001 according to the various embodiments described herein (e.g., via silicon bridge or vertical stacking).

Figure 31:
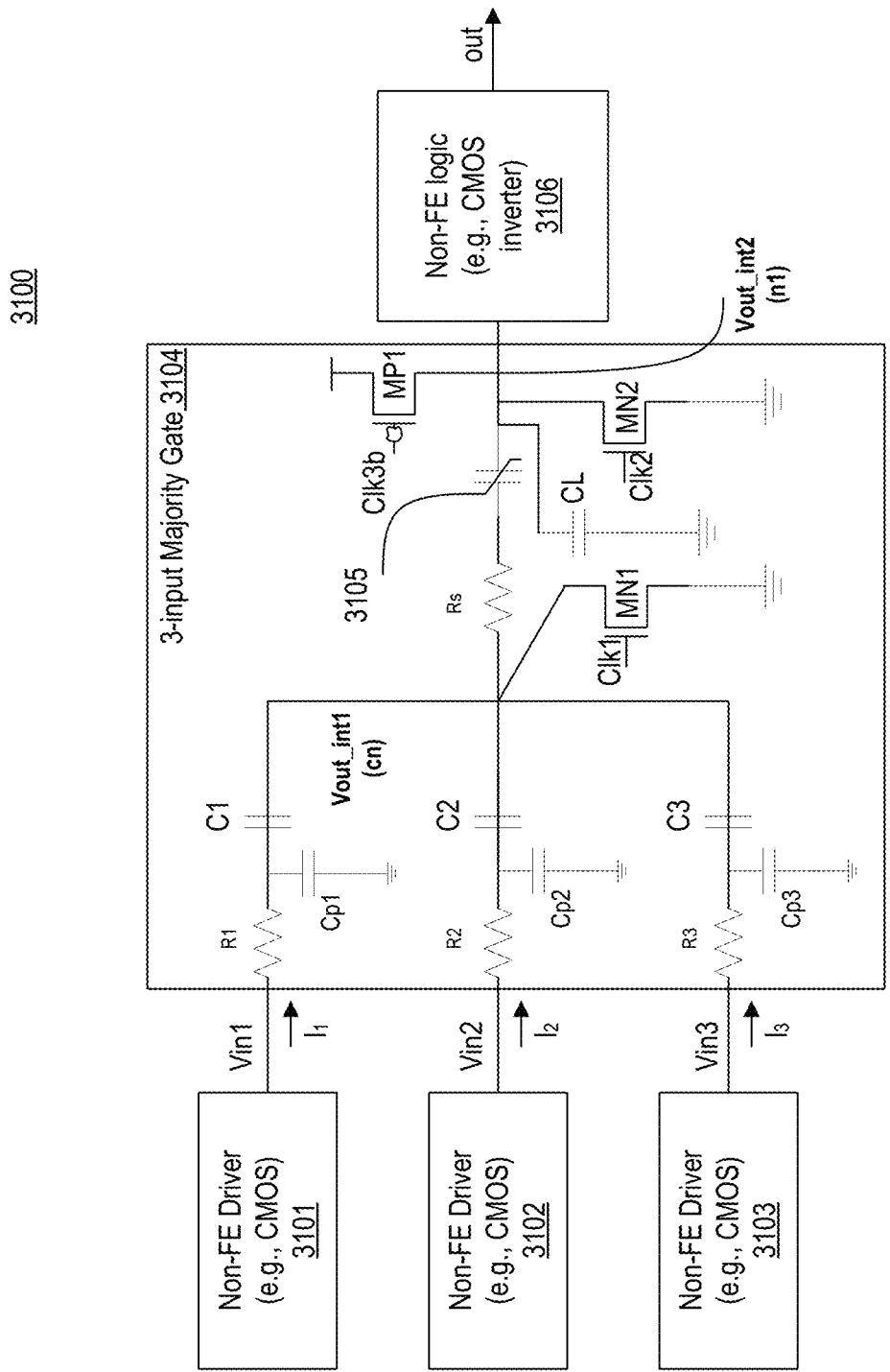
FIG. 31 illustrates a 3-input majority gate with linear input capacitors and a non-linear output capacitor, in accordance with some embodiments.

FIG. 31 illustrates 3-input majority gate 3100 with linear input capacitors and a non-linear output capacitor, in accordance with some embodiments. Logic Gate 3100 comprises first, second, and third drivers 3101, 3102, and 3103, respectively. These drivers can be analog drivers generating analog signals or digital drivers generating signals that toggle between ground and the power supply rail, or a combination of analog or digital drivers. For example, driver 3101 is a CMOS driver such as a buffer, inverter, a NAND gate, NOR gate, etc., while driver 3102 is an amplifier generating a bias signal. The drivers provide input signals Vin1 (and current $I_1$), Vin2 (and current $I_2$), and Vin3 (and current $I_3$) to the three inputs of 3-input majority gate 3104.

In various embodiments, 3-input majority gate 3104 comprises three input nodes Vin1, Vin2, and Vin3. Here, signal names and node names are interchangeably used. For example, Vin1 refers to node Vin1 or signal Vin1 depending on the context of the sentence. 3-input majority gate 3103 further comprises capacitors C1, C2, and C3. Here, resistors R1, R2, and R3 are interconnect parasitic resistances coupled to capacitors C1, C2, and C3 respectively. In various embodiments, capacitors C1, C2, and C3 are non-ferroelectric capacitors. In some embodiments, the non-ferroelectric capacitor includes one of: dielectric capacitor, para-electric capacitor, or non-linear dielectric capacitor.

A dielectric capacitor comprises first and second metal plates with a dielectric between them. Examples of such dielectrics are: HfO, ABO3 perovskites, nitrides, oxy-fluorides, oxides, etc.

A para-electric capacitor comprises first and second metal plates with a para-electric material between them. In some embodiments, f-orbital materials (e.g., lanthanides) are doped to the ferroelectric materials to make paraelectric material. Examples of room temperature paraelectric material include: SrTiO3, Ba(x)Sr(y)TiO3 (where x is −0.5, and y is 0.95)), HfZrO2, Hf—Si—O, La-substituted PbTiO3, PMN-PT based relaxor ferroelectrics.

A dielectric capacitor comprises first and second metal plates with non-linear dielectric capacitor between them. The range for dielectric constant is 1.2 to 10000. The capacitors C1, C2, and C3 can be implemented as MIM (metal-insulator-metal) capacitor technology, transistor gate capacitor, hybrid of metal capacitors or transistor capacitor. The capacitors C1, C2, and C3 can be implemented as MIM (metal-insulator-metal) capacitor technology, transistor gate capacitor, or hybrid of metal capacitors or transistor capacitor.

One terminal of the capacitors C1, C2, and C3 is coupled to a common node cn. This common node is coupled to node n1, which is coupled to a first terminal of a non-linear polar capacitor 3105. The majority function is performed at the common node cn, and the resulting voltage is projected on to capacitor 3105. For example, the majority function of the currents ($I_1$, $I_2$, and $I_3$) on node cn results in a resultant current that charges capacitor 3105. Table 1 illustrates the majority function f(Majority Vin1, Vin2, Vin3).

TABLE 1

| Vin1 | Vin2 | Vin3 | cn (f(Majority Vin1, Vin2, Vin3)) |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 32:
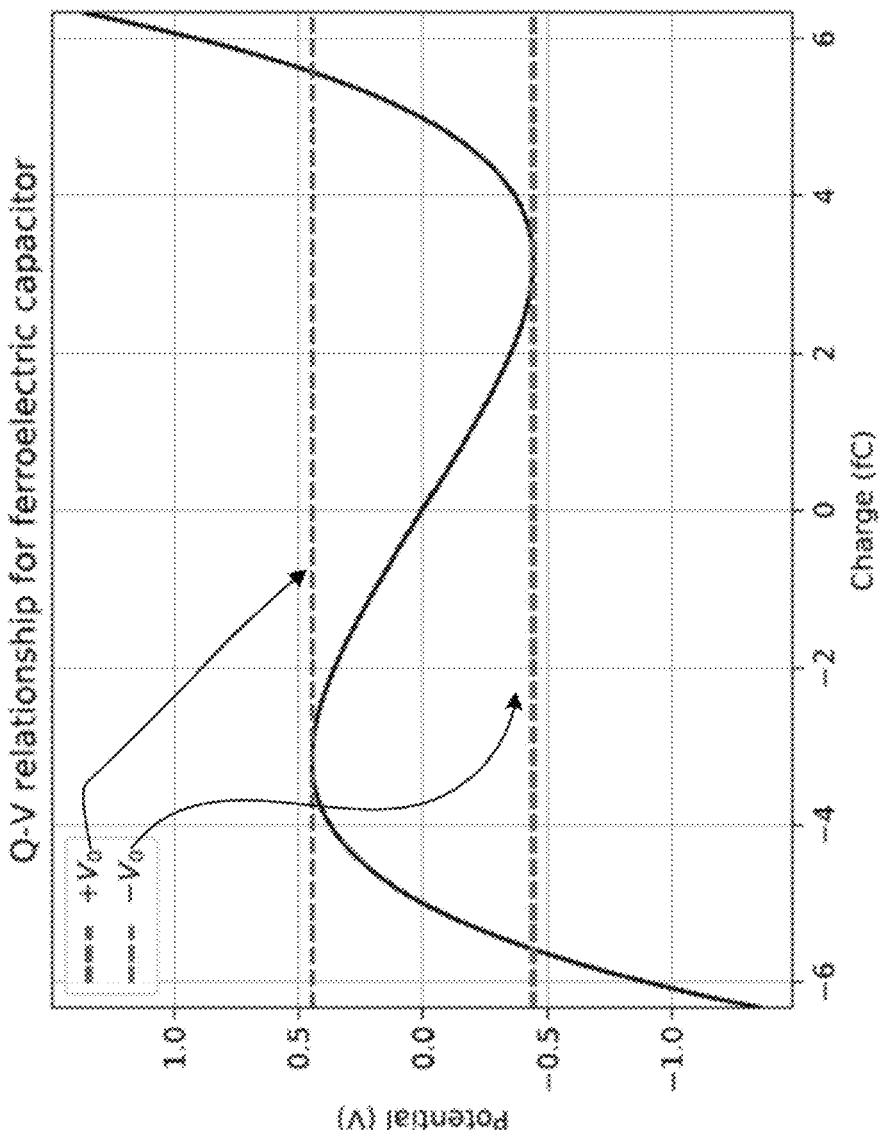
FIG. 32 illustrates a plot showing Q-V relationship for ferroelectric capacitor, in accordance with some embodiments.

A capacitor with FE material (also referred to as a FEC) is a non-linear capacitor with its potential $V_F(Q_F)$ as a cubic function of its charge. FIG. 32 illustrates plot 3200 showing characteristics of a FEC. Plot 3200 is a charge-voltage (Q-V) plot for a block f Pb(Zr$_{0.5}$Ti$_{0.5}$)O$_3$ of area (100 nm)$^2$ and thickness 20 nm (nanometer). Plot 3200 shows local extrema at $+/-V_o$ indicated by the dashed lines. Here, the term $V_c$ is the coercive voltage. In applying a potential V across the FEC, its charge can be unambiguously determined only for $|V|>V_o$. Otherwise, the charge of the FEC is subject to hysteresis effects.

Referring to FIG. 31, in some embodiments, N odd number of capacitors are coupled to a single FEC to form a majority gate. In this case, N=3. The measured charge on the FEC ($Q_F$) is the output of the majority gate. Solving for a steady-state solution, the parasitic resistors are ignored and the input potentials $V_i$ (or Vin) are assumed to be constant. In this case, the charge across each linear capacitor (C1, C2, C3) is:

$$Q_i = C_i(V_i - V_F) \tag{1}$$

The charge summed at node Cn and across FEC 3105 is express as:

$$Q_F = \sum_i Q_i \tag{2}$$

$$Q_F = \sum_i C_i V_i - \sum_i C_i V_F \tag{3}$$

$$Q_F = \sum_i C_i V_i - C V_F(Q_F) \tag{4}$$

$$V_F(Q_F) = \sum_i \frac{C_i}{C} V_i - \frac{Q_F}{C} \tag{5}$$

Here, $C = \Sigma_i C_i$ is the sum of the capacitances. In the limit, $C \to \infty$, the following is achieved:

$$V_F(Q_F) = \sum_i \frac{C_i}{C} V_i = \bar{V} \tag{6}$$

The potential across FEC 3105 is the average of all the input potentials weighted by the capacitances (e.g., C1, C2, and C3).

When $C_i = C/N$ are all equal, $V_F$ is just a simple mean. To ensure that $$Q_F = V_F^{-1}(\bar{V}) \tag{7}$$

is well defined, all possible values of V have magnitudes greater than $V_c$, the coercive potential. Assuming binary input of $+/-V_s$, the potential with the smallest magnitude is:

$$\bar{V} = V_s/N \tag{8}$$

This occurs when (N+1)/2 of the inputs are $+V_s$ and (N−1)/2 are $-V_s$. Then, $$V_s > NV_C \qquad (9)$$

Figure 33:
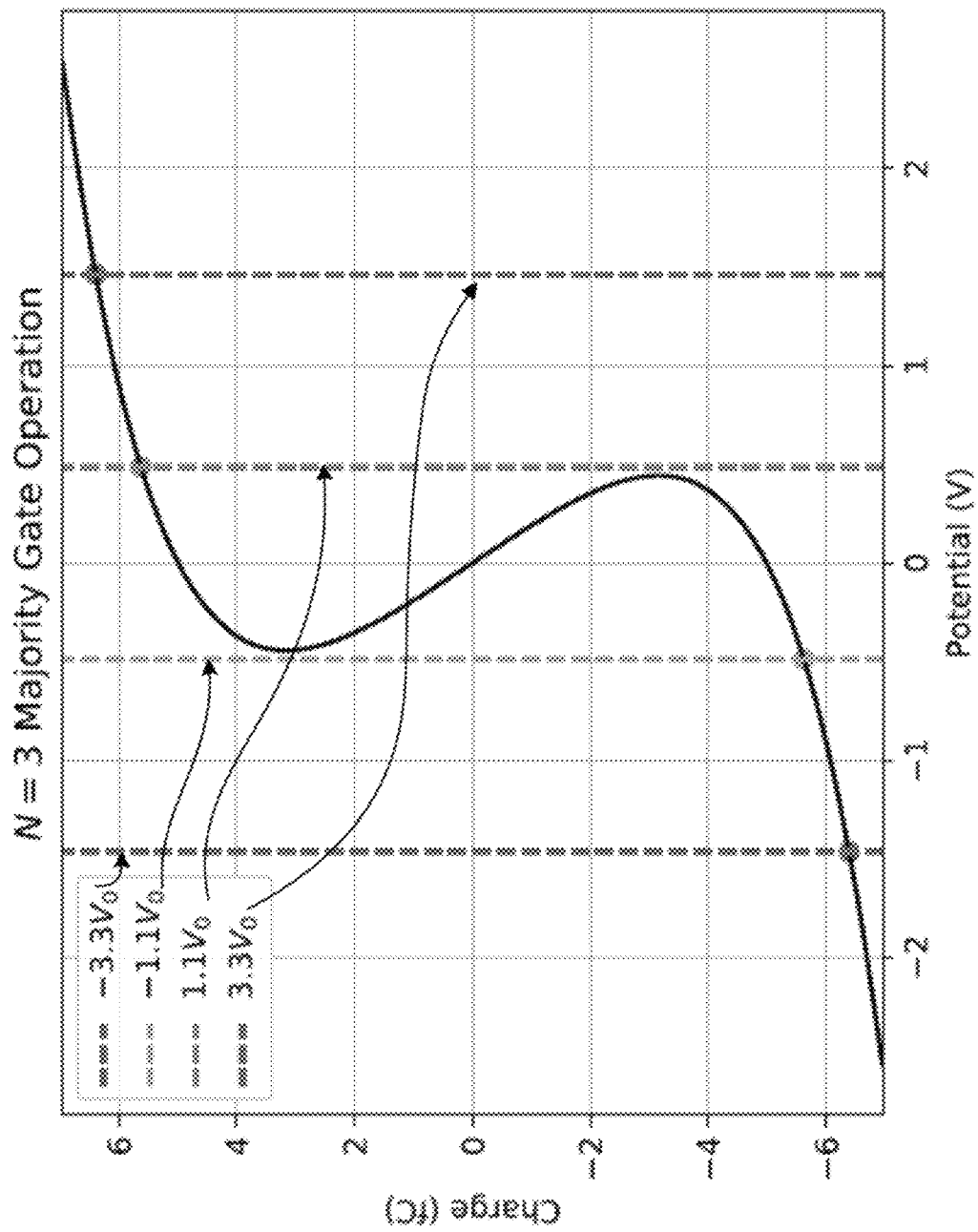
FIG. 33 illustrates a plot showing Q-V relationship for ferroelectric capacitor for a majority gate operation, in accordance with some embodiments.

The output of the majority gate at node n1 is expressed by FIG. 33. FIG. 33 illustrates plot 3300 showing the output of a 3-input majority gate, in accordance with some embodiments.

As an example, for N=3, the possible inputs are:

$$\bar{V} \in \left\{ -\frac{3}{3}V_s, -\frac{1}{3}V_s, +\frac{1}{3}V_s, +\frac{3}{3}V_s \right\} \qquad (10)$$

Referring to FIG. 31, since capacitor 3105 is a non-linear polar capacitor, both terminals of the capacitor are pre-discharged to ground or to a known predetermined voltage via n-type transistors pull-down transistors MN1 and MN2, and p-type pull-up transistors. The predetermined voltage can be programmable. The pre-determined voltage can be positive or negative. In some embodiments, n-type transistor MN1 is coupled to node Vout_int1 (internal Vout node) and is controllable by clock or reset signal Clk1. In some embodiments, n-type transistor MN2 is coupled to node Vout_int2 (internal Vout node) and is controllable by clock or reset signal Clk2. In some embodiments, p-type transistor MP1 is coupled to node Vout_int2, and is controllable by Clk3b.

In some embodiments, the n-type transistors MN1 and MN2 are replaced with p-type transistors to pre-charge both terminals (Vout_int1 and Vout_int2) of capacitor 3105 to a supply voltage or another predetermined voltage, while the p-type transistor MP1 is replaced with an n-type transistor coupled to ground or a negative supply rail. The predetermined voltage can be programmable. The pre-determined voltage can be positive or negative.

Figure 34:
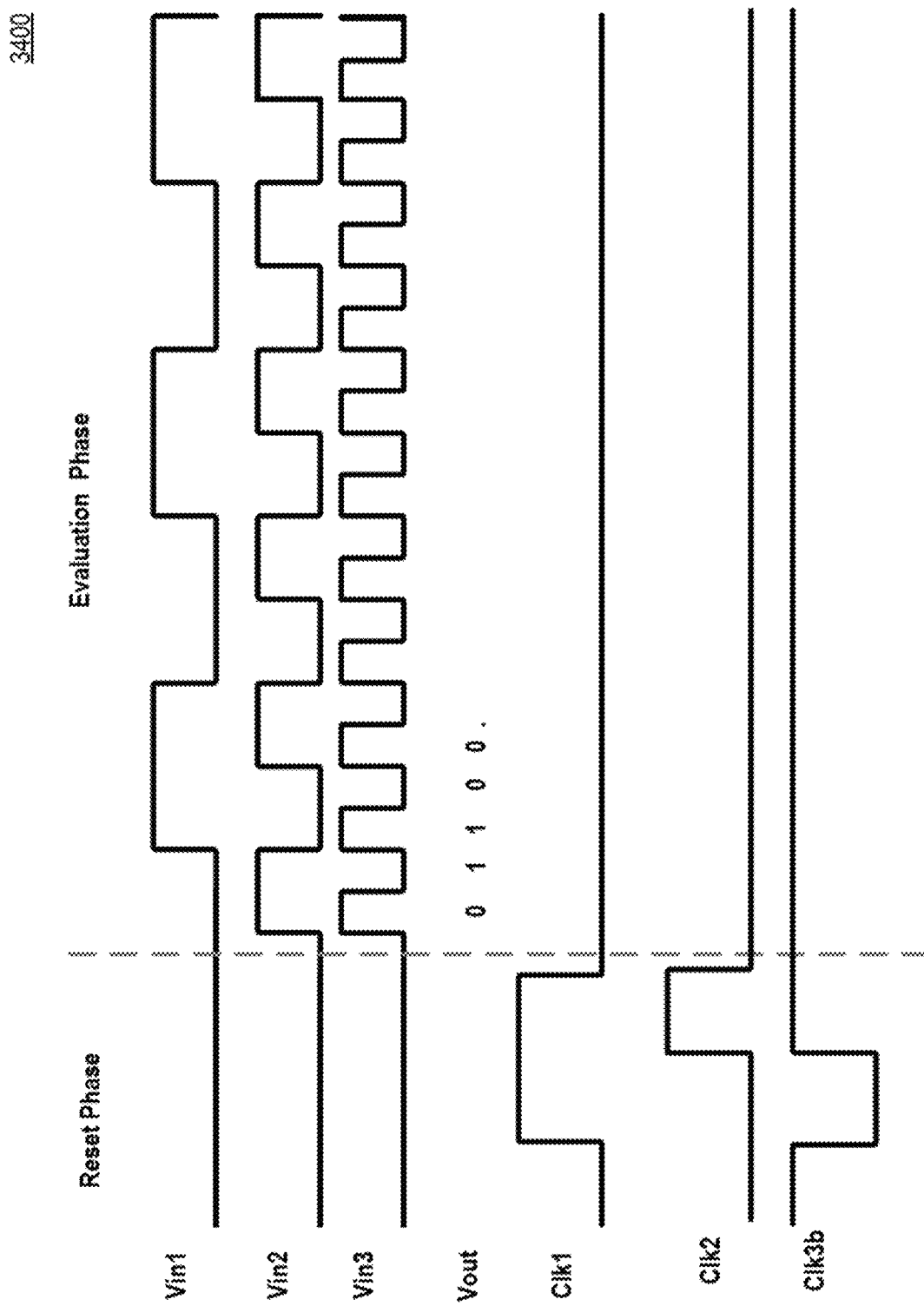
FIG. 34 illustrates timing diagram of the 3-input majority gate of FIG. 31, in accordance with some embodiments.

In some embodiments, the pre-charge or pre-discharge of the terminals of capacitor 3105 (or nodes cn and n1) is done periodically by a clock signals Clk1, Clk2, and Clk3b. The controls can be a non-clock signal that is generated by a control logic (not shown). For example, the control can be issued every predetermined or programmable time. In some embodiments, clock signals Clk1, Clk2, and Clk3b are issued in a reset phase, which is followed by an evaluation phase where inputs Vin1, Vin2, and Vin3 are received, and majority function is performed on them. FIG. 34 illustrates timing diagram 3400 for resetting the ferroelectric or para-electric capacitor for the majority gate of FIG. 31, in accordance with some embodiments.

Clk1 has a pulse larger than the pulse widths of Clk2 and Clk3b. Clk3b is an inverse of Clk3 (not shown). In some embodiments, Clk1 is first asserted which begins to discharge node Vout_int1. While node Vout_int1 is being discharged, Clk2 is asserted. Clk2 may have a pulse width which is substantially half of the pulse width of Clk1. When Clk2 is asserted, node Vout_int2 is discharged. This sequence assures that both terminals of the non-linear polar material of capacitor 3105 are discharged sequentially. In various embodiments, before discharging node Vout_int2, Clk3b is de-asserted which turns on transistor MP1, causing Vout_int2 to be charged to a predetermined value (e.g., supply level). The pulse width of Clk3b is smaller than the pulse width of clk1 to ensure the Clk3b pulsing happens within the Clk1 pulse window. This is useful to ensure non-linear polar capacitor 3105 is initialized to a known programmed state along with the other capacitors (e.g., C1, C2, C3) which are initialized to 0 V across them. The pulsing on Vout_int2 creates the correct field across the non-linear polar capacitor 3105 in conjunction with Vout_int1 to put it in the correct state, such that during operating mode, if Vout_int1 goes higher than Vc value (coercive voltage value), it triggers the switching for non-linear polar capacitor 3105, thereby resulting into a voltage build up on Vout_int2.

In some embodiments, load capacitor CL is added to node Vout_int2. In some embodiments, load capacitor CL is a regular capacitor (e.g., a non-ferroelectric capacitor). The capacitance value of CL on Vout_int2 is useful to ensure that the FE switching charge (of FE capacitor 3105) provides the right voltage level. For a given FE size (area A), with polarization switching density (dP) and desired voltage swing of Vdd (supply voltage), the capacitance of CL should be approximately CL=dP*A/Vdd. There is slight deviation from the above CL value as there is charge sharing on Vout_int2 due to dielectric component of FE capacitor 3105. The charge sharing responds relative to voltage on Vout_int1, and capacitor divider ratio between the dielectric component of the FE capacitor 3105, and load capacitor (CL). Note, the capacitance of CL can be aggregate of all the capacitances (e.g., parasitic routing capacitance on the node, gate capacitance of the output stage 3106, and drain or source capacitance of the reset devices (e.g., MN2, MP1) on the Vout_int2 node. In some embodiments, for a given size of non-linear polar capacitor 3105, CL requirement can be met by just the load capacitance of non-FE logic 3106, and parasitic component itself, and may not need to have it as a separate linear capacitor.

In some embodiments, the non-linear polar material of capacitor 3105 includes one of: ferroelectric (FE) material, paraelectric material, relaxor ferroelectric, or non-linear dielectric. In various embodiments, para-electric material is the same as FE material but with chemical doping of the active ferroelectric ion by an ion with no polar distortion. In some cases, the non-polar ions are non-s orbital ions formed with p, d, f external orbitals. In some embodiments, non-linear dielectric materials are same as para-electric materials, relaxors, and dipolar glasses.

In some embodiments, f-orbital materials (e.g., lanthanides) are doped to the ferroelectric material to make paraelectric material. Examples of room temperature paraelectric material include: SrTiO3, Ba(x)Sr(y)TiO3 (where x is −0.5, and y is 0.95), HfZrO2, Hf—Si—O, La-substituted PbTiO3, PMN-PT based relaxor ferroelectrics.

In various embodiments, the FE material can be any suitable low voltage FE material that allows the FE material to switch its state by a low voltage (e.g., 100 mV). In some embodiments, the FE material comprises a perovskite of the type $ABO_3$, where 'A' and 'B' are two cations of different sizes, and 'O' is oxygen which is an anion that bonds to both the cations. Generally, the size of A atoms is larger than the size of B atoms. In some embodiments, the perovskite can be doped (e.g., by La or Lanthanides). Perovskites can be suitably doped to achieve a spontaneous distortion in a range of 0.3 to 2%. For example, for chemically substituted lead titanate such as Zr in Ti site; La, Nb in Ti site, the concentration of these substitutes is such that it achieves the spontaneous distortion in the range of 0.3 to 2%. For chemically substituted BiFeO3, BiCrO3, BiCoO3 class of materials, La or rare earth substitution into the Bi site can tune the spontaneous distortion.

Threshold in the FE material has a highly non-linear transfer function in the polarization vs. voltage response. The threshold is related to a) non-linearity of switching transfer function; and b) the squareness of the FE switching.

The non-linearity of switching transfer function is the width of the derivative of the polarization vs. voltage plot. The squareness is defined by the ratio of the remnant polarization to the saturation polarization; perfect squareness will show a value of 1.

The squareness of the FE switching can be suitably manipulated with chemical substitution. For example, in PbTiO3 a P-E (polarization-electric field) square loop can be modified by La or Nb substitution to create an S-shaped loop. The shape can be systematically tuned to ultimately yield a non-linear dielectric. The squareness of the FE switching can also be changed by the granularity of the FE layer. A perfect epitaxial, single crystalline FE layer will show higher squareness (e.g., ratio is closer to 1) compared to a poly crystalline FE. This perfect epitaxial can be accomplished using lattice matched bottom and top electrodes. In one example, BiFeO (BFO) can be epitaxially synthesized using a lattice matched SrRuO3 bottom electrode yielding P-E loops that are square. Progressive doping with La will reduce the squareness.

In some embodiments, the FE material is contacted with a conductive metal oxide that includes one of the conducting perovskite metallic oxides exemplified by: La—Sr—CoO3, SrRuO3, La—Sr—MnO3, YBa2Cu3O7, Bi2Sr2CaCu2O8, LaNiO3, and ReO3.

In some embodiments, the FE material comprises a stack of layers including low voltage FE material between (or sandwiched between) conductive oxides. In various embodiments, when FE material is a perovskite, the conductive oxides are of the type AA'BB'$O_3$. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability.

In some embodiments, the FE material comprises hexagonal ferroelectrics of the type h-RMnO3, where R is a rare earth element such as: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides adjacent to the FE material are of A2O3 (e.g., In2O3, Fe2O3) and AB2O3 type, where 'A' is a rare earth element and B is Mn.

In some embodiments, the FE material comprises improper FE material. An improper ferroelectric is a ferroelectric where the primary order parameter is an order mechanism such as strain or buckling of the atomic order. Examples of improper FE material are LuFeO3 class of materials or super lattice of ferroelectric and paraelectric materials PbTiO3 (PTO) and SnTiO3 (STO), respectively, and LaAlO3 (LAO) and STO, respectively. For example, a super lattice of [PTO/STO]n or [LAO/STO]n, where 'n' is between 1 to 100. While various embodiments here are described with reference to ferroelectric material for storing the charge state, the embodiments are also applicable for paraelectric material. For example, the capacitor of various embodiments can be formed using paraelectric material instead of ferroelectric material.

In some embodiments, the FE material includes one of: Hafnium (HD, Zirconium (Zr), Aluminum (Al), Silicon (Si), their oxides or their alloyed oxides. In some embodiments, FE material includes one of: Al(1−x)Sc(x)N, Ga(1−x)Sc(x)N, Al(1−x)Y(x)N or Al(1−x−y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction. In some embodiments, the FE material includes Bismuth ferrite (BFO), lead zirconate titanate (PZT), BFO with doping material, or PZT with doping material, wherein the doping material is one of Nb or; and relaxor ferroelectrics such as PMN-PT.

In some embodiments, the FE material includes Bismuth ferrite (BFO), BFO with a doping material where in the doping material is one of Lanthanum, or any element from the lanthanide series of the periodic table. In some embodiments, the FE material 3105 includes lead zirconium titanate (PZT), or PZT with a doping material, wherein the doping material is one of La, Nb. In some embodiments, the FE material includes a relaxor ferro-electric includes one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST).

In some embodiments, the FE material includes Hafnium oxides of the form, Hf1−x Ex Oy where E can be Al, Ca, Ce, Dy, er, Gd, Ge, La, Sc, Si, Sr, Sn, or Y. In some embodiments, FE material 3105 includes Niobate type compounds LiNbO3, LiTaO3, Lithium iron Tantalum Oxy Fluoride, Barium Strontium Niobate, Sodium Barium Niobate, or Potassium strontium niobate.

In some embodiments, the FE material comprises multiple layers. For example, alternating layers of [Bi2O2]2+, and pseudo-perovskite blocks (Bi4Ti3O12 and related Aurivillius phases), with perovskite layers that are n octahedral layers in thickness can be used.

In some embodiments, the FE material comprises organic material. For example, Polyvinylidene fluoride or polyvinylidene difluoride (PVDF).

The FE material is between two electrodes. These electrodes are conducting electrodes. In some embodiments, the electrodes are perovskite templated conductors. In such a templated structure, a thin layer (e.g., approximately 10 nm) of a perovskite conductor (such as SrRuO3) is coated on top of IrO2, RuO2, PdO2, or PtO2 (which have a non-perovskite structure but higher conductivity) to provide a seed or template for the growth of pure perovskite ferroelectric at low temperatures. In some embodiments, when the ferroelectric comprises hexagonal ferroelectric material, the electrodes can have hexagonal metals, spinels, or cubic metals. Examples of hexagonal metals include: PtCoO2, PdCoO2, and other delafossite structured hexagonal metallic oxides such as Al-doped ZnO. Examples of spinels include Fe3O4 and LiV2O4. Examples of cubic metals include Indium Tin Oxide (ITO) such as Sn-doped In2O3.

The charge developed on node n1 produces a voltage and current that is the output of the majority gate 3104. Any suitable driver 3106 can drive this output. For example, a non-FE logic, FE logic, CMOS logic, BJT logic, etc. can be used to drive the output to a downstream logic. Examples of the drivers include inverters, buffers, NAND gates, NOR gates, XOR gates, amplifiers, comparators, digital-to-analog converters, analog-to-digital converters, etc. In some embodiments, output "out" is reset by driver 3106 via Clk1 signal. For example, NAND gate with one input coupled to Vout_int2 and the other input coupled to Clk1 can be used to reset "out" during a reset phase.

While FIG. 31 illustrates a 3-input majority gate, the same concept can be extended to more than 3 inputs to make an N-input majority gate, where N is greater than 2. For example, a 5-input majority gate is like 3-input majority gate 3104 but for additional inputs Vin4 and Vin5. These inputs can come from the same drivers (e.g., any one of drivers 3101, 3102, 3103) or from different drivers. Input Vin4 and Vin5 can be analog, digital, or a combination of them. For example, Vin4 is a digital signal while Vin5 is an analog signal. The additional inputs Vin4 and Vin5 are coupled to additional non-ferroelectric capacitors C4 and C5, respectively (not shown). The composition and size of the capacitors C4 and C5 are like that of C1, C2, and C3. Here, resistors R4 and R5 are parasitic resistors.

The majority function is performed at the common node cn, and the resulting voltage is projected on to capacitor 3105. For example, the majority function of the currents ($I_1$, $I_2$, $I_3$, $I_4$, and $I_5$) on node cn results in a resultant current that charges capacitor 3105. Table 2 illustrates the majority function f(Majority Vin1, Vin2, Vin3, Vin4, Vin5) of a 5-input majority gate.

TABLE 2

| Vin1 | Vin2 | Vin3 | Vin4 | Vin5 | cn (f(Majority Vin1, Vin2, Vin3, Vin4, Vin5)) |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 1 |
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 1 |
| 0 | 1 | 1 | 0 | 0 | 0 |
| 0 | 1 | 1 | 0 | 1 | 1 |
| 0 | 1 | 1 | 1 | 0 | 1 |
| 0 | 1 | 1 | 1 | 1 | 1 |
| 1 | 0 | 0 | 0 | 0 | 0 |
| 1 | 0 | 0 | 0 | 1 | 0 |
| 1 | 0 | 0 | 1 | 0 | 0 |
| 1 | 0 | 0 | 1 | 1 | 1 |
| 1 | 0 | 1 | 0 | 0 | 0 |
| 1 | 0 | 1 | 0 | 1 | 1 |
| 1 | 0 | 1 | 1 | 0 | 1 |
| 1 | 0 | 1 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 1 |
| 1 | 1 | 1 | 0 | 0 | 1 |
| 1 | 1 | 1 | 0 | 1 | 1 |
| 1 | 1 | 1 | 1 | 0 | 1 |
| 1 | 1 | 1 | 1 | 0 | 1 |

Figure 35:
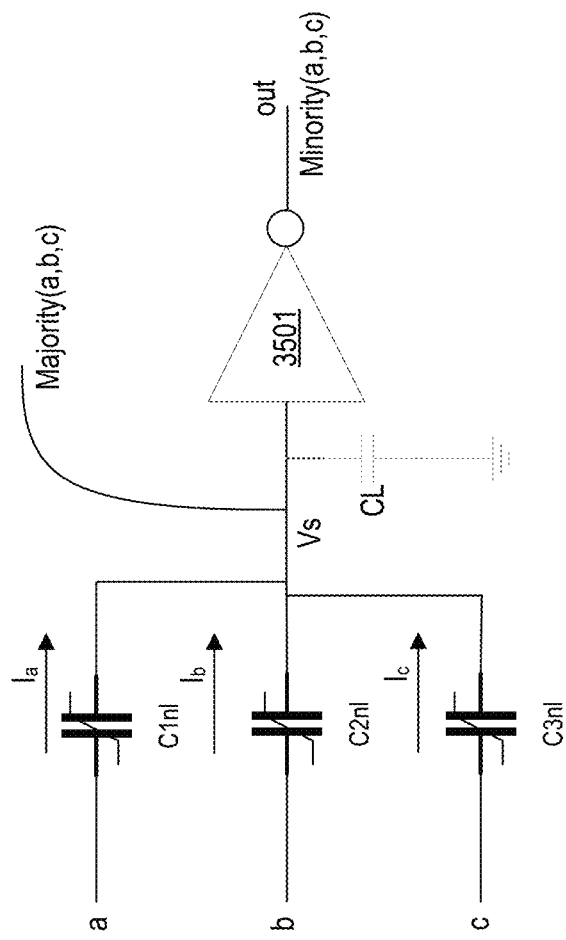
FIG. 35 illustrates a 3-input minority gate with non-linear input capacitors, in accordance with some embodiments.

FIG. 35 illustrates 3-input minority gate 3500 with non-linear input capacitors, in accordance with some embodiments. In some embodiments, 3-input majority gate 3500 comprises non-linear input capacitors C1n1, C2n1, and C3n1 that receives digital signals a, b, and c, respectively. Here, signal names and node names are interchangeably used. For example, 'a' refers to node 'a' or signal 'a' depending on the context of the sentence. One end or terminal of capacitor C1n1 is coupled to node a while the other end of capacitor C1n1 is coupled to summing node Vs. The same is true for other non-linear capacitors C2n1 and C3n1 as shown. In some embodiments, 3-input majority gate 3500 comprises a driver circuitry 3501. In this example, driver circuitry 3501 is an inverter. In other embodiments, other types of driver circuitries can be used such as NAND gate, NOR gate, multiplexer, buffer, and other logic gates. The majority function is performed at summing node Vs as Majority(a,b,c). In this example, since driver 3501 is an inverter, minority function is performed at output "out" as Minority(a,b,c).

In some embodiments, in addition to the gate capacitance of driver circuitry 3501, an additional linear capacitor CL is coupled to summing node Vs and ground as shown. In some embodiments, this linear capacitor CL is a non-ferroelectric capacitor. In some embodiments, the non-ferroelectric capacitor includes one of: dielectric capacitor, para-electric capacitor, or non-linear dielectric capacitor. A dielectric capacitor comprises first and second metal plates with a dielectric between them. Examples of such dielectrics are: HfO, ABO3 perovskites, nitrides, oxy-fluorides, oxides, etc. A paraelectric capacitor comprises first and second metal plates with a para-electric material between them. In some embodiments, f-orbital materials (e.g., lanthanides) are doped to the ferroelectric materials to make paraelectric material. Examples of room temperature paraelectric material include: SrTiO3, Ba(x)Sr(y)TiO3 (where x is −0.5, and y is 0.95)), HfZrO2, Hf—Si—O, La-substituted PbTiO3, PMN-PT based relaxor ferroelectrics. A dielectric capacitor comprises first and second metal plates with non-linear dielectric capacitor between them. The range for dielectric constant is 1.2 to 10000. The capacitor CL can be implemented as MIM (metal-insulator-metal) capacitor technology, transistor gate capacitor, hybrid of metal capacitors or transistor capacitor. The capacitor CL can be implemented as MIM (metal-insulator-metal) capacitor technology, transistor gate capacitor, or hybrid of metal capacitors or transistor capacitor.

In some embodiments, the non-linear input capacitors C1n1, C2n1, and C3n1 comprise non-linear polar material. In some embodiments, the non-linear polar material includes one of: ferroelectric (FE) material, para-electric material, relaxor ferroelectric, or non-linear dielectric. In various embodiments, para-electric material is the same as FE material but with chemical doping of the active ferroelectric ion by an ion with no polar distortion. In some cases, the non-polar ions are non-s orbital ions formed with p, d, f external orbitals. In some embodiments, non-linear dielectric materials are same as para-electric materials, relaxors, and dipolar glasses.

In some embodiments, f-orbital materials (e.g., lanthanides) are doped to the ferroelectric material to make para-electric material. Examples of room temperature paraelectric material include: SrTiO3, Ba(x)Sr(y)TiO3 (where x is −0.5, and y is 0.95), HfZrO2, Hf—Si—O, La-substituted PbTiO3, and PMN-PT based relaxor ferroelectrics.

In various embodiments, the FE material can be any suitable low voltage FE material that allows the FE material to switch its state by a low voltage (e.g., 100 mV). In some embodiments, the FE material comprises a perovskite of the type $ABO_3$, where 'A' and B' are two cations of different sizes, and 'O' is oxygen which is an anion that bonds to both the cations. Generally, the size of A atoms is larger than the size of B atoms. In some embodiments, the perovskite can be doped (e.g., by La or Lanthanides). Perovskites can be suitably doped to achieve a spontaneous distortion in a range of 0.3 to 2%. For example, for chemically substituted lead titanate such as Zr in Ti site; La, Nb in Ti site, the concentration of these substitutes is such that it achieves the spontaneous distortion in the range of 0.3 to 2%. For chemically substituted BiFeO3, BiCrO3, BiCoO3 class of materials, La or rare earth substitution into the Bi site can tune the spontaneous distortion. In some embodiments, perovskite includes one of: BaTiO3, PbTiO3, KNbO3, or NaTaO3.

Threshold in the FE material has a highly non-linear transfer function in the polarization vs. voltage response. The threshold is related to: a) non-linearity of switching transfer function; and b) the squareness of the FE switching. The non-linearity of switching transfer function is the width of the derivative of the polarization vs. voltage plot. The squareness is defined by the ratio of the remnant polarization to the saturation polarization; perfect squareness will show a value of 1.

The squareness of the FE switching can be suitably manipulated with chemical substitution. For example, in PbTiO3 a P-E (polarization-electric field) square loop can be modified by La or Nb substitution to create an S-shaped loop. The shape can be systematically tuned to ultimately yield a non-linear dielectric. The squareness of the FE switching can also be changed by the granularity of the FE layer. A perfect epitaxial, single crystalline FE layer will show higher squareness (e.g., ratio is closer to 1) compared to a poly crystalline FE. This perfect epitaxial can be accomplished using lattice matched bottom and top electrodes. In one example, BiFeO (BFO) can be epitaxially synthesized using a lattice matched SrRuO3 bottom electrode yielding P-E loops that are square. Progressive doping with La will reduce the squareness.

In some embodiments, the FE material is contacted with a conductive metal oxide that includes one of the conducting perovskite metallic oxides exemplified by: La—Sr—CoO3, SrRuO3, La—Sr—MnO3, YBa2Cu3O7, Bi2Sr2CaCu2O8, LaNiO3, and ReO3.

In some embodiments, the FE material comprises a stack of layers including low voltage FE material between (or sandwiched between) conductive oxides. In various embodiments, when FE material is a perovskite, the conductive oxides are of the type AA'BB'O$_3$. A' is a dopant for atomic site A, it can be an element from the Lanthanides series. B' is a dopant for atomic site B, it can be an element from the transition metal elements especially Sc, Ti, V, Cr, Mn, Fe, Co, Ni, Cu, Zn. A' may have the same valency of site A, with a different ferroelectric polarizability.

In some embodiments, the FE material comprises hexagonal ferroelectrics of the type h-RMnO3, where R is a rare earth element such as: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The ferroelectric phase is characterized by a buckling of the layered MnO5 polyhedra, accompanied by displacements of the Y ions, which lead to a net electric polarization. In some embodiments, hexagonal FE includes one of: YMnO3 or LuFeO3. In various embodiments, when the FE material comprises hexagonal ferroelectrics, the conductive oxides adjacent to the FE material are of A2O3 (e.g., In2O3, Fe2O3) and AB2O3 type, where 'A' is a rare earth element and B is Mn.

In some embodiments, FE material comprises improper FE material. An improper ferroelectric is a ferroelectric where the primary order parameter is an order mechanism such as strain or buckling of the atomic order. Examples of improper FE material are LuFeO3 class of materials or super lattice of ferroelectric and paraelectric materials PbTiO3 (PTO) and SnTiO3 (STO), respectively, and LaAlO3 (LAO) and STO, respectively. For example, a super lattice of [PTO/STO]n or [LAO/STO]n, where 'n' is between 1 to 100. While various embodiments here are described with reference to ferroelectric material for storing the charge state, the embodiments are also applicable for paraelectric material. For example, the capacitor of various embodiments can be formed using paraelectric material instead of ferroelectric material.

In some embodiments, the FE material includes one of: Hafnium (Hf), Zirconium (Zr), Aluminum (Al), Silicon (Si), their oxides or their alloyed oxides. In some embodiments, FE material includes one of: Al(1-x)Sc(x)N, Ga(1-x)Sc(x)N, Al(1-x)Y(x)N or Al(1-x-y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction. In some embodiments, the FE material includes Bismuth ferrite (BFO), lead zirconate titanate (PZT), BFO with doping material, or PZT with doping material, wherein the doping material is one of Nb or relaxor ferroelectrics such as PMN-PT.

In some embodiments, the FE material includes Bismuth ferrite (BFO), BFO with a doping material where in the doping material is one of Lanthanum, or any element from the lanthanide series of the periodic table. In some embodiments, the FE material includes lead zirconium titanate (PZT), or PZT with a doping material, wherein the doping material is one of La, Nb. In some embodiments, the FE material includes a relaxor ferro-electric including one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST).

In some embodiments, the FE material includes Hafnium oxides of the form, Hf1-x Ex Oy where E can be Al, Ca, Ce, Dy, Er, Gd, Ge, La, Sc, Si, Sr, Sn, or Y. In some embodiments, FE material 3105 includes Niobate type compounds LiNbO3, LiTaO3, Lithium iron Tantalum Oxy Fluoride, Barium Strontium Niobate, Sodium Barium Niobate, or Potassium strontium niobate.

In some embodiments, the FE material comprises multiple layers. For example, alternating layers of [Bi2O2]2+, and pseudo-perovskite blocks (Bi4Ti3O12 and related Aurivillius phases), with perovskite layers that are n octahedral layers in thickness can be used.

In some embodiments, the FE material comprises organic material. For example, Polyvinylidene fluoride or polyvinylidene difluoride (PVDF). The FE material is between two electrodes. These electrodes are conducting electrodes. In some embodiments, the electrodes are perovskite templated conductors. In such a templated structure, a thin layer (e.g., approximately 10 nm) of a perovskite conductor (such as SrRuO3) is coated on top of IrO2, RuO2, PdO2, or PtO2 (which have a non-perovskite structure but higher conductivity) to provide a seed or template for the growth of pure perovskite ferroelectric at low temperatures. In some embodiments, when the ferroelectric comprises hexagonal ferroelectric material, the electrodes can have hexagonal metals, spinels, or cubic metals. Examples of hexagonal metals include: PtCoO2, PdCoO2, and other delafossite structured hexagonal metallic oxides such as Al-doped ZnO. Examples of spinels include Fe3O4 and LiV2O4. Examples of cubic metals include Indium Tin Oxide (ITO) such as Sn-doped In2O3.

The majority function is performed at the summing node Vs, and the resulting voltage is projected on to capacitance of driver circuitry 3501. For example, the majority function of the currents ($I_a$, $I_b$, and $I_c$) on node Vs results in a resultant current that charges capacitor 3501. Table 3 illustrates the majority function f(Majority a, b, c).

TABLE 3

| a | b | c | Vs (f(Majority a, b, c)) |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

The charge developed on node Vs produces a voltage and current that is the output of the majority gate 3500. Any suitable driver 3501 can drive this output. For example, a non-FE logic, FE logic, CMOS logic, BJT logic, etc. can be used to drive the output to a downstream logic. Examples of the drivers include inverters, buffers, NAND gates, NOR gates, XOR gates, amplifiers, comparators, digital-to-analog converters, analog-to-digital converters, multiplexers, etc.

While FIG. 35 illustrates a 3-input majority gate, the same concept can be extended to more than 3 inputs to make an N-input majority gate, where N is greater than 2. In various embodiments, 'N' is an odd number. For example, a 5-input majority gate is like an input majority gate 3500 but for additional inputs 'd' and 'e'. These inputs can come from the same drivers or from different drivers.

In some embodiments, the 3-input majority gate can be configured as a fast inverter with a much faster propagation delay compared to a similar sized (in terms of area footprint) CMOS inverter. This is particularly useful when the inputs have a significantly slower slope compared to the propagation delay through the non-linear input capacitors. One way to configurate the 3-input majority gate as an inverter is to set one input to a logic high (e.g., b=1) and set another input to a logic low (e.g., b=0). The third input is the driving input which is to be inverted. The inversion will be at the Vs node. The same technique can also be applied to N-input majority gate, where 'N' is 1 or any other odd number. In an N-input majority gate, (N−1)/2 inputs are set to '1' and (N−1)/2 inputs are set to '0', and one input is used to decide the inversion function. It will be appreciated that the various embodiments are described as a majority gate, the same concepts are applicable to a minority gate. In a minority gate the driving circuitry is an inverting circuitry coupled to the summing node Vs. The minority function is seen at the output of the inverting circuitry.

In some embodiments, (2N−1) input majority gate can operate as an N-input AND gate where (N−1) inputs of the majority gate are set to zero. The AND function will be seen at the summing node Vs. Similarly, N-input NAND, OR, NOR gates can be realized. In various embodiments, the summing node Vs is driven by a driver circuitry (e.g., inverter, buffer, NAND gate, AND gate, OR gate, NOR gate, or any other logic circuitry). However, driver circuitry 3501 can be replaced with another majority or minority gate. In one such embodiment, the storage node Vs is directly coupled to a non-linear capacitor of another majority or minority gate.

Any logic function $f(x_1, x_2, \ldots x_n)$ can be represented by two levels of logic as given by the min-term expansion: $f(x_1, x_2, \ldots x_n) = \vee_{C_1, C_2, \ldots C_n} f(x_1, x_2, \ldots x_n) \wedge x_1^{C_1} \wedge x_2^{C_2}$ $\wedge x_3^{C_3} \ldots \wedge x_n^{C_n}$ where $C_i$ is either 0 or 1. When $C_i$ is 1, $x_i^{C_i} = x_i$ (the input is used in its original form). When $C_i$ is 0, $x_i^{C_i} = \overline{x_i}$ (the input is used in its inverted form). The first level of logic is represented by at most $2^n$ AND gates ($\wedge$), one for each of the $2^n$ possible combinations of 0 and 1 for $C_1$, $C_2, \ldots C_n$. The second level of logic is represented by a single OR gate ($\vee$). Each operand of the OR gate is a representation of a row in the truth table for $f(x_1, x_2, \ldots x_n)$.

A (2N−1)-input majority gate can represent an N-input AND gate, by tying (N−1) of the majority gate's inputs to a ground level. Similarly, a (2N−1)-input majority gate can represent an N-input OR gate, by tying (N−1) of the majority gate's inputs to a supply level (Vdd). Since a majority gate can represent AND and OR gates, and the inputs to the AND and OR gates are either original or inverted forms of the input digital signals, any logic function can be represented by majority gates and inverters only, in accordance with some embodiments.

Figure 36:
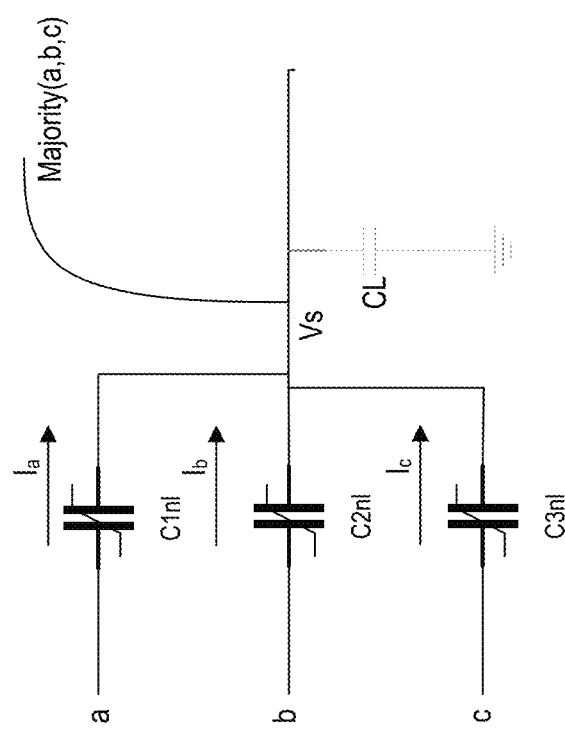
FIG. 36 illustrates a 3-input majority gate with non-linear input capacitors, in accordance with some embodiments.

FIG. 36 illustrates 3-input majority gate 3600 with non-linear input capacitors, in accordance with some embodiments. In some embodiments, the summing node Vs is not coupled to a CMOS driver (e.g., buffer, inverter, NAND gate, or any other CMOS logic gate). In one example, Vs is coupled to another majority or minority gate. For instance, Vs is coupled to a terminal of another non-linear capacitor of another majority or minority gate.

Figure 37:
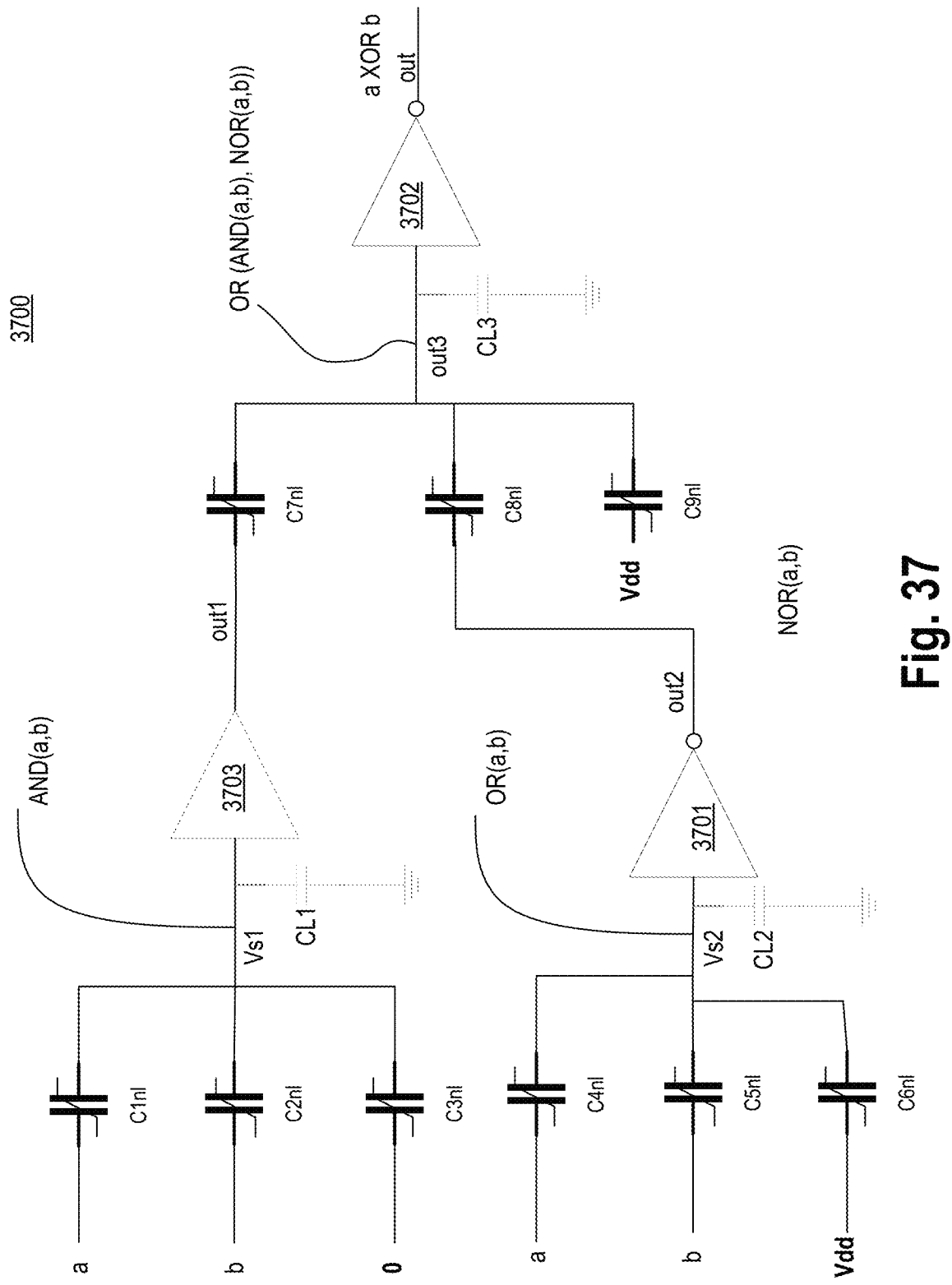
FIG. 37 illustrates a 3-input majority XOR gate with non-linear input capacitors, in accordance with some embodiments.

FIG. 37 illustrates 3-input majority XOR gate 3700 with non-linear input capacitors, in accordance with some embodiments. XOR gate 3700 is a 2-input XOR gate that performs XOR function on inputs a and b. In various embodiments, XOR gate 3700 comprises non-linear input capacitors C1n1, C2n1, C3n1, C4n1, C5n1, and C6n1, inverter 3703, and non-linear output capacitors C7n1, C8n1, and C9n1. Capacitors C1n1, C2n1, and C3n1 receive inputs a, b, and 0, and perform majority AND function on node Vs1. Capacitors C4n1, C5n1, and C6n1 receive inputs a, b, and Vdd, and perform majority OR function on node Vs2. The NAND output on node out1 is received by output capacitor C7n1. The OR output on node Vs2 is received by capacitor C8n1. Capacitor C9n1 receives a predetermined input 0 in this example. The majority function on node out3 is an AND of out1, out2, and 0. In some embodiments, instead of driving voltage on node Vs2 to out2, buffer 3701 is used between nodes Vs2 and out2. In some embodiments, instead of driving output out3 as the XOR output, buffer 3702 is used to output the XOR output on node out. In some embodiments, Vs2 is directly connected to node out2. In some embodiments, out3 is directly connected to node out. In some embodiments, linear or non-linear capacitors CL1, CL2, and CL3 are added on the summing nodes Vs1, Vs2, and out3, respectively. By swapping the voltages '0' and 'Vdd' different logic functions can be realized, in accordance with various embodiments.

Figure 38:
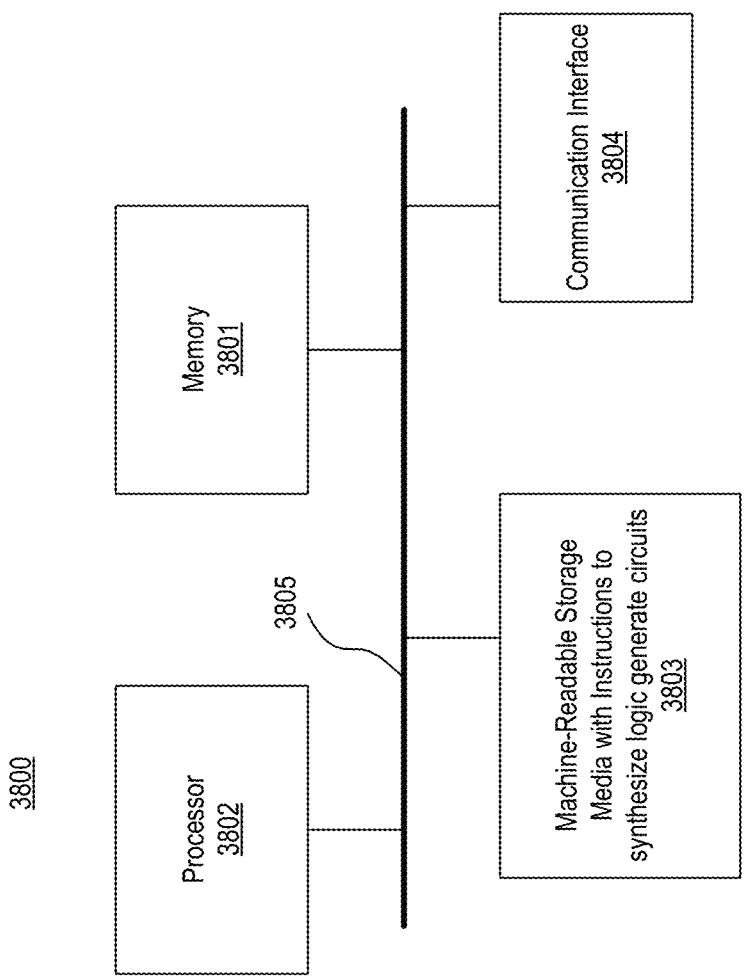
FIG. 38 illustrates a processor system with machine-readable storage media having instructions that when executed cause the processor to perform a logic segregation scheme to improve overall thermals of the package configuration, in accordance with various embodiments.

FIG. 38 illustrates processor system 3800 with machine-readable storage media having instructions that when executed cause the processor to perform a logic segregation scheme to improve overall thermals of the package configuration, in accordance with various embodiments. Elements of embodiments (e.g., the various flowcharts described herein) are also provided as a machine-readable medium (e.g., memory) for storing the computer-executable instructions (e.g., instructions to implement any other processes discussed herein). In some embodiments, computing platform 3800 comprises memory 3801, processor 3802, machine-readable storage media 3803 (also referred to as tangible machine-readable medium), communication interface 3804 (e.g., wireless or wired interface), and network bus 3805 coupled together as shown.

In some embodiments, processor 3802 is a Digital Signal Processor (DSP), an Application Specific Integrated Circuit (ASIC), a general-purpose Central Processing Unit (CPU), or a low power logic implementing a simple finite state machine to perform the method of the various flowcharts, etc.

In some embodiments, the various logic blocks of system 3800 are coupled together via network bus 3805. Any suitable protocol may be used to implement network bus 3805. In some embodiments, machine-readable storage medium 3803 includes instructions (also referred to as the program software code/instructions) for logic synthesis of a mix of CMOS gates and majority, minority, and/or threshold logic circuits as described with reference to various embodiments and flowchart.

Program software code/instructions associated with the flowcharts (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the flowcharts of various embodiments are executed by system 3800.

In some embodiments, the program software code/instructions associated with the flowcharts of various embodiments are stored in a computer executable storage medium 3803 and executed by processor 3802. Here, computer executable storage medium 503 is a tangible machine-readable medium that can be used to store program software code/instructions and data that, when executed by a computing device, causes one or more processors (e.g., processor 3802) to perform a method(s) as may be recited in one or more accompanying claims directed to the disclosed subject matter.

The tangible machine-readable medium 3803 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions associated with the various flowcharts and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 3803 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium 3803 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Android®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 39:
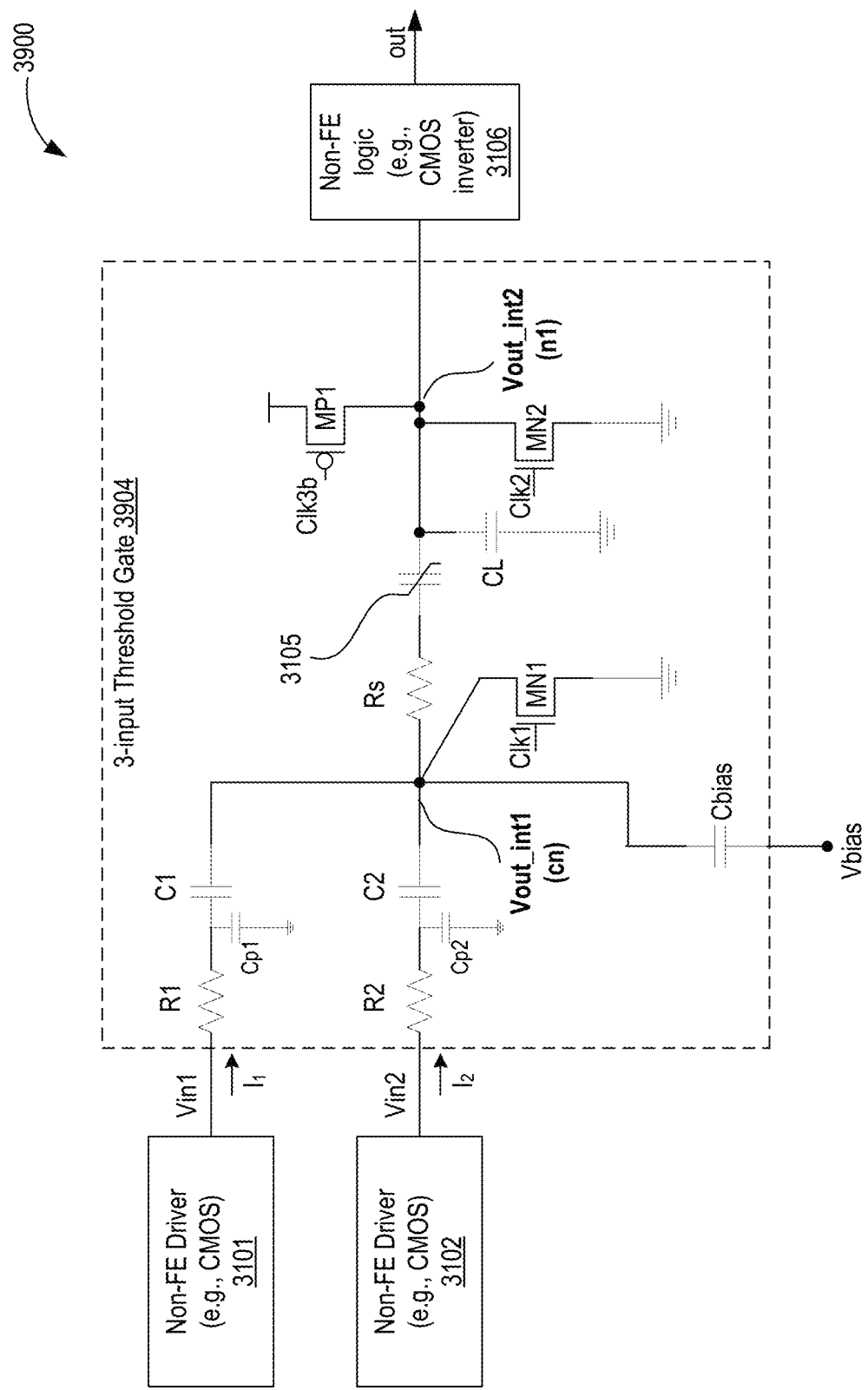
FIG. 39 illustrates a logic gate with a 3-input threshold gate which can operate as an AND or OR gate, in accordance with some embodiments.

FIG. 39 illustrates a logic gate with a 3-input threshold gate 3900 which can operate as an AND or OR gate, in accordance with some embodiments. Logic gate 3900 is like logic gate 3100 but for removing the third input Vin and adding an input Vbias. This additional input bias makes the logic gate a threshold gate 3104. Threshold gate 3104 is referred to as a 3-input threshold gate because of the three inputs Vin1, Vin2, and Vbias. It can also be referred to as 2-input threshold gate if the Vbias input is not counted as a separate input. In various embodiments, threshold gate 3104 comprises an additional capacitor Cbias that has one terminal coupled to node cn and another terminal coupled to Vbias. The material for capacitor Cbias can be same as material for capacitors C1, C2, and C3. For example, capacitor Cbias comprises non-ferroelectric material.

Vbias can be positive or negative voltage depending on the desired logic function of threshold gate 3104. Any suitable source can generate Vbias. For example, a bandgap reference generator, a voltage divider such as a resistor divider, a digital to analog converter (DAC), etc. can generate Vbias. Vbias can be fixed or programmable (or adjustable). For example, Vbias can be adjusted by hardware (e.g., fuses, register), or software (e.g., operating system). In some embodiments, when Vbias is positive, the majority function on node cn is an OR function. For example, the function at node cn is OR(Vin1, Vin2, 0). In some embodiments, when Vbias is negative, the majority function on node cn is an AND function. For example, the function at node cn is AND(Vin1, Vin2, 1). Table 4 and Table 5 summarizes the function of threshold gate 3104. Applying a positive voltage or Vbias can be akin to applying an input signal logic high as well. Likewise, applying a negative voltage on Vbias can be akin to applying an input signal logic low as well.

TABLE 4

| Vin1 | Vin2 | Vbias | cn OR(Vin1, Vin2, Vbias) |
|---|---|---|---|
| 0 | 0 | Positive or logic 1 | 0 |
| 0 | 1 | Positive or logic 1 | 1 |
| 1 | 0 | Positive or logic 1 | 1 |
| 1 | 1 | Positive or logic 1 | 1 |

TABLE 5

| Vin1 | Vin2 | Vbias | cn AND(Vin1, Vin2, Vbias) |
|---|---|---|---|
| 0 | 0 | Negative or logic 0 | 0 |
| 0 | 1 | Negative or logic 0 | 0 |
| 1 | 0 | Negative or logic 0 | 0 |
| 1 | 1 | Negative or logic 0 | 1 |

Compared to transitional CMOS AND logic gate and OR logic gate, here the AND function and OR function are performed by a network of capacitors. The output of the majority or threshold function on node cn is then stored in the non-linear polar capacitor 3105. This capacitor provides the final state of the logic in a non-volatile form. As such, the logic gate of various embodiments describes a non-volatile multi-input AND or OR gate with one or two transistors for pre-discharging or pre-charging nodes cn and n1. The silicon area of the AND or OR gates of various embodiments is orders of magnitude smaller than traditional AND or OR gates. While FIG. 39 illustrates a 3-input threshold gate, the same concept can be extended to more than 3 inputs to make an N-input threshold gate, where N is greater than 2 and an odd number. The reset mechanism of FIG. 39 is like the one described with reference to FIG. 31.

The various embodiments can be expressed as method of forming the structures and/or method of using or operating the structures.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus, which comprises the device.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

Here, the term "backend" or BE generally refers to a section of a die which is opposite of a "frontend" of FE and where an IC (integrated circuit) package couples to IC die bumps. For example, high-level metal layers (e.g., metal layer 6 and above in a ten-metal stack die) and corresponding vias that are closer to a die package are considered part of the backend of the die. Conversely, the term "frontend" generally refers to a section of the die that includes the active region (e.g., where transistors are fabricated) and low-level metal layers and corresponding vias that are closer to the active region (e.g., metal layer 5 and below in the ten-metal stack die example).

Here, the term "chiplet" generally refers to a chip or integrated circuit offered as a packaged die, an intellectual property block, or a die to be integrated with other dies, that performs a particular function. For example, a chiplet may be an application specific integrated circuit that offloads one or more tasks by a compute die. A number of chiplets may be communicatively coupled together to form a larger and complex logical chip. Chiplets provides support to larger and complex chips such as graphics processor, general processor, signal processor, etc. Examples of a chiplet is a memory controller, cache, memory buffer, etc. The Chiplet can be implemented on-package or off-package.

Following examples are provided that illustrate the various embodiments. The examples can be combined with other examples. As such, various embodiments can be combined with other embodiments without changing the scope of the invention.

Example 1: An apparatus comprising: a substrate; a first die on the substrate, wherein the first die comprises a first compute logic; and a second die stacked on the first die, wherein the second die comprises a second compute logic, wherein the second die comprises ferroelectric or paraelectric logic including majority, minority, and/or threshold logic gates.

Example 2: The apparatus of example 1, wherein active devices of the first die are closer to active devices of the second die than to the substrate.

Example 3: The apparatus of example 1, wherein the second die comprises an accelerator which includes a plurality of processing elements arranged in an array, wherein the plurality of processing elements is coupled to the first die via through-silicon vias.

Example 4: The apparatus of example 1, wherein the first die and the second die are coupled via micro-bumps, or wherein the first die and the second die are coupled via copper-to-copper bonding.

Example 5: The apparatus of example 1 comprising a heat sink on the second die. Example 5: The apparatus of example 1 comprising a heat sink on the second die, wherein the first die includes ferroelectric or paraelectric logic.

Example 6: The apparatus of example 1 comprises a first passive silicon and a second passive silicon, wherein the first passive silicon and the second passive silicon are on the first die.

Example 7: The apparatus of example 1, wherein the ferroelectric logic includes a non-linear polar material which includes one of: ferroelectric material, paraelectric material, or non-linear dielectric. Example 7: The apparatus of example 1, wherein the ferroelectric or paraelectric logic includes a non-linear polar material which includes one of: ferroelectric material, paraelectric material, or non-linear dielectric.

Example 8: The apparatus of example 7, wherein the ferroelectric material includes one of: Bismuth ferrite (BFO), BFO with a doping material where in the doping material is one of Lanthanum, or elements from lanthanide series of periodic table; Lead zirconium titanate (PZT), or PZT with a doping material, wherein the doping material is one of La, Nb; relaxor ferroelectric which includes one of lead magnesium niobate (PMN), lead magnesium niobate-lead titanate (PMN-PT), lead lanthanum zirconate titanate (PLZT), lead scandium niobate (PSN), Barium Titanium-Bismuth Zinc Niobium Tantalum (BT-BZNT), or Barium Titanium-Barium Strontium Titanium (BT-BST); perovskite includes one of: BaTiO3, PbTiO3, KNbO3, or NaTaO3; hexagonal ferroelectric includes one of: YMnO3, or LuFeO3; hexagonal ferroelectrics of a type h-RMnO3, where R is a rare earth element which includes one of: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y); Hafnium (Hf), Zirconium (Zr), Aluminum (Al), Silicon (Si), their oxides or their alloyed oxides; Hafnium oxides as Hf1−x Ex Oy, where E can be Al, Ca, Ce, Dy, er, Gd, Ge, La, Sc, Si, Sr, Sn, Zr, or Y; Al(1−x)Sc(x)N, Ga(1−x)Sc(x)N, Al(1−x)Y(x)N or Al(1−x−y)Mg(x)Nb(y)N, y doped HfO2, where x includes one of: Al, Ca, Ce, Dy, Er, Gd, Ge, La, Sc, Si, Sr, Sn, or Y, wherein 'x' is a fraction; Niobate type compounds LiNbO3, LiTaO3, Lithium iron Tantalum Oxy Fluoride, Barium Strontium Niobate, Sodium Barium Niobate, or Potassium strontium niobate; or improper ferroelectric includes one of: [PTO/STO]n or [LAO/STO]n, where 'n' is between 1 to 100.

Example 9: The apparatus of example 7, wherein the paraelectric material includes: SrTiO3, Ba(x)Sr(y)TiO3 (where x is −0.05, and y is 0.95), HfZrO2, Hf—Si—O, La-substituted PbTiO3, or PMN-PT based relaxor ferroelectrics.

Example 10: An apparatus comprising: an interposer; a first die having compute logic, the first die on the interposer; a second die comprising memory, wherein the second die is on the interposer; and a third die comprising an accelerator, wherein the third die in on the interposer such that the second die is between the first die and the third die, wherein the accelerator includes ferroelectric or paraelectric logic, wherein the ferroelectric logic includes majority, minority, and/or threshold gates.

Example 11: The apparatus of example 10 comprises a silicon bridge embedded in the interposer and coupled to the first die and the second die.

Example 12: The apparatus of example 11, wherein the silicon bridge is a first silicon bridge, and wherein the apparatus comprises a second silicon bridge embedded in the interposer and coupled to the first die and the third die.

Example 13: The apparatus of example 12 comprises a fourth die comprising memory, wherein the fourth die is on the interposer and adjacent to the second die and the first die, wherein the fourth die is coupled to the first die via the first silicon bridge.

Example 14: The apparatus of example 13, wherein the accelerator is a first accelerator, wherein the apparatus comprises a fifth die comprising a second accelerator, wherein the fifth die is on the interposer and adjacent to the first die and the third die, wherein the fifth die is coupled to the first die via the second silicon bridge.

Example 15: The apparatus of example 14 comprises a heat sink on the first die, the second die, the third die, the fourth die, and the fifth die.

Example 16: The apparatus of example 13, wherein the memory of the second die and the fourth die comprises high-bandwidth memory.

Example 17: The apparatus of example 10, wherein the memory comprises ferroelectric memory.

Example 18: The apparatus of example 10, wherein the memory comprises ferroelectric memory, wherein the apparatus comprises a substrate under the interposer.

Example 19: The apparatus of example 10, wherein the ferroelectric logic includes a non-linear polar material which includes one of: ferroelectric material, paraelectric material, or non-linear dielectric.

Example 19: An apparatus comprising: a substrate; a first die on the substrate, wherein the first die comprises a processor with a plurality of processing cores and a cache and input-output circuitry, wherein the cache and input-output circuitry are between the plurality of processing cores, wherein the first die includes an interconnect fabric over the cache and input-output circuitry; and a second die stacked on the first die, wherein the second die comprises an accelerator logic, wherein the second die comprises ferroelectric or paraelectric logic including majority, minority, and/or threshold logic gates, wherein the accelerator logic has a plurality of processing elements, wherein the plurality of processing elements couple to the interconnect fabric via through-silicon vias.

Example 20: The apparatus of example 19, wherein the first die includes ferroelectric or paraelectric logic including majority, minority, and/or threshold logic gates.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   at least two functional unit blocks that are spatially aligned; and
   a power management circuitry communicatively coupled to the at least two functional unit blocks, wherein the power management circuitry is to execute a power management instruction, wherein the power management circuitry is to manage power for the at least two functional unit blocks that are spatially aligned, wherein for an individual functional unit block, the power management instruction includes three fields comprising opcode, identification of the individual functional unit block, and a priority level for the individual functional unit block, wherein at least one of the at least two functional unit blocks comprise ferroelectric logic which includes a majority gate, a minority gate, or a threshold gate, wherein the ferroelectric logic includes at least three capacitors with first terminals to receive inputs and second terminals that are directly coupled to a node, and wherein the at least three capacitors include non-linear polar material.

2. The apparatus of claim 1, wherein the at least two functional unit blocks are spatially aligned in a package as separate dies in the package.

3. The apparatus of claim 2, wherein the separate dies are in a 3D configuration or a 2.5D configuration in the package.

4. The apparatus of claim 1 comprising:
   a control register to communicate to the power management circuitry regarding how to adjust power of the at least two functional unit blocks, wherein the control register is to provide the identification of the individual functional unit block and the priority level for the individual functional unit block to the power management circuitry.

5. The apparatus of claim 4, wherein the control register is controlled by control unit, wherein the control unit fetches an instruction and parses the opcode of the instruction.

6. The apparatus of claim 5, wherein the control unit determines whether the instruction is a power management instruction, and if the instruction is a power management instruction, the control unit informs the power management circuitry of the power management instruction.

7. The apparatus of claim 6, wherein the power management circuitry sends an acknowledgement to the control unit after the control unit informs the power management circuitry of the power management instruction.

8. The apparatus of claim 5, wherein the control unit determines whether the instruction is a power management instruction, and if the instruction is not a power management instruction, the control unit informs a scheduler about the instruction, so that the instruction is processed by the scheduler.

9. The apparatus of claim 1, wherein the power management circuitry sets an activity level limit for the at least two functional unit blocks based on the power management instruction.

10. The apparatus of claim 1, wherein the non-linear polar material which includes one of: a ferroelectric material, a paraelectric material, or a non-linear dielectric.

11. The apparatus of claim 10, wherein the ferroelectric material includes one of:
- Bismuth ferrite (BFO) with a first doping material wherein the first doping material is one of: Lanthanum or elements from lanthanide series of periodic table;
- lead zirconium titanate (PZT) or PZT with a second doping material, wherein the second doping material is one of La or Nb;
- a relaxor ferroelectric which includes one of: lead magnesium niobate (PMN), lead magnesium niobate-lead titanate (PMN-PT), lead lanthanum zirconate titanate (PLZT), lead scandium niobate (PSN), barium titanium-bismuth zinc tiobium tantalum (BT-BZNT), or barium titanium-barium strontium titanium (BT-BST);
- a perovskite which includes one of: $BaTiO_3$, $PbTiO_3$, $KNbO_3$, or $NaTaO_3$;
- a first hexagonal ferroelectric which includes one of: $YMnO_3$ or $LuFeO_3$;
- a second hexagonal ferroelectric of a type $h\text{-}RMnO_3$, where R is a rare earth element which includes one of: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y);
- hafnium (Hf), zirconium (Zr), aluminum (Al), silicon (Si), their oxides, or their alloyed oxides;
- hafnium oxides as $Hf_{(1-x)}E_xO_y$, where E is one of Al, Ca, Ce, Dy, Er, Gd, Ge, La, Sc, Si, Sr, Sn, Zr, or Y, where x and y are first and second fractions, respectively;
- $Al_{(1-x)}Sc_{(x)}N$, $Ga_{(1-x)}Sc_{(x)}N$, $Al_{(1-x)}Y_{(x)}N$ or $Al_{(1-x-y)}Mg_{(x)}Nb_{(y)}N$, where x and y are third and fourth fractions, respectively;
- y doped $HfO_2$, where 'y' includes one of: Al, Ca, Ce, Dy, Er, Gd, Ge, La, Sc, Si, Sr, Sn, or Y, wherein 'x' is a fraction;
- niobate type compounds $LiNbO_3$, $LiTaO_3$, lithium iron tantalum oxy fluoride, barium strontium niobate, sodium barium niobate, or potassium strontium niobate; or
- an improper ferroelectric which includes one of: [PTO/STO]n or [LAO/STO]n, where 'n' is between 1 and 100.

12. The apparatus of claim 10, wherein the paraelectric material includes: $SrTiO_3$, $TiO_3$ with Ba and Sr, $HfZrO_2$, Hf—Si—O, La-substituted $PbTiO_3$, or PMN-PT based relaxor ferroelectrics.

13. A system comprising:
- a first die comprising a first functional unit block;
- a second die comprising a second functional unit block, wherein the first die and the second die a spatially aligned in a package; and
- a power management circuitry communicatively coupled to the first functional unit block and to the second functional unit block, wherein the power management circuitry is to execute a power management instruction, wherein the power management circuitry is to manage power for the first functional unit block and the second functional unit block, wherein the power management instruction includes three fields comprising opcode, identification of the first functional unit block or the second functional unit block, and a priority level for the first functional unit block or the second functional unit block, wherein at least one of the first functional unit block and the second functional unit block comprise ferroelectric logic which includes a majority gate, a minority gate, or a threshold gate, wherein the ferroelectric logic includes at least three capacitors with first terminals to receive inputs and second terminals that are directly coupled to a node, and wherein the at least three capacitors include non-linear polar material.

14. The system of claim 13 comprising:
a control register to communicate to the power management circuitry regarding how to adjust power of the first functional unit block and the second functional unit block, wherein the control register is to provide the identification of the first functional unit block and the second functional unit block and the priority level for the first functional unit block and the second functional unit block to the power management circuitry.

15. The system of claim 13, wherein the first die and the second die are in a 3D configuration or a 2.5D configuration in the package.

16. A method comprising:
executing a power management instruction to manage power for at least two functional unit blocks that are spatially aligned, wherein for an individual functional unit block, the power management instruction includes three fields comprising opcode, identification of the individual functional unit block, and a priority level for the individual functional unit block, wherein at least one of the at least two functional unit blocks comprise ferroelectric logic which includes a majority gate, a minority gate, or a threshold gate, wherein the ferroelectric logic includes at least three capacitors with first terminals to receive inputs and second terminals that are directly coupled to a node, and wherein the at least three capacitors include non-linear polar material.

17. The method of claim 16, wherein the at least two functional unit blocks are spatially aligned in a package as separate dies in the package, wherein the separate dies are in a 3D configuration or a 2.5D configuration in the package.

18. The method of claim 16 comprising:
- communicating to a power management unit regarding how to adjust power of the at least two functional unit blocks; and
- providing the identification of the individual functional unit block and the priority level for the individual functional unit block to the power management unit.

* * * * *